US007676348B2

(12) United States Patent
Okada

(10) Patent No.: US 7,676,348 B2
(45) Date of Patent: Mar. 9, 2010

(54) LAYOUT DESIGN SUPPORT SYSTEM, METHOD, AND PROGRAM

(75) Inventor: Yuuki Okada, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 640 days.

(21) Appl. No.: 11/560,107

(22) Filed: Nov. 15, 2006

(65) Prior Publication Data

US 2007/0260432 A1 Nov. 8, 2007

(30) Foreign Application Priority Data

Nov. 15, 2005 (JP) ............................. 2005-330760

(51) Int. Cl.
*G06F 17/50* (2006.01)
*G06F 17/30* (2006.01)
(52) U.S. Cl. ................. 703/2; 703/1; 703/22; 702/183; 707/2; 716/11
(58) Field of Classification Search ................ 703/1, 703/22, 2; 702/183; 707/2; 716/11
See application file for complete search history.

(56) References Cited

U.S. PATENT DOCUMENTS

| 5,412,756 | A | 5/1995 | Bauman et al. | |
|---|---|---|---|---|
| 5,517,428 | A | 5/1996 | Williams | |
| 6,012,036 | A | 1/2000 | O'Brien, Jr. | |
| 6,993,456 | B2* | 1/2006 | Brooks et al. | ............... 702/183 |
| 2006/0106757 | A1* | 5/2006 | Sakai et al. | .................... 707/2 |
| 2006/0282235 | A1* | 12/2006 | Thomas et al. | ................. 703/1 |
| 2007/0266365 | A1* | 11/2007 | Kawamoto | ................... 716/21 |

FOREIGN PATENT DOCUMENTS

| JP | 6-301546 A | 10/1994 |
|---|---|---|
| JP | 6-314310 A | 11/1994 |
| JP | 9-305643 A | 11/1997 |
| JP | 10-124566 A | 5/1998 |
| JP | 2000-39905 A | 2/2000 |
| JP | 2002-251414 A | 9/2002 |
| JP | 2002-304437 A | 10/2002 |
| WO | WO 2006/121641 A2 | 11/2006 |

* cited by examiner

*Primary Examiner*—Thai Phan
(74) *Attorney, Agent, or Firm*—Foley & Lardner LLP

(57) ABSTRACT

The present invention enables support of a process for creating a detailed layout design which takes construction into account, and contributes to a reduction in the workload of the layout design process. A layout editing unit causes an interface unit to display a layout design data editing screen, receives an edit instruction input onto the screen, and edits the layout design data in accordance with the edit instruction. The layout editing unit classifies the layout design data into five data types, namely building data, equipment arrangement data, equipment connection element data, equipment connection path data, and user-specified range data, and edits the data of each data type individually. A storage unit stores the editing results of the layout design data. A CAD conversion unit converts the layout design data into a two-dimensional CAD drawing or a three-dimensional CAD model, and causes the interface unit to display the two-dimensional CAD drawing or three-dimensional CAD model on a screen.

9 Claims, 32 Drawing Sheets

FIG. 4
(A)
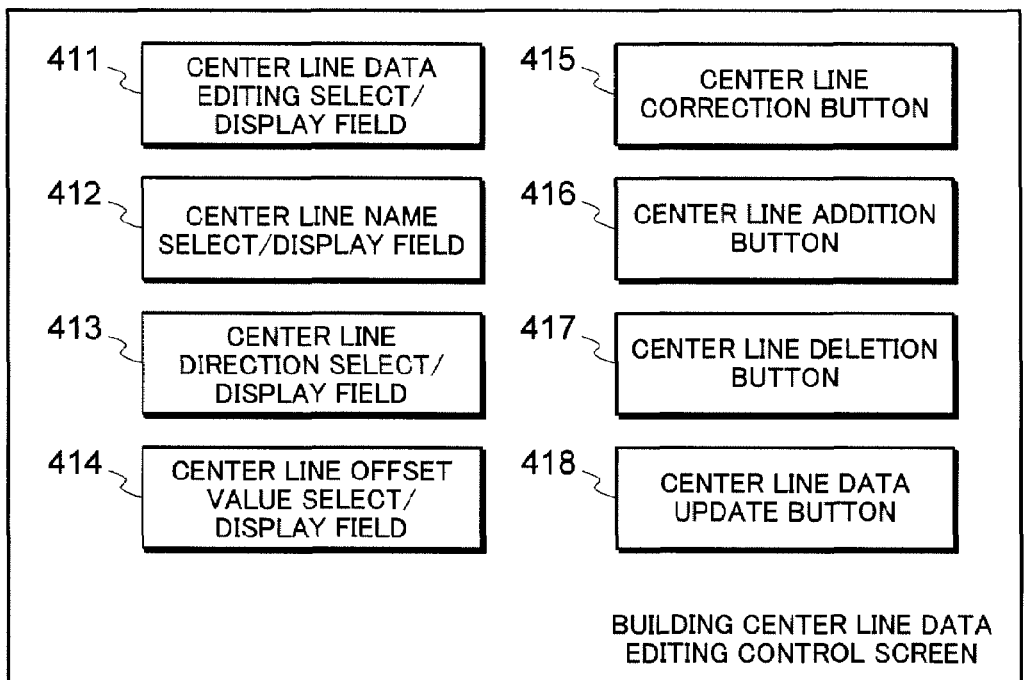
(B)
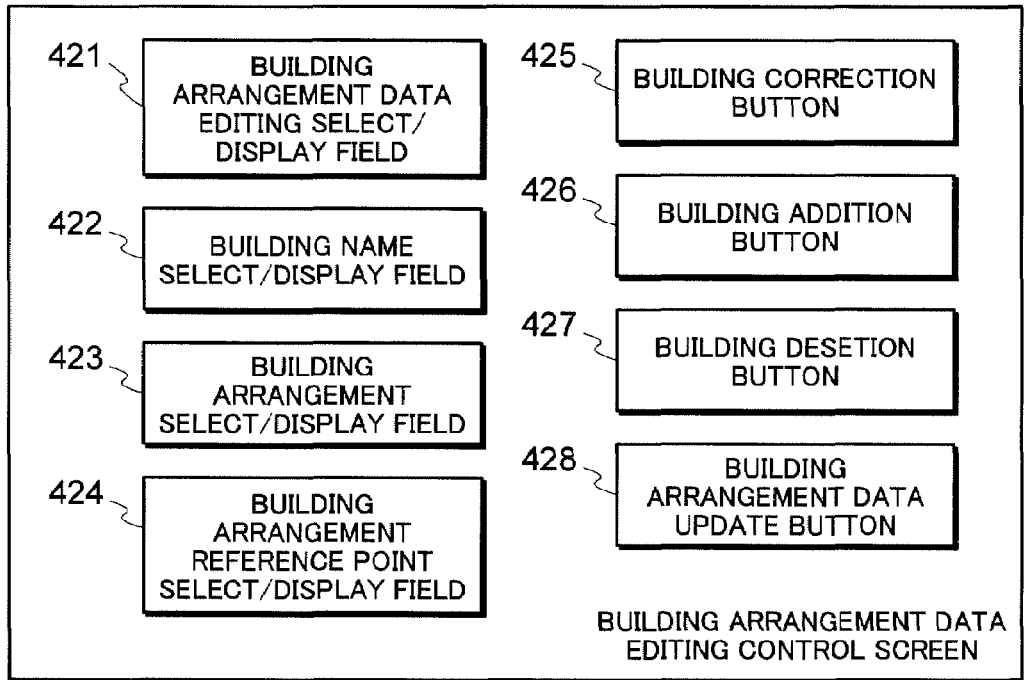

FIG. 5
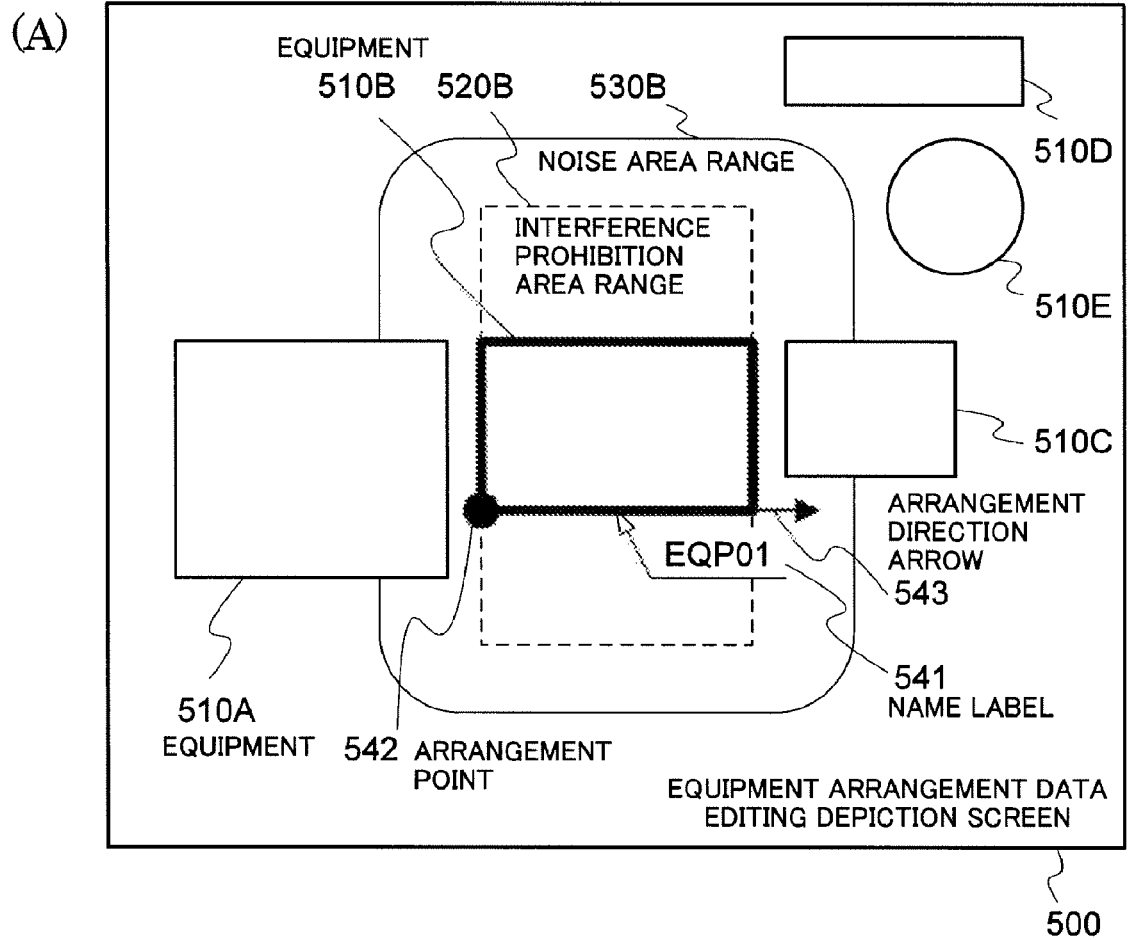
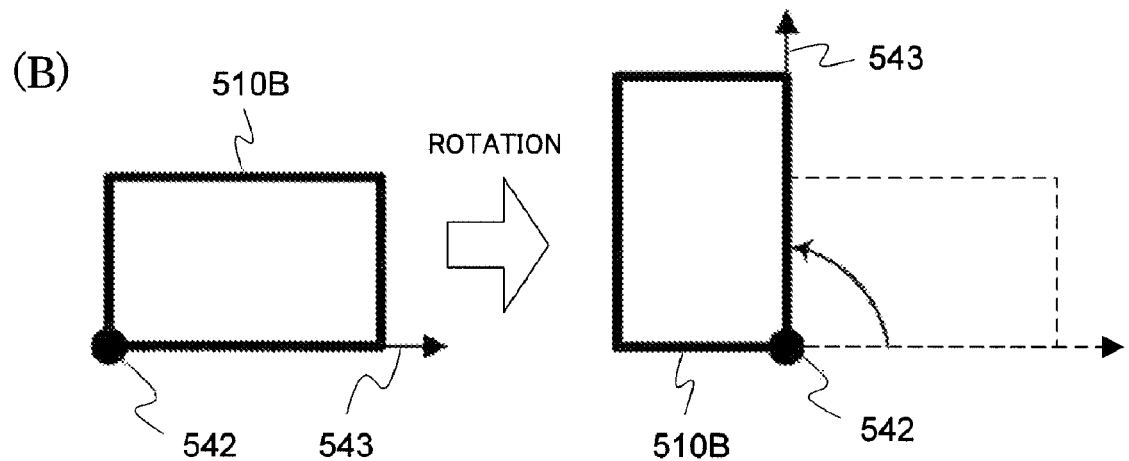

FIG. 6
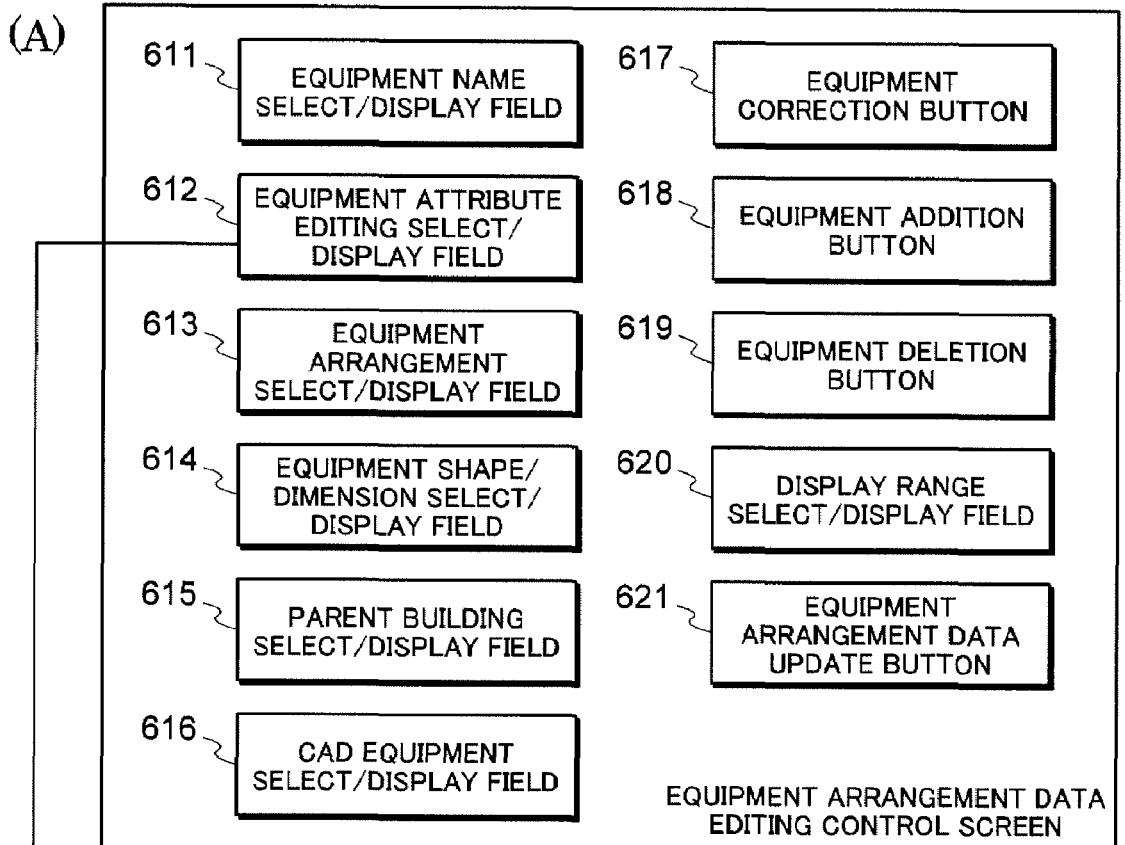
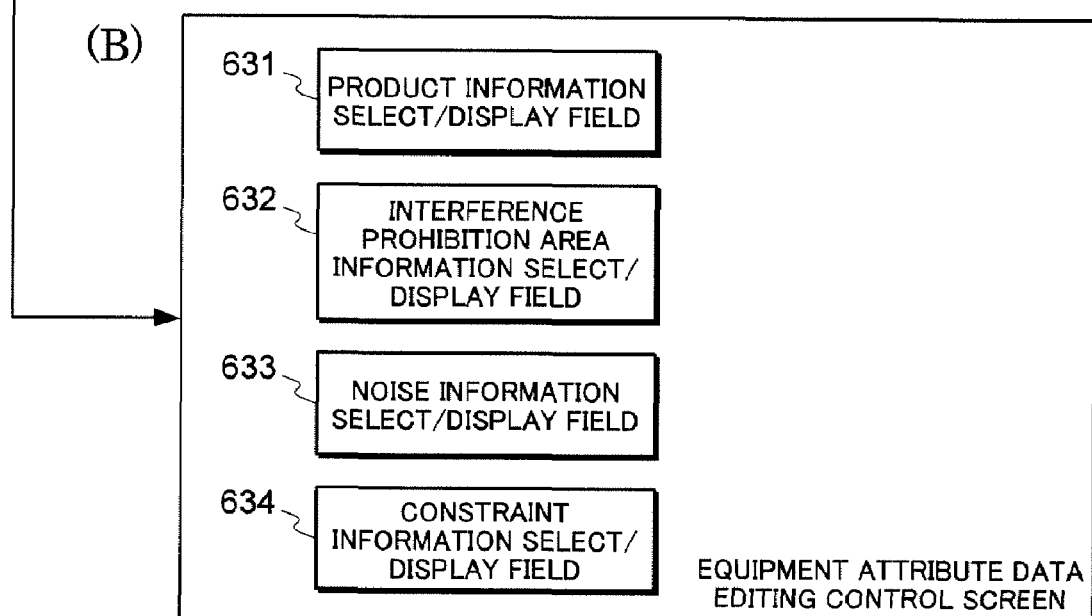

FIG. 9
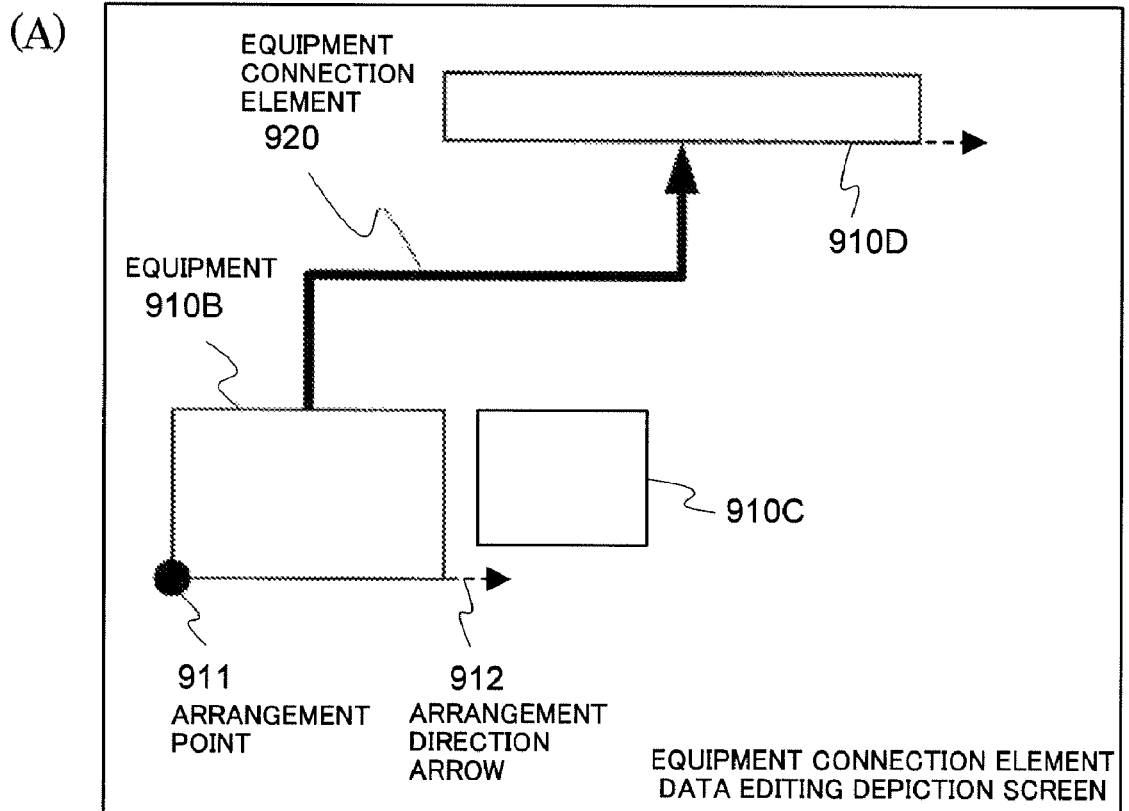
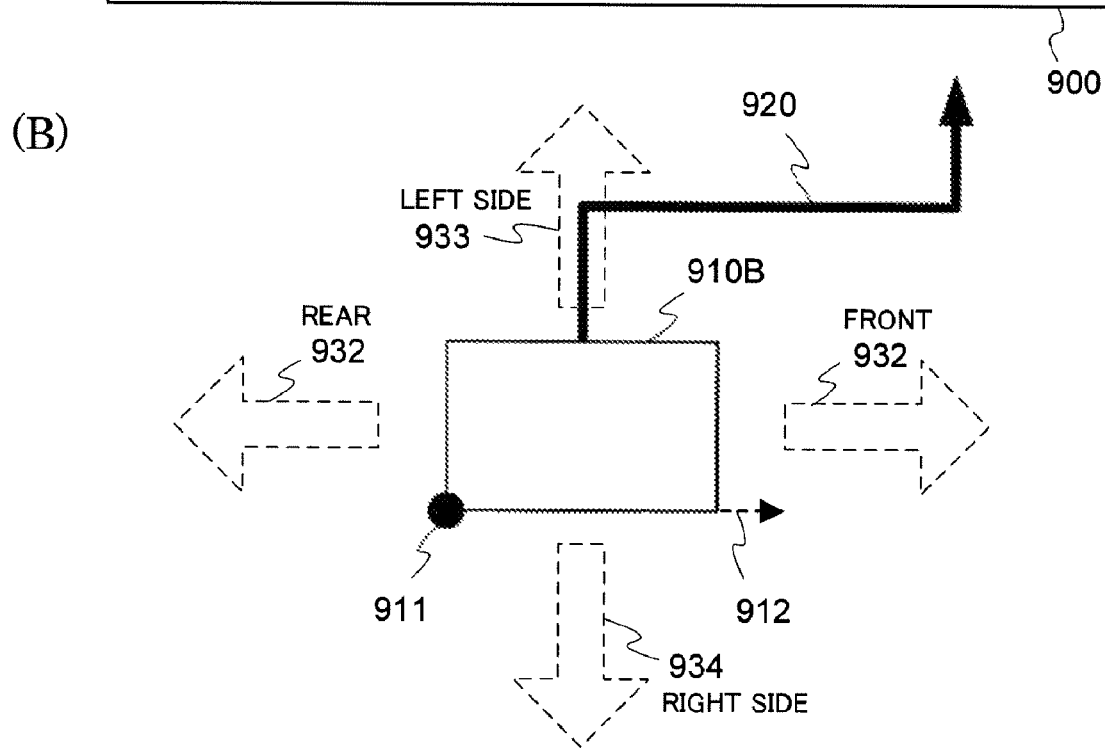

FIG. 10
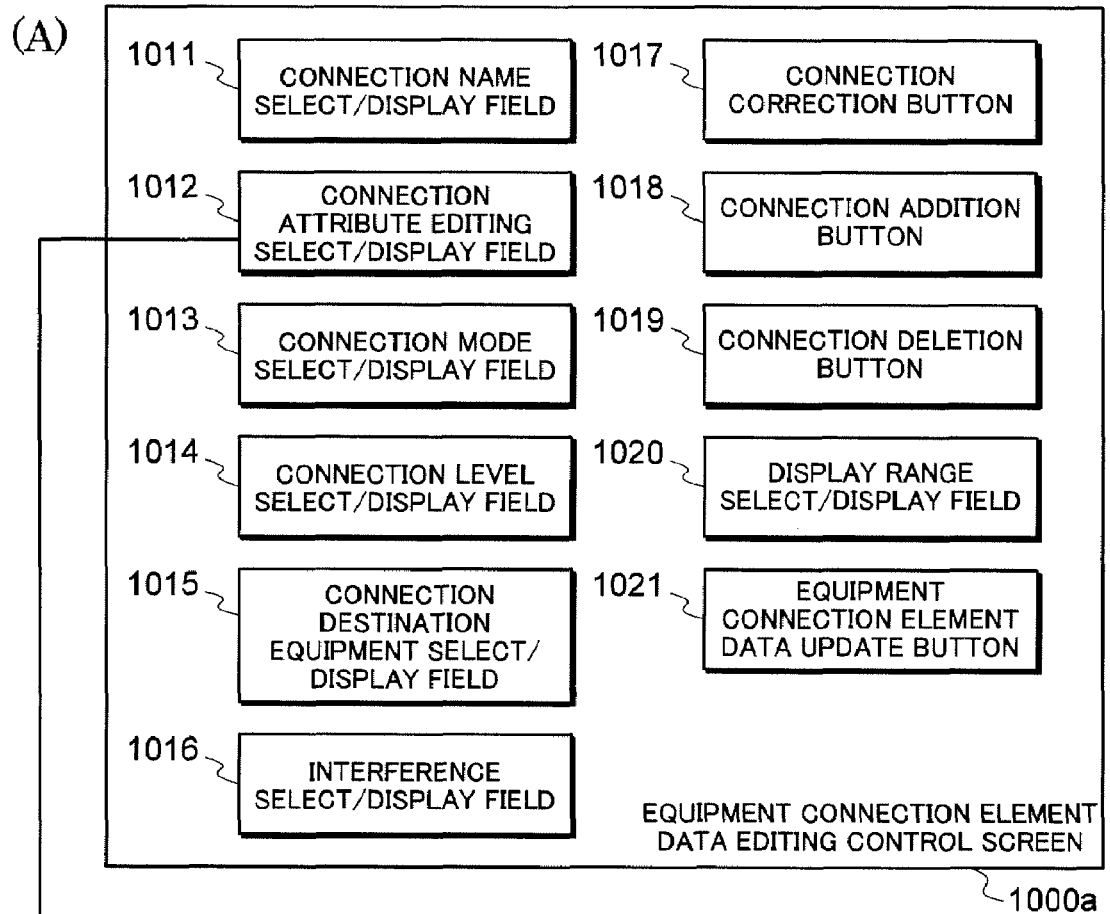
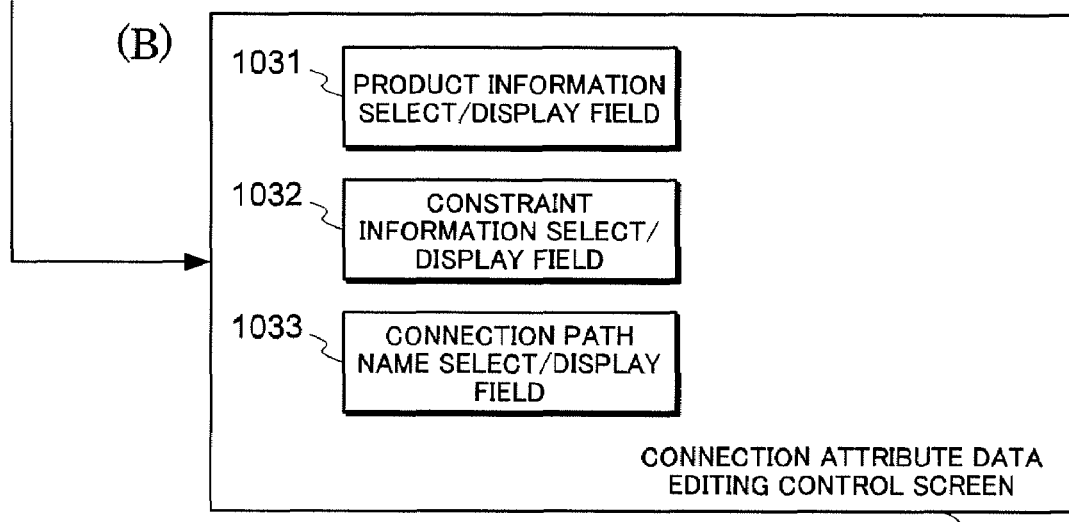

FIG. 13
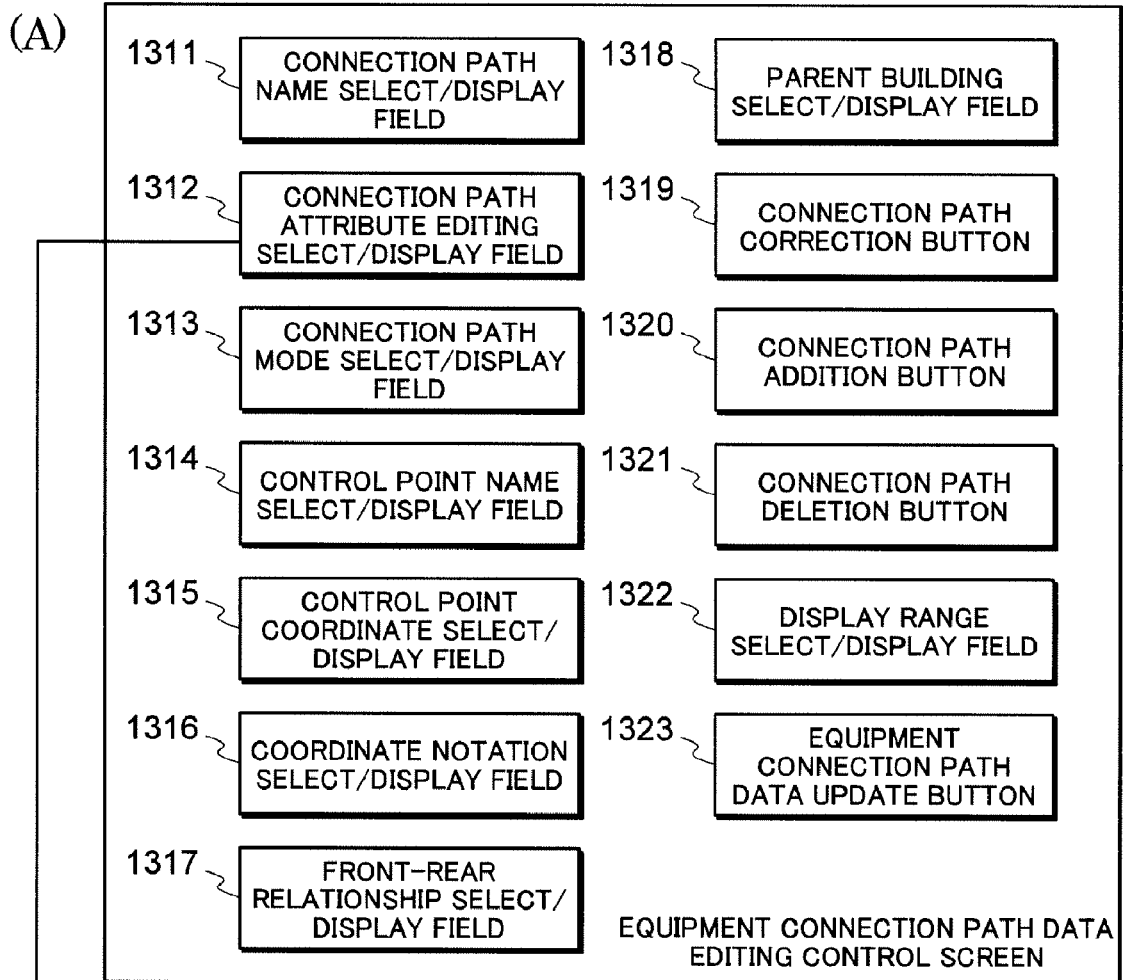
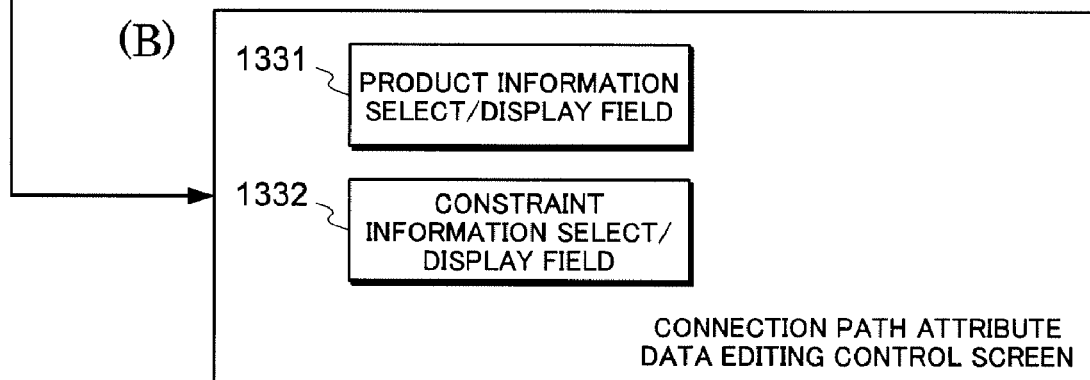

FIG. 18
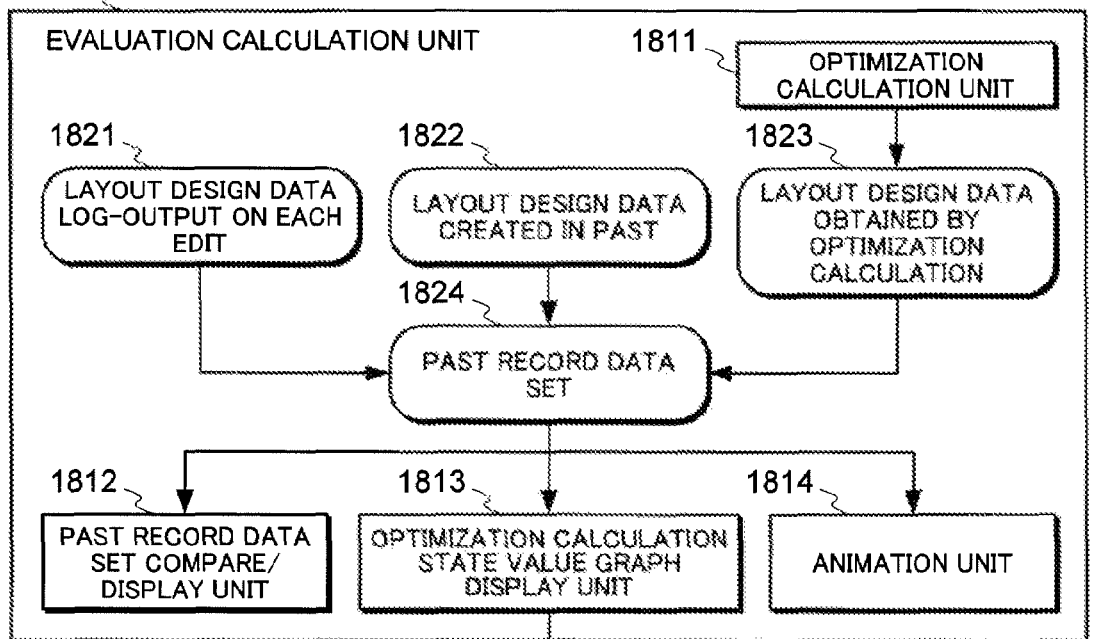
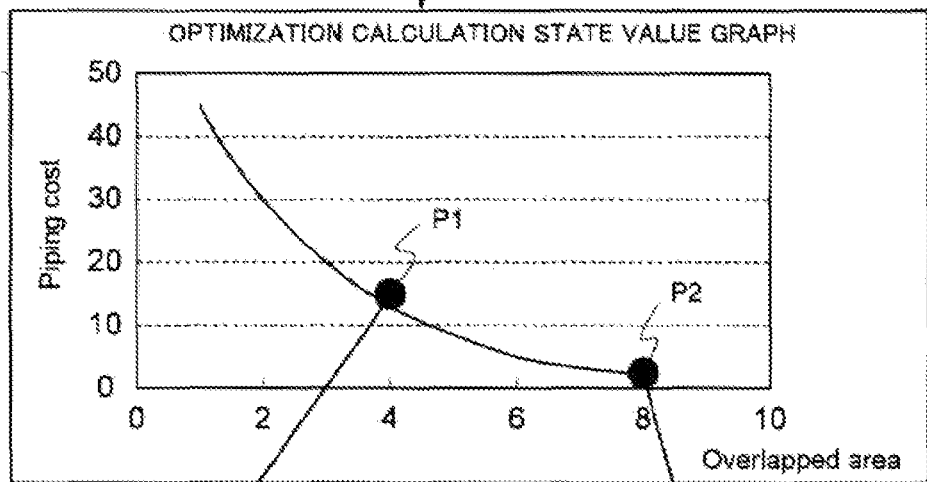
LAYOUT DISPLAY SCREEN 1841
LAYOUT DISPLAY SCREEN 1842
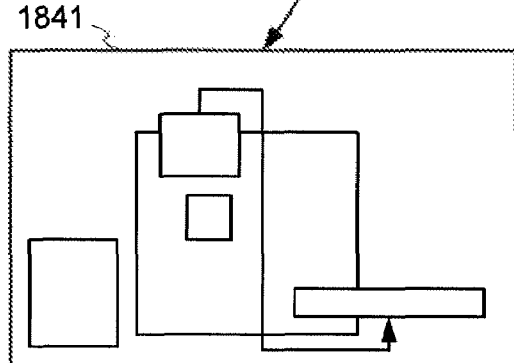
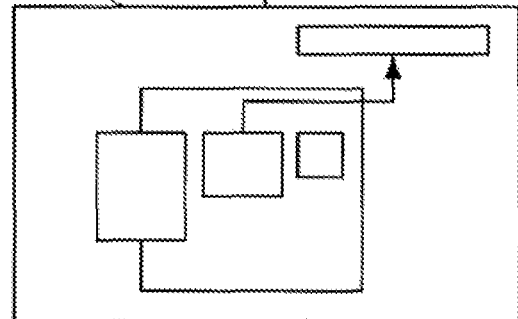

FIG. 24

Equipment attribute
- Equipment importance: 1
- Equipment movability: 0
- Equipment cost: 1
- Unit of equipment cost: USD
- Noise pressure level [dBA]: 100
- Vendor name: V1
- Number of motors: 1
- Number of anchor bolts: 10
- Number of embedded metal fittings: 10

2411

Tolerance setting
Unit is [mm]

Left 20000 / 5000
Rear 0 / 5000
Right 20000 / 5000
Front 10000 / 5000

2412

Fluid used for equipment
Main fluid: STEAM / WATER / OIL / AIR
Sub fluid: STEAM / WATER / OIL / AIR OK    Cancel (C)

2400 EQUIPMENT ATTRIBUTE DATA EDITING CONTROL SCREEN

FIG. 27

Path setting
- Path name: Path01
- Node no.: 1

Cross-section setting
- Cross-section width [mm]: 100
- Cross-section height [mm]: 100
- Cross-section weight [kg]: 1000
- Cross-section cost: 1
- Unit of cross-section cost: USD

[OK] [Cancel (C)]

2700 CONNECTION ATTRIBUTE DATA EDITING CONTROL SCREEN
2711
2712

3000 CONNECTION PATH ATTRIBUTE DATA EDITING CONTROL SCREEN

LAYOUT DESIGN SUPPORT SYSTEM, METHOD, AND PROGRAM

BACKGROUND OF THE INVENTION

1. Field of the Invention

The present invention relates to a technique for supporting layout design, including the arrangement of a building and a plurality of equipments within a layout range space of a plant and connections between the equipments, using a computer.

2. Description of the Related Art

Layout design of various types of plant facilities, such as chemical plants and power plants for generating thermal power, nuclear power, hydropower, and so on, is performed on a plant design enterprise side when providing a price estimate or at an early stage of the design process, and encompasses concepts such as the arrangement of buildings, equipments, piping, cables, and so on, for example. This layout design process must be performed in accordance with various conditions relating to the design content and various industry-related conditions. Hereafter, these conditions will be divided broadly into "conditions for arranging objects within a given site", "conditions for preventing effects on the exterior of the site", and "estimate operation conditions".

[Conditions for Arranging Objects within a Given Site]

Firstly, a design which ensures that all of the required facilities are accommodated within the given site is prerequisite. Further, to reduce costs, economic efficiency and workability must be taken sufficiently into consideration. Customer procurement specifications and the law must also be taken sufficiently into account.

More specifically, in the layout design of a power plant concept, the size of the main equipments and the size of auxiliary equipments selected to correspond to the main equipments are determined by means of heat balance design in accordance with fluid information relating to pressure, temperature, and so on, which is described in the customer procurement specifications. When the main equipments and auxiliary equipments are purchased from an external vendor, the size of the equipments must be determined on the basis of the equipment catalog of the vendor.

In either case, the construction costs for constructing a building for housing the equipments increases in accordance with the surface area of the equipments. Therefore, the size of each equipment must be made as small as possible, the arrangement area must be reduced as far as possible, and the dimensions of the building must be reduced. Construction costs also rise when the structure of the building is complicated or unique, and therefore it is also important to make the structure of the building as easy to construct as possible.

Further, route design relating to the paths taken by the pipes and cables that connect the equipments must be performed with regard to the sizes and positions of the buildings and equipments, as well as external interference relating to prepared lines for electricity, water supply and sewerage, fuel, and so on. Simultaneously, to achieve reductions in the amount of material and construction costs, the piping and cables must be designed to be as short as possible, preferably taking the shortest route between equipments. The reason for this is as follows.

For example, main steam pipes which are capable of withstanding high temperatures and high-pressure, power cables which are capable of withstanding high voltages, and so on are extremely expensive, and hence when the length of the piping and cables increases, the amount of material rises, leading to cost increases. In particular, when the distance of a cable increases, more expensive cable must be selected to prevent the effects of voltage drop, and it is therefore extremely important to reduce the cable distance. Likewise with respect to the construction of steel structures known as piping racks and cable racks, which are used during installation of the piping and cable, and the excavation work required to lay the piping and create cable trenches, costs rise as the distance increases.

In reality, however, piping and cable are almost never designed to take the shortest route between equipments. The reason for this is that during piping and cable route design, accessibility, ease of maintenance, and the construction sequence must be taken into account in addition to distance. For example, when a road or operating frame exists on the shortest route, route design must be performed so as to avoid these obstacles. Furthermore, the design of routes on which piping racks or trenches are formed must be prioritized over other routes. In particular, when a trench orbits the outer periphery of the plant, the total amount of material is greatly affected, and therefore such routes must be avoided if at all possible.

[Conditions for Preventing Effects on the Exterior of the Site]

In addition to the conditions relating to the interior of the given site, it is also important that the design prevents effects on the exterior of the site. More specifically, when the plant is operative, a considerable amount of vibration and noise is typically generated, and hence sufficient consideration must be given to ways of preventing the vibration and noise from affecting the environment on the exterior of the site. With respect to environmental problems, laws and ordinances differ according to the country and region, similarly to other laws, and hence design must be performed in accordance with the laws and ordinances of the subject country and region.

Particularly with respect to the sound pressure level, an upper sound pressure level limit on the boundary between the site and the site exterior or the like may be set, and hence design must be performed such that these sound pressure level conditions are satisfied. Therefore, measures such as removing the equipments that serve as noise sources from the boundary with the site exterior and providing protective walls around the equipments must also be taken.

[Estimate Operation Conditions]

In addition to conditions on the design content of the layout design, many constraints are applied to layout design as an estimate operation due to the fact that layout design is positioned at the beginning of the multi-stage design process involved in plant design. Firstly, the short amount of time that can be spent on the design acts as a large constraint. In other words, the time that can be spent on the estimate to be tendered is short, and at the same time a large number of items must be dealt with. Moreover, since the layout design is positioned at the head of the design process, speed is required to issue precise instructions to downstream departments.

Furthermore, the information that can be used during the design stage is limited, and therefore work must be performed to compensate for the lack of information. For example, various operations other than the actual layout design, such as comparison with time-tested plants and organization of the information confirmed at that time, must be performed to optimize the layout design.

[Known Examples Relating to Plant Design]

Known examples relating to plant design include Japanese Unexamined Patent Application H6-314310, which discloses a plant design support system used in a functional layout design of a plant and a simulation of an optimum operation plan for the plant, both of which are upstream processes of plant design. Typically, many conventional techniques relating to layout design involve plant operation simulations, and Japanese Unexamined Patent Application H6-301546, for example, discloses artificial intelligence software for use in a plant operation simulation.

Japanese Unexamined Patent Application 2002-251414 mentions a technique enabling a plant user and a designer to efficiently plan the addition of a denitrification apparatus. However, this technique does not relate to layout design.

Japanese Unexamined Patent Application H10-124566 and Japanese Unexamined Patent Application H9-305643 disclose a technique serving as a plant design tool, in which a plant arrangement optimization calculation is performed by setting a specific equipment arrangement and logical connections between the equipments using a three-dimensional model.

In the conventional plant design-related techniques described above, problems such as the following exist. First, when used as an estimation tool, layout design support means nothing more than providing a database of plant design conditions or the like, and support is not provided up to the detailed layout design process. Japanese Unexamined Patent Application H10-124566 and Japanese Unexamined Patent Application H9-305643 describe setting of the arrangement of the equipments and the logical connections therebetween, but make no mention of the arrangement of buildings, setting of the physical connections between equipments, and so on, which affect the amount of materials and cost during construction.

As described above, design of the specific routes taken by the piping, cables and so on which connect the equipments to each other greatly affects the amount of materials and cost during construction, and hence it is important to take these conditions into account during specific route design. However, in the conventional techniques, only logical equipment connections are considered, and support is not provided in relation to specific route design taking the necessary conditions into account. As a result, specific route design places a large load on the designer, and it is difficult to produce an optimum route design. Sine it is difficult to produce an optimum route design during the layout design process, accurate calculation of the total amount of materials and cost also becomes difficult.

Further, to obtain a spatial grasp of the arrangement of the equipments, visual expression thereof is preferably performed using a two-dimensional CAD drawing or a three-dimensional CAD model. However, when a design operation is performed using a two-dimensional CAD or three-dimensional CAD, the layout design workload is much greater than that a case in which simple, universal diagrams are used.

In any case, the work required for a plant design estimate operation has been increasing by the year. The main reason for this is that a large number of items must be dealt with in order to respond to inquiries, and yet the scope of supply for each individual plant has widened and new, unknown technology must be dealt with. Due to the concentrated nature of the estimate operation, in which a large amount of work must be performed within a short time period, oversights relating to the customer procurement specifications and errors caused by misunderstandings may occur, creating the possibility for significant estimate omissions. Hence, to avoid the large risks involved in layout design as an estimate operation, the workload required for layout design must be lightened.

DISCLOSURE OF THE INVENTION

The present invention has been designed to solve these problems of the prior art, and it is an object thereof to provide a layout design support system, method, and program capable of supporting a detailed layout design process taking construction into account so that the workload of the layout design process can be lightened.

To achieve the object described above, the present invention is a layout design support system which edits layout design data, including a building arrangement, physical equipment connection settings, and so on, and converts the edited data into a two-dimensional CAD drawing or a three-dimensional CAD model as appropriate. As a result, a detailed layout design taking construction into consideration can be produced easily using simple, universal diagrams, and the layout can easily be understood in spatial terms using the two-dimensional CAD drawing or three-dimensional CAD model.

The layout design support system of the present invention supports a layout design process, including the arrangement of a building and a plurality of equipments within a layout range space of a plant and connections between the equipments, using a computer. The computer comprises interface means, layout editing means, storage means, and CAD converting means.

Here, the interface means input various instructions and data and display various screens, while the layout editing means cause the interface means to display a layout design data editing screen relating to layout design data, which include building data relating to a building center line and a building arrangement, equipment arrangement data relating to an arrangement of the equipments, equipment connection data relating to a physical connection between the equipments, and user-specified range data relating to a range specified by a user, receive an edit instruction input onto the screen, and edit the layout design data in accordance with the edit instruction. The storage means store a layout design data editing result generated by the layout editing means, while the CAD converting means convert the layout design data generated by the layout editing means into a two-dimensional CAD drawing or a three-dimensional CAD model, and cause the interface means to display the two-dimensional CAD drawing or the three-dimensional CAD model on a screen.

A layout design support method and a layout design support program of the present invention adopt the features of the system described above in the form of a method and a computer program, respectively.

According to the present invention described above, a detailed layout design process taking construction into account can be supported by supporting the editing of specific layout design data classified appropriately and precisely into building data relating to a building center line and a building arrangement, equipment arrangement data relating to the arrangement of the equipments, equipment connection data relating to the connections between the equipments, user-specified range data relating to a user-specified range restricting the arrangement of and connections between the equipments, and so on. As a result, a designer can create a detailed layout design which is suitable for construction efficiently, and calculate material amounts and costs accurately. Thus, the workload of the designer is reduced.

Since setting relating to the building center line and arrangement and setting relating to the physical connections between the equipments are possible, a layout design which is even more suitable for construction can be created. Hence, the designer can create a detailed layout design which is even more suitable for construction efficiently, and calculate material amounts and costs accurately. Thus, the workload of the designer is reduced even further.

Moreover, the designer can create a detailed layout design through detailed study of the precisely and appropriately classified layout design data using only simple, universal diagrams instead of a two-dimensional CAD drawing or a three-dimensional CAD model, and hence the workload of the designer is reduced even further.

On the other hand, the layout design data may be converted into a two-dimensional CAD drawing or a three-dimensional CAD model as needed and displayed on a screen, and hence a spatial grasp of the layout can be obtained from the two-dimensional CAD drawing or three-dimensional CAD model during the design process as well as at the end of the design process. Therefore, substantially identical effects to those obtained in a layout design process employing a two-dimensional CAD drawing or a three-dimensional CAD model are obtained.

The present invention provides a layout design support system, method, and program which are capable of supporting a process for creating a detailed layout design which takes construction into account, and which can therefore contribute to a reduction in the workload of the layout design process.

BRIEF DESCRIPTION OF THE DRAWINGS

FIGS. 4A and 4B is a view showing a functional configuration example of a control screen used in the building data editing processing performed by the building data editing unit of FIG. 1, FIG. 4A showing a control screen used to edit the building center line data, and FIG. 4B showing a control screen used to edit the building arrangement data;

FIGS. 5A and 5B is a view showing an image display example of a depiction screen used in equipment arrangement data editing processing performed by an equipment arrangement data editing unit of FIG. 1, FIG. 5A showing a depiction screen used to edit equipment arrangement data, and FIG. 5B showing an example of a data editing operation performed on the equipment arrangement data editing depiction screen;

FIGS. 6A and 6B is a view showing a functional configuration example of a control screen used in the equipment arrangement data editing processing performed by the equipment arrangement data editing unit of FIG. 1, FIG. 4A showing a control screen used to edit the equipment arrangement data, and FIG. 4B showing a control screen used to edit equipment attribute data;

FIGS. 9A and 9B is a view showing an image display example of a depiction screen used in equipment connection element data editing processing performed by an equipment connection element data editing unit of FIG. 1, FIG. 9A showing a depiction screen used to edit the equipment connection element data, and FIG. 9B showing an example of a data editing operation performed on the equipment connection element data editing depiction screen;

FIGS. 10A and 10B is a view showing a functional configuration example of a control screen used in the equipment connection element data editing processing performed by the equipment connection element data editing unit of FIG. 1, FIG. 10A showing a control screen used to edit the equipment connection element data, and FIG. 10B showing a control screen used to edit connection attribute data;

FIGS. 13A and 13B is a view showing a functional configuration example of a control screen used in the equipment connection path data editing processing performed by the equipment connection path data editing unit of FIG. 1, FIG. 13 A showing a control screen used to edit the equipment connection path data, and FIG. 13B showing a control screen used to edit connection path attribute data;

FIG. 18 is a view showing a specific example of evaluation calculation processing performed by an evaluation calculation unit of FIG. 1;

FIG. 24 is a view showing a specific screen display example of a control screen used in the equipment attribute data editing performed by the equipment arrangement data editing unit of FIG. 1;

FIG. 27 is a view showing a specific screen display example of a control screen used in the connection attribute data editing performed by the equipment connection element data editing unit of FIG. 1;

DESCRIPTION OF THE PREFERRED EMBODIMENTS

[System Constitution]

Figure 1:
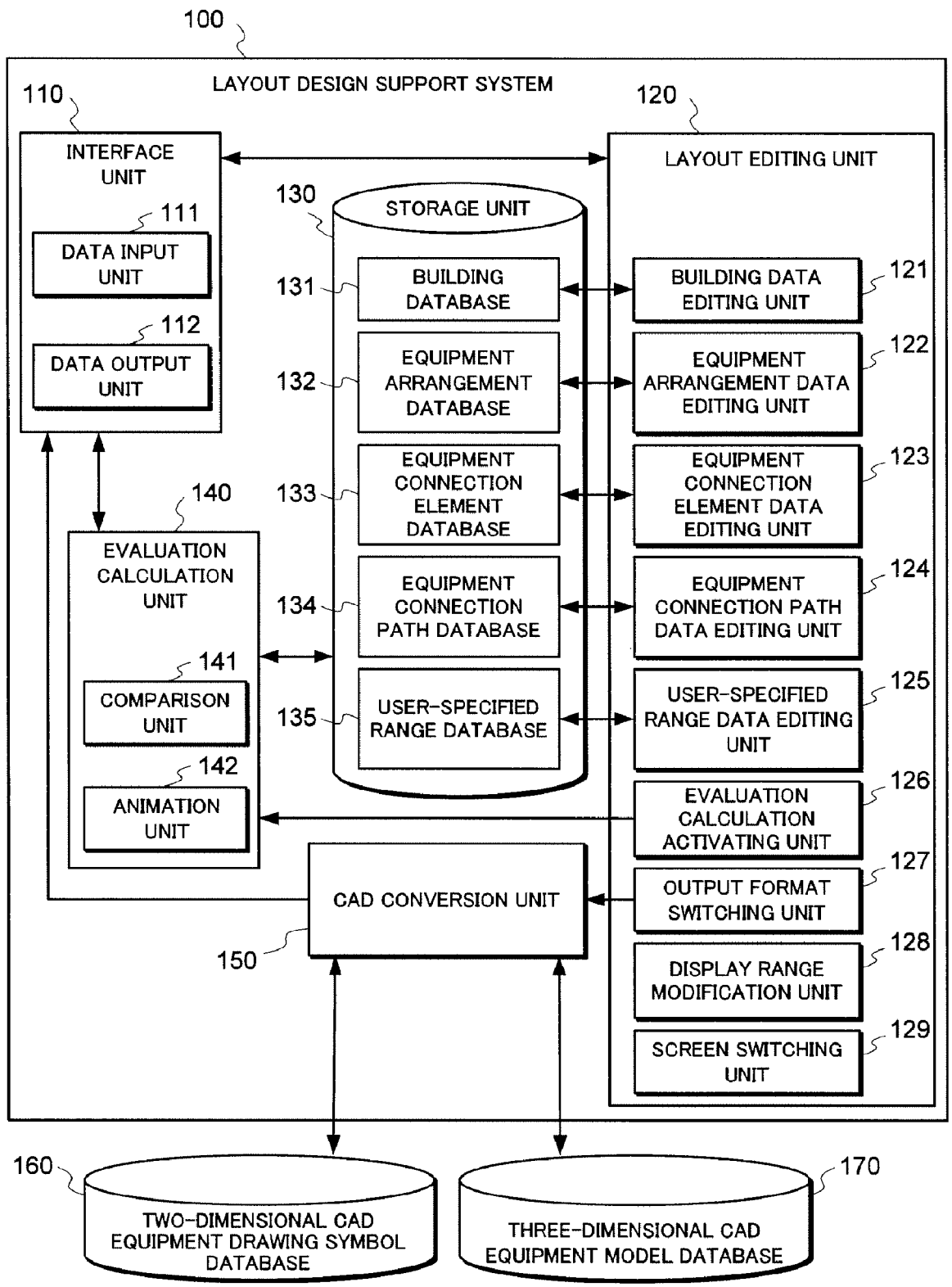
FIG. 1 is a block diagram showing an embodiment of a layout design support system to which the present invention is applied.

FIG. 1 is a block diagram showing an embodiment of a layout design support system to which the present invention is applied. As shown in FIG. 1, a layout design support system 100 according to this embodiment is constituted by an interface unit 110, a layout editing unit 120, a storage unit 130, an evaluation calculation unit 140, and a CAD conversion unit 150, all of which are realized on a computer. Each unit 110, 120, 130, 140, 150 will be described in detail below.

The interface unit 110 is constituted by a data input unit 111 and a data output unit 112. Here, the data input unit 111 is an input apparatus such as a mouse or keyboard for inputting various instructions and data into the computer in accordance with a user operation, and the data output unit 112 is an output apparatus such as a display or printer for displaying or outputting data input through the data input unit 111, data stored in the data storage unit 130, and results processed by the layout editing unit 120, evaluation calculation unit 140, and CAD conversion unit 150 to the user. In other words, the interface unit 110 is a part for performing information exchange between the computer and the user, and is typically known as a "user interface" or the like.

The layout editing unit 120 serves as means for causing the interface unit 110 to display a layout design data editing screen, receiving an edit instruction input on the screen, and editing the layout design data in accordance with the edit instruction. In this embodiment, the layout editing unit 120 classifies the layout design data into five data types, namely building data, equipment arrangement data, equipment connection element data, equipment connection path data, and user-specified range data, and edits data belonging to each data type independently.

Here, the "building data" relate to the center lines and arrangement of the buildings, while the "equipment arrangement data" relate to the arrangement of the equipments. The "equipment connection element data" and "equipment connection path data" are sub-types of "equipment connection data" relating to the physical connections between equipments. The "equipment connection element data" relate to the constitution of the physical connection elements (piping, cables, and so on) of the equipments, while the "equipment connection path data" relate to the constitution of auxiliary elements (racks, trenches, and so on) which form paths for the equipment connection elements. The "user-specified range data" relate to a range (total material amount range, CAD data conversion range, and so on) specified by the user for a particular purpose.

The layout editing unit 120 comprises a building data editing unit 121, an equipment arrangement data editing unit 122, an equipment connection element data editing unit 123, an equipment connection path data editing unit 124, and a user-specified range data editing unit 125, each of which serves as an individual editing unit for editing data of one of the five data types, i.e. building data, equipment arrangement data, equipment connection element data, equipment connection path data, and user-specified range data, independently.

The individual editing units 121 to 125 each comprise a depiction screen for depicting the content of a layout design data editing operation as a layout diagram, and an associated control screen, which together serve as layout design data editing screens that are displayed by the interface unit 110. Here, the control screen displays an input/select/display field or an operation image element relating to an editing subject item of the layout design data, and inputs an edit instruction and data corresponding to a user operation. The information obtained by the control screen is transmitted to the corresponding depiction screen and reflected in the layout diagram.

Note that in this specification, an "operation image element" denotes an individual image element serving as an operation unit for performing input or selection, such as an operation button, a cursor, an input window, and soon. Further, the term "input/select/display field" or "select/display field" is a wide concept denoting a functional unit for performing input or selection and displaying the content thereof, which includes an operation button, a cursor, an input window, and an item name display for realizing a specific function.

The layout editing unit 120 further comprises an evaluation calculation activating unit 126, an output format switching unit 127, a display range modification unit 128, and a screen switching unit 129. Here, the evaluation calculation activating unit 126 causes the evaluation calculation unit 140 to begin evaluation calculation processing in accordance with an instruction input via the input/select/display field or operation image element displayed on the control screen or depiction screen of the individual editing units 121 to 125.

The output format switching unit 127 controls the CAD conversion unit 150 in accordance with an instruction input via the input/select/display field or operation image element displayed on the control screen or depiction screen of the individual editing units 121 to 125 to switch the output format of the depiction screen to a two-dimensional CAD drawing or a three-dimensional CAD model.

The display range modification unit 128 switches the buildings and arrangement displayed on the depiction screen and enlarges or reduces the depiction screen in accordance with an instruction input via the input/select/display field or operation image element displayed on the control screen or depiction screen of the individual editing units 121 to 125.

The image switching unit 129 switches between the control screen and depiction screen in accordance with an instruction input via the input/select/display field or operation image element displayed on the control screen or drawing screen of the individual editing units 121 to 125.

Note that specifically, the layout editing unit 120 is realized by the main memory of the computer, a specialized layout design editing program stored therein, a CPU controlled by the program, and so on.

The storage unit 130 comprises a building database 131, an equipment arrangement database 132, an equipment connection element database 133, an equipment connection path database 134, and a user-specified range database 135 serving as databases for storing individually the editing results of the building data, equipment arrangement data, equipment connection element data, equipment connection path data, and user-specified range data edited by the individual editing units 121 to 125 of the layout editing unit 120.

In this case, examples of the specific storage formats that may be used to store the layout design data in the various databases 131 to 135 of the storage unit 130 include a spread-sheet format, a database format, and a text file format. In other words, any storage format may be employed for the layout design data as long as the format, such as the data field name, is appropriate for the layout editing unit 120 and can be read by the layout editing unit 120.

Note that the storage unit 130 is realized by various types of computer memory, an auxiliary storage apparatus, and so on.

The evaluation calculation unit 140 performs evaluation calculation processing, including calculation of a layout design data state value or a repeated optimization calculation, using a preset algorithm, and causes the interface unit to display the obtained calculation result on a screen. The evaluation calculation unit 140 comprises a comparison unit 141 and an animation unit 142.

Here, the comparison unit 141 reads past layout design data stored in the storage unit 130 as past record data, performs an evaluation calculation on a plurality of layout design data including the past record data, and causes the interface unit 110 to display the calculation result on a screen in a comparative format such as a graph format. The animation unit 142 causes the interface unit 110 to perform continuous screen display of a layout diagram of log data relating to the layout design data output by the layout editing unit 120.

Specifically, the evaluation calculation unit 140 is realized by the main memory of the computer, a specialized evaluation calculation program stored therein, the CPU controlled by the program, and so on. Further, the program for realizing the evaluation calculation unit 140 may be an independent program or a part of the program for realizing the layout editing unit 120.

The CAD conversion unit 150 uses data relating to a two-dimensional CAD equipment drawing symbol and data relating to a three-dimensional CAD equipment model to convert the layout design data into a two-dimensional CAD drawing or a three-dimensional CAD model, and causes the interface unit 110 to display the result on a screen. In this embodiment, the CAD conversion unit 150 obtains the required CAD data from a two-dimensional CAD equipment drawing symbol database 160 and a three-dimensional CAD equipment model database 170, which are provided in advance on the outside of the layout design support system 100. Alternatively, CAD data may be prepared in advance within the layout design support system 100.

Specifically, the CAD conversion unit 150 is realized by the main memory of the computer, a specialized CAD conversion program stored in the main memory, the CPU controlled by the program, and so on. Further, the program for realizing the CAD conversion unit 150 may be an independent program or a part of the program for realizing the layout editing unit 120.

[Outline of Layout Editing Processing]

Figure 2:
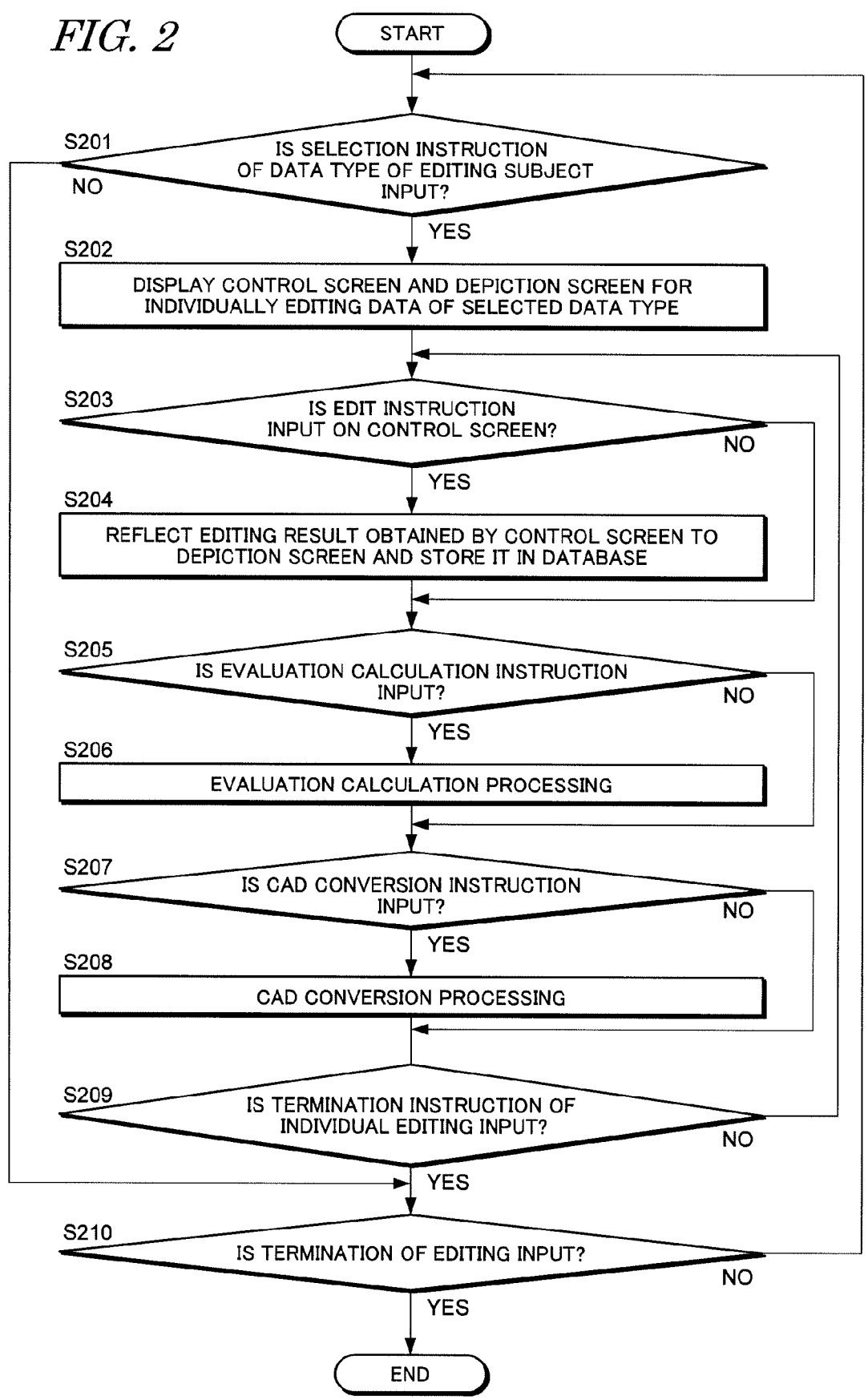
FIG. 2 is a flowchart showing an outline of layout editing processing performed by the layout design support system of FIG. 1.

FIG. 2 is a flowchart showing an outline of layout editing processing performed by the layout design support system 100 according to this embodiment. Note that in the present invention, the layout editing unit 120, evaluation calculation unit 140, and CAD conversion unit 150 cause the interface unit 110 to display control screens, depiction screens, and so on, and receive various instructions and data input through the interface unit 110 by means of an operation, performed by a designer, of an input/select list, operating button, or the like relating to an editing subject item displayed on the screen.

These operations of the interface unit 110, operation image elements displayed on the screen, and operations performed by the designer in relation thereto constitute typical interactive input/output processing through the interface unit 110. Therefore, description relating to this typical interactive input/output processing will hereafter be omitted where appropriate, and description will focus on the characteristic processing serving as the main operations of the layout editing unit 120, evaluation calculation unit 140, CAD conversion unit 150, and so on.

As shown in FIG. 2, in layout editing processing, the five data types constituting the individual editing subjects are displayed on a screen by the layout editing unit 120, and when a selection instruction relating to a specific data type is input (YES in S201), the layout editing unit 120 displays the individual editing screen of this data type relating to the layout design of a target plant. In other words, the control screen and depiction screen for individually editing data of the selected data type are displayed by the individual editing unit 121 to 125 of the selected data type (S202).

When an edit instruction is input on the displayed control screen (YES in S203), the individual editing unit 121 to 125 of the selected data type edits the layout design data in accordance with the edit instruction, transmits the obtained editing result to the depiction screen, where the result is reflected in the layout diagram, and stores the result in the database 131 to 135 of the selected data type (S204).

When an evaluation calculation instruction is input during layout editing (YES in S205), the evaluation calculation unit 140 is activated by the evaluation calculation activating unit 126 of the layout editing unit 120, and evaluation calculation processing is performed by the evaluation calculation unit 140 (S206).

In other words, the evaluation calculation unit 140 displays the control screen for evaluation calculation processing, and in accordance with an instruction input onto the control screen, performs evaluation calculation processing, including calculation of a layout design data state value or a repeated optimization calculation, using a preset algorithm. The obtained calculation result is then displayed on a screen.

Specifically, when a comparison instruction is input on the evaluation calculation processing control screen, for example, the evaluation calculation unit 140 uses the comparison unit 141 to read past layout design data stored in the storage unit 130 as past record data using the comparison unit 141, perform an evaluation calculation on a plurality of layout design data including the past record data, and display the calculation result on a screen in a comparative format such as a graph format. When a progress instruction is input, the animation unit 142 performs continuous screen display of a layout diagram of log data relating to the layout design data output by the layout editing unit 120.

When a CAD conversion instruction is input during layout editing (YES in S207), the output format switching unit 127 of the layout editing unit 120 controls the CAD conversion unit 150 to perform CAD conversion processing. In other words, the depiction screen output format is switched to a two-dimensional CAD drawing or a three-dimensional CAD model by the CAD conversion unit 150 (S208).

Although not shown in FIG. 2, when a display range modification instruction or a screen switching instruction is input during layout editing, display modification or screen switching is performed by the display range modification unit 128 or the screen switching unit 129 of the layout editing unit 120.

The layout editing unit 120 continues individual editing processing of the selected data type (S203 to S208) until an instruction to terminate individual editing processing of the selected data type is input (NO in S209). When an individual editing processing termination instruction is input (YES in S209) and a selection instruction relating to the next data type is input, individual editing processing relating to the new data type is performed.

Finally, when an editing termination instruction is input (YES in S210) following an individual editing processing termination instruction (YES in S209), the layout editing unit 120 terminates the series of layout editing processing.

[Basic Actions and Effects]

According to the embodiment described above, the following basic actions and effects are obtained.

First, by supporting the editing of specific layout design data classified appropriately and precisely into building data relating to the center lines and arrangement of the buildings, equipment arrangement data relating to the arrangement of the equipments, equipment connection data relating to the connections between the equipments, user-specified range data relating to a user-specified range limiting the arrangement and connections of the equipments, and so on, it is possible to support the creation of a detailed layout design which takes construction into account. As a result, the designer can create a detailed layout design which is suitable for construction efficiently, and calculate material amounts and costs accurately. Thus, the workload of the designer is reduced.

In particular, the center lines and arrangements of the buildings and the physical connections between the equipments can be set, and therefore a layout design which is even more appropriate for construction can be created. Moreover, the equipment connection data are further classified into equipment connection element data relating to the constitution of the physical elements connecting the equipments and equipment connection path data relating to the constitution of ancillary elements which form the paths for the equipment connection elements, and hence the designer can perform a thorough investigation into specific route designs taking conditions such as racks and trenches into account as well as the connection elements, such as pipes and cables, themselves. As a result, the designer can create a detailed layout design which is even more suitable for construction efficiently, and calculate material amounts and costs even more accurately. Thus, the workload of the designer is further reduced.

Furthermore, the data of each separate data type are edited using an individual control screen, and hence an optimum screen configuration dedicated to the data type can be provided. As a result, the designer can study the layout design data of each data type thoroughly and efficiently. Hence, the designer can create a detailed layout design which is even more suitable for construction efficiently, and calculate material amounts and costs even more accurately. Thus, the workload of the designer is further reduced.

Moreover, by employing the precisely and appropriately classified layout design data, the designer can create a detailed layout design through detailed study using only regular simple diagrams rather than a two-dimensional CAD drawing or a three-dimensional CAD model. This also reduces the workload of the designer.

On the other hand, the layout design data maybe converted into a two-dimensional CAD drawing or a three-dimensional CAD model as needed and displayed on a screen, and hence the designer can obtain a spatial grasp of the layout from the two-dimensional CAD drawing or three-dimensional CAD model during the design process as well as at the end of the design process. Therefore, substantially identical effects to those obtained in a layout design process employing a two-dimensional CAD drawing or a three-dimensional CAD model are obtained.

Further, evaluation calculation processing can be performed as needed, enabling a comparison of past record data or a continuous animation showing a diagram depiction of the layout progress to be displayed, and hence the designer can compare layout design data and view the layout progress as an animation during the design process as well as at the end of the design process. Thus, the progress of the layout design operation can be checked and evaluated as needed. Moreover, an optimal solution can be displayed by performing a repeated optimization calculation, and hence the designer can study the layout while checking the optimal solution. Hence, the layout design can also be supported by this evaluation calculation processing, enabling a further reduction in the workload of the designer.

[Details of Layout Editing Processing]

The layout editing processing described above, which is performed by the layout design support system according to this embodiment, will now be described in further detail.

[Building Data Editing Processing]

Figure 3:
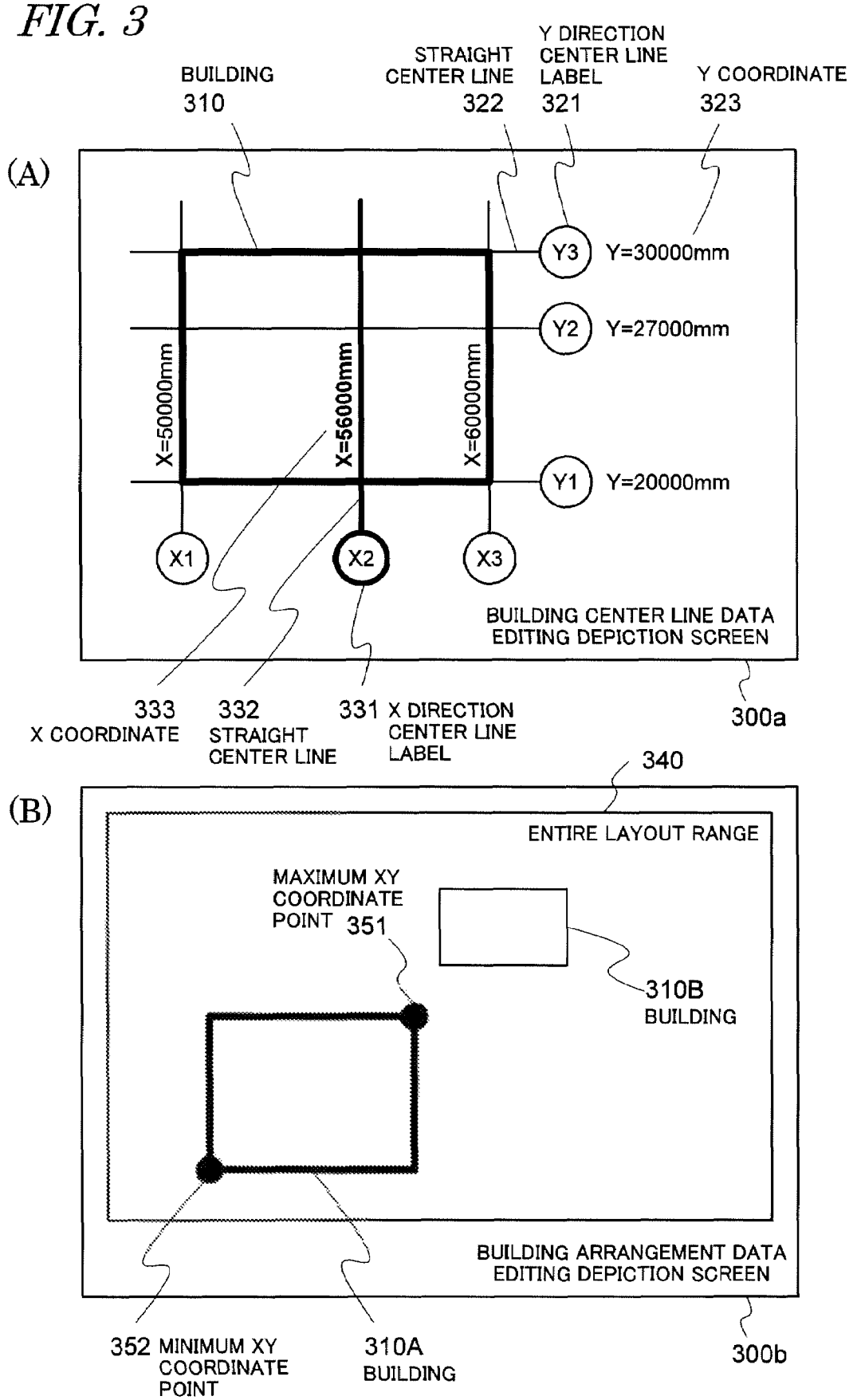
FIGS. 3A and 3B is a view showing an image display example of a depiction screen used in building data editing processing performed by a building data editing unit of FIG. 1, FIG. 3A showing a depiction screen used to edit building center line data, and FIG. 3B showing a depiction screen used to edit building arrangement data.

FIG. 3 is a view showing an image display example of a depiction screen used in building data editing processing performed by a building data editing unit 121, FIG. 3A showing a building center line data editing depiction screen 300a, and FIG. 3B showing a building arrangement data editing depiction screen 300b.

As shown in FIG. 3A, the building center line data editing depiction screen 300a comprises a building 310 expressed as a rectangle, a Y direction center line label 321 (Y1, Y2, Y3) of the building 310, a straight center line 322 thereof, a Y coordinate 323 thereof, an X direction center line label 331 (X1, X2, X3) of the building 310, a straight center line 332 thereof, and an X coordinate 333 thereof. On the depiction screen 300a, center lines that are being edited are displayed in bold.

As an example, FIG. 3A shows a case in which the building 310, the "X2" X direction center line label 331, the straight center line 332 thereof, and the X coordinate 333 thereof are being edited and are therefore displayed in bold using thick lines. Note that in this specification, the term "displayed in bold" indicates visually emphasized display of an object in a different format to peripheral objects using an arbitrary method such as line thickness, coloring, or illumination.

As shown in FIG. 3B, the building arrangement data editing depiction screen 300b comprises an entire layout range (entire site are a) 340 expressed as a rectangle, the building 310 expressed as a rectangle, and a maximum XY coordinate point 351 and minimum XY coordinate point 352, which are displayed as circles when the building 310 is displayed in bold. As an example, FIG. 3B shows a case in which a large building 310A and a small building 310B are displayed, the larger building 310A is being edited and is therefore displayed in bold, and the maximum XY coordinate point 351 and minimum XY coordinate point 352 of the building 310A are displayed.

FIG. 4 is a view showing a functional configuration example of a control screen used in the building data editing processing performed by the building data editing unit 121, FIG. 4A showing a building center line data editing control screen 400a, and FIG. 4B showing a building arrangement data editing control screen 400b.

As shown in FIG. 4A, the building center line data editing control screen 400a comprises a center line data editing select/display field 411 for selecting a function for editing building center line data relating to the center line of the building. The building center line data editing control screen 400a also comprises a center line name select/display field 412 for displaying, selecting, or changing a center line name, a center line direction select/display field 413 for displaying and correcting the direction of a center line specified on the center line name select/display field 412, and a center line offset value select/display field 414 for displaying and correcting an offset position from the origin of the center line specified on the center line name select/display field 412.

The building center line data editing control screen 400a further comprises a center line correction button 415, a center line addition button 416, and a center line deletion button 417 for correcting, adding, or deleting a center line specified on the center line name select/display field 412 to or from the depiction screen 300a shown in FIG. 3A. Here, the center line correction button 415 serves as means for correcting the specified center line in accordance with the content set on the center line direction select/display field 413 and the center line offset value select/display field 414.

The building center line data editing control screen 400a further comprises a center line data update button 418 for obtaining data relating to the position and dimensions of the center line edited on the control screen 400a and reflecting these data in the building database 131 as a building center line data editing result.

As shown in FIG. 4B, the building arrangement data editing control screen 400b comprises a building arrangement data editing select/display field 421 for selecting a function for editing building arrangement data relating to the arrangement of the buildings. The building arrangement data editing control screen 400b also comprises a building name select/display field 422 for displaying, selecting, or changing a building name, a building arrangement select/display field 423 for displaying and correcting building arrangement information specified on the building name select/display field 422, and a building arrangement reference point select/display field 424 for showing whether a reference point of the building arrangement information displayed by the building arrangement select/display field 423 is at a minimum value or a maximum value of the arrangement, and correcting the reference point.

The building arrangement data editing control screen 400b further comprises a building correction button 425, a building addition button 426, and a building deletion button 427 for correcting, adding, or deleting a building specified on the building name select/display field 422 to or from the depiction screen 300b shown in FIG. 3B. Here, the building correction button 425 serves as means for correcting the specified building in accordance with the content set on the building arrangement select/display field 423 and the building arrangement reference point select/display field 424.

The building arrangement data editing control screen 400b further comprises a building arrangement data update button 428 for obtaining data relating to the position and dimensions of the building edited on the control screen 400b and reflecting these data in the building database 131 as a building arrangement data editing result.

The building data editing unit 121 performs individual data editing processing using individual depiction screens and control screens such as those described above to edit the building center line data and the building arrangement data. As a result, the designer can study data relating to the center lines of the buildings and data relating to the arrangement of the buildings efficiently and thoroughly. Hence, the designer can create a detailed layout design which is suitable for construction efficiently, and calculate material amounts and costs accurately. Thus, the workload of the designer is reduced.

[Equipment Arrangement Data Editing Processing]

FIG. 5 is a view showing an image display example of a depiction screen used in equipment arrangement data editing processing performed by the equipment arrangement data editing unit 122, FIG. 5A showing an equipment arrangement data editing depiction screen 500, and FIG. 5B showing an example of a data editing operation performed on the equipment arrangement data editing depiction screen 500.

As shown in FIG. 5A, the equipment arrangement data editing depiction screen 500 comprises equipments 510 expressed as rectangles and circles, an interference prohibition are a range 520 expressed as a rectangle or a circle, and an equipment noise are a range 530 expressed as a rectangle or a circle. The interference prohibition are a range 520 and noise are a range 530 are attributes existing only in specific equipments, and in the example shown in FIG. 5A, an interference prohibition are a range 520B and a noise are a range 530B exist in relation to a single rectangular equipment 510B.

On the depiction screen 500, the equipment 510 is being edited and is therefore displayed in bold. The equipment 510 further comprises, as ancillary elements displayed only when the equipment 510 is displayed in bold, a name label 541, an arrangement point 542 displayed as a circle, and an arrangement direction arrow 543 expressing the arrangement direction.

As an example, FIG. 5A shows a case in which four rectangular equipments 510A to 510D having different dimensions and one circular equipment 510E are displayed. The centrally disposed rectangular equipment 510B is being edited and is therefore displayed in bold using thick lines. The name label 541, arrangement point 542, and arrangement direction arrow 543 of the equipment 510B are also displayed. As shown in FIG. 5B, each building 510 is rotatable about the arrangement point 542.

FIG. 6 is a view showing a functional configuration example of a control screen used in the equipment arrangement data editing processing performed by the equipment arrangement data editing unit 122, FIG. 6A showing an equipment arrangement data editing control screen 600a, and FIG. 6B showing an equipment attribute data editing control screen 600b.

As shown in FIG. 6A, the equipment arrangement data editing control screen 600a comprises an equipment name select/display field 611 for displaying, selecting, or changing an equipment name, and an equipment attribute editing select/display field 612 for selecting a function for editing equipment attribute data relating to the attributes of the equipment specified on the equipment name select/display field 611, and displaying the equipment attribute data editing control screen 600b.

The equipment arrangement data editing control screen 600a further comprises an equipment arrangement select/display field 613 for displaying and correcting the arrangement position and arrangement angle of the equipment specified on the equipment name select/display field 611, an equipment shape/dimension select/display field 614 for displaying and correcting the shape and dimensions of the equipment specified on the equipment name select/display field 611, and a parent building select/display field 615 for registering the name of the building to which the equipment specified on the equipment name select/display field 611 belongs when the equipment belongs to a building.

The equipment arrangement data editing control screen 600a further comprises a CAD equipment select/display field 616 for selecting the two-dimensional CAD equipment drawing symbol or three-dimensional equipment model associated with the equipment specified on the equipment name select/display field 611, and displaying the symbol name or model name thereof. The CAD equipment select/display field 616 serves as means for realizing the functions of the output format switching unit 127 on the control screen 600a, and by controlling the CAD conversion unit 150, a two-dimensional CAD equipment drawing symbol or a three-dimensional equipment model is displayed on the depiction screen 500 shown in FIG. 5A.

The equipment arrangement data editing control screen 600a further comprises an equipment correction button 617, an equipment addition button 618, and an equipment deletion button 619 for correcting, adding, or deleting an equipment specified on the equipment name select/display field 611 to or from the depiction screen 500 shown in FIG. 5A. Here, the equipment correction button 617 serves as means for correcting the specified equipment in accordance with the content set on the equipment attribute data editing control screen 600b, the equipment arrangement select/display field 613, the equipment shape/dimension select/display field 614, and the parent building select/display field 615.

The equipment arrangement data editing control screen 600a further comprises a display range select/display field 620 for selecting the entire layout range (entire site are a) or the building range as the display range, and changing the display angle of the display range. Here, the display range select/display field 620 serves as means for realizing the functions of the display range modification unit 128 on the control screen 600a so that for example, the display range is switched between an entire layout range depiction screen 700a and a building range depiction screen 700b shown in FIG. 7, and the display angle is switched between the building range depiction screen 700b and a building range depiction screen 700c shown in FIG. 7.

Figure 7:
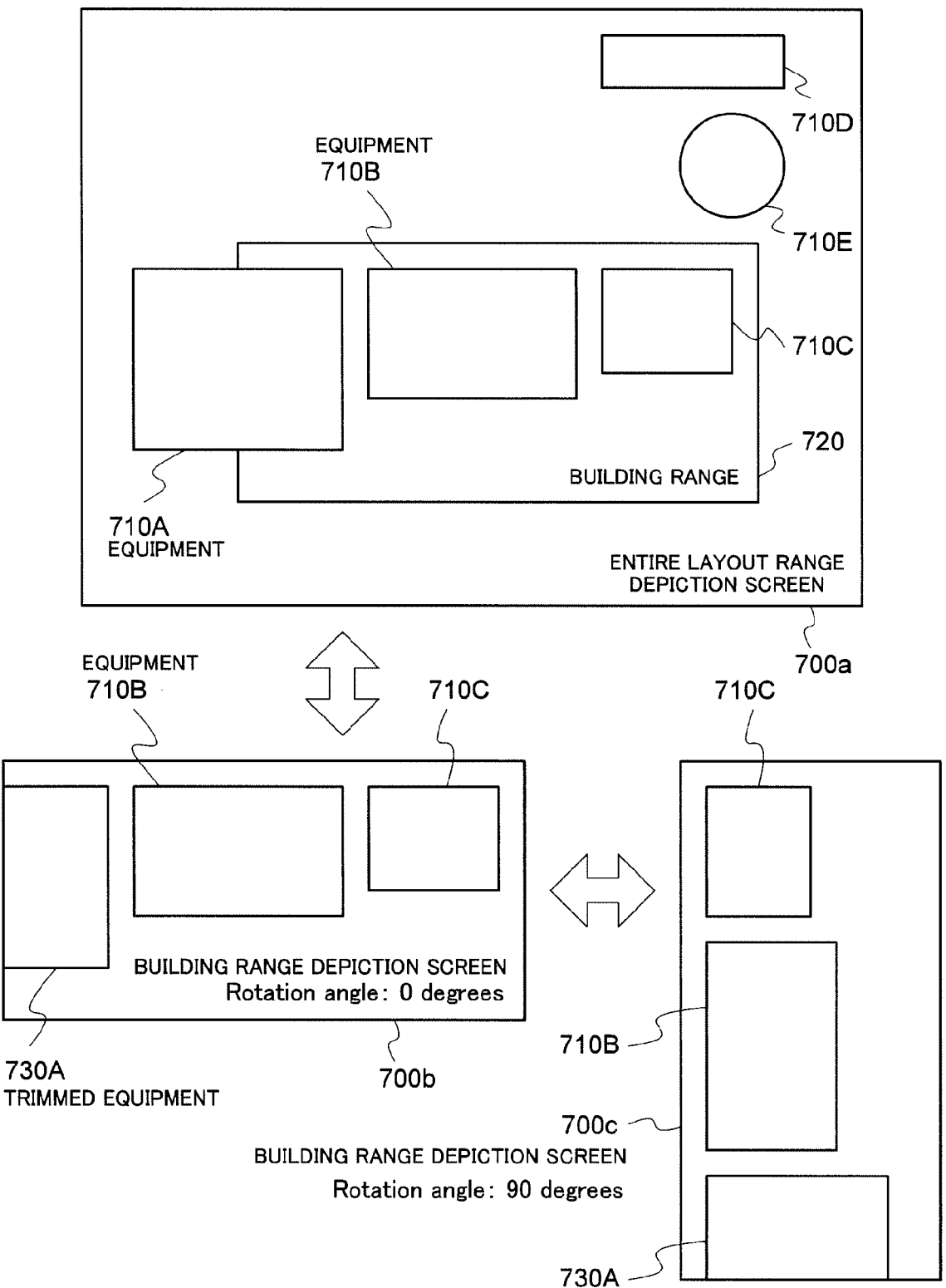
FIG. 7 is a view showing the manner in which a display range is switched by a display range modification unit of FIG. 1.

The entire layout range depiction screen 700a shown in FIG. 7 comprises equipments 710 expressed as rectangles and circles, and a building range 720 expressed as a rectangle. As an example, FIG. 7 shows a case in which four rectangular equipments 710A to 710D having different dimensions and one circular equipment 710E are displayed within the entire layout range. Three of the equipments 710A to 710C are disposed inside the building range 720, and one of these equipments 710A is disposed so as to straddle the boundary line of the building range 720 such that approximately half of the equipment 710A protrudes from the building range 720.

In this case, on the building range depiction screens 700b, 700c, the part of the equipment 710A that protrudes from the building range 720 is trimmed away and only the part within the building range 720 is displayed as a trimmed equipment 730A. Hence, by appropriately switching between the entire layout range depiction screen 700a and the building range depiction screen 700b and comparing the two, the designer can easily learn that the equipment 710A is protruding from the building range 720, and that the arrangement of the equipments or buildings needs to be changed.

Further, the equipment arrangement data editing unit 122 or display range modification unit 128 may display the equipment 730A in bold or provide a notification or warning of the fact that the equipment 730A does not fit into the building range 720 or the need to change the arrangement of the equipments or buildings in the form of a message or the like. By providing this notification or warning, the designer can be prompted to investigate a rational equipment arrangement.

Returning to FIG. 6A, the equipment arrangement data editing control screen 600a further comprises an equipment arrangement data update button 621 for obtaining data relating to the position and dimensions of the equipment edited on the control screen 600a and reflecting these data in the equipment arrangement database 132 as an equipment arrangement data editing result.

As shown in FIG. 6B, the equipment attribute data editing control screen 600b comprises a product information select/display field 631 for displaying and correcting product information relating to the equipment specified on the equipment name select/display field 611 such as the amount, delivery date, manufacturer, and cost. The equipment attribute data editing control screen 600b further comprises an interference prohibition are a information select/display field 632 for displaying and correcting dimension information relating to the interference prohibition are a of the equipment specified on the equipment name select/display field 611, and a noise information select/display field 633 for displaying and correcting dimension information relating to the are a affected by the noise of the equipment specified on the equipment name select/display field 611, or information relating to the sound pressure level of the noise. The equipment attribute data editing control screen 600b further comprises a constraint information select/display field 634 for displaying and correcting constraint information required for optimization calculation of the equipment specified on the equipment name select/display field 611.

The equipment arrangement data editing unit 122 performs individual data editing processing using individual control screens and a common depiction screen such as those described above to edit the equipment arrangement data and the equipment attribute data. As a result, the designer can study data relating to the equipment arrangement and detailed data relating to the attributes of each equipment efficiently and thoroughly. Hence, the designer can create a detailed layout design which is suitable for construction efficiently, and calculate material amounts and costs accurately. Thus, the workload of the designer is reduced.

Note that by operating the equipment arrangement data update button 621 on the control screen 600*a*, the results of the equipment arrangement data editing processing performed on the control screens 600*a*, 600*b* shown in FIG. 6 are stored in the equipment arrangement database 132 as updated equipment arrangement data.

Figure 8:
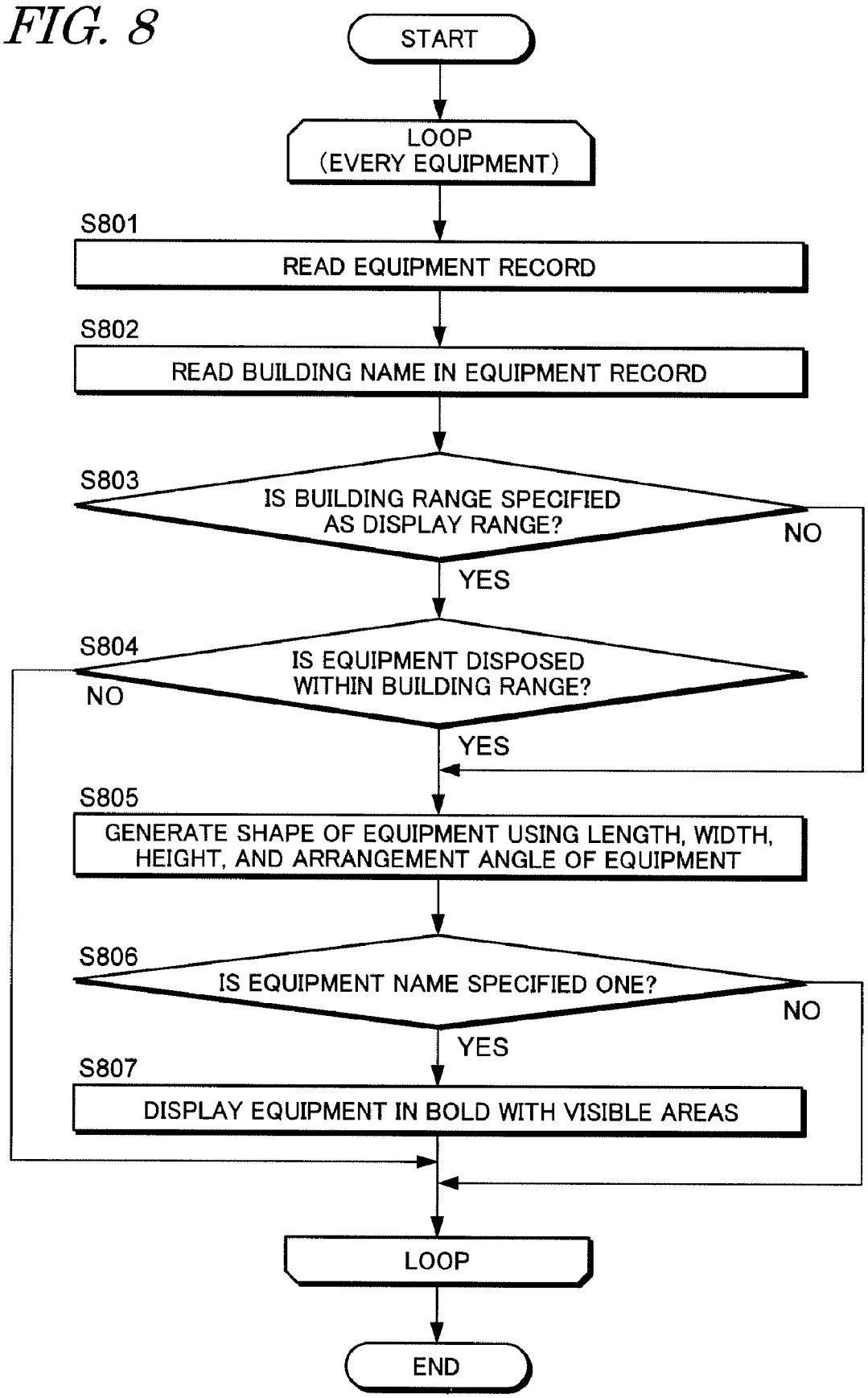
FIG. 8 is a flowchart showing a flow of display processing when the equipment arrangement data, which are stored in an equipment arrangement database of FIG. 1, are read and an equipment is displayed on a depiction screen.

FIG. 8 is a flowchart showing the flow of display processing when the equipment arrangement data, which are stored in the equipment arrangement database 132, are read and an equipment is displayed on the depiction screen 500 shown in FIG. 5. As shown in FIG. 8, equipment display is performed in the following manner as a loop process (LOOP) executed in units of the equipment records stored in the equipment arrangement database 132.

First, a record relating to each equipment is read from the equipment arrangement database 132 in record sequence (S801), whereupon the building name registered in the equipment record is read (S802). When the building range is specified as the display range (YES in S803), the shape of the equipment is generated (S805) using the length, width, height, and arrangement angle of the equipment only if the equipment is disposed within the specified building range (YES in S804). When the building range is not specified as the display range (NO in S803), the shape of the equipment is generated as is (S805).

When the equipment name of the equipment corresponds to the equipment name specified on the equipment name select/display field 611 (YES in S806), the equipment is displayed in bold, similarly to the equipment 510B shown in FIG. 5A, together with visible are as such as the interference prohibition are a range 520B and noise are a range 530B, which are required for study of the equipment (S807).

When the loop process described above has been repeated for the records of all of the equipments registered in the equipment arrangement data and all of the equipments have been displayed, the processing ends. Note that when the display of the depiction screen 500 is modified by adding, correcting, or deleting an equipment on the control screen 600*a* during equipment arrangement data editing processing, the equipment arrangement database 132 is modified in relation to the corresponding equipment, whereupon the loop process described above is executed on the record of the corresponding equipment alone.

[Equipment Connection Element Data Editing Processing]

FIG. 9 is a view showing an image display example of a depiction screen used in the equipment connection element data editing processing performed by the equipment connection element data editing unit 123, FIG. 9A showing an equipment connection element data editing depiction screen 900, and FIG. 9B showing an example of a data editing operation performed on the equipment connection element data editing depiction screen 900.

As shown in FIG. 9A, the equipment connection element data editing depiction screen 900 comprises equipments 910 expressed as rectangles and circles, and an equipment connection element 920 expressed as an arrow connecting the equipments 910. Here, the equipment connection element 920 does not only connect equipments to each other, but also connects buildings to each other and connects equipments to buildings. Further, the equipment connection element 920 is being edited, and is therefore displayed in bold. An arrangement point 911 and an arrangement direction arrow 912 of the equipment 910 connected by the equipment connection element 920 are also displayed.

As shown in FIG. 9B, the connection point of the equipment connection element 920 is selected from four locations, namely the front 931, rear 932, left side 933, and right side 934 of the equipment arrangement direction. As an example, FIG. 9A shows a case in which three equipments 910B to 910D are displayed and the left side of the equipment 910B is connected to the right side of the equipment 910D by the equipment connection element 920, with the equipment 910B serving as an upstream connected equipment and the equipment 910D serving as a downstream connected equipment.

Alternatively, arbitrary connection points may be set for each equipment instead of employing the four connection points to the front, rear, left, and right of the equipment. For example, by specifying the connection point of the equipment 910 on the depiction screen, the coordinate position of the specified connection point can be calculated from the equipment arrangement data.

In either case, by selecting the connection point of the equipment 910, the position and dimensions of the equipment connection element 920 can be set on the basis of the coordinate position of the connection point, and hence the arrangement and length of the piping, cables, and so on can be set.

FIG. 10 is a view showing a functional configuration example of a control screen used in the equipment connection element data editing processing performed by the equipment connection element data editing unit 123, FIG. 10A showing an equipment connection element data editing control screen 1000*a*, and FIG. 10B showing a connection attribute data editing control screen 1000*b*.

As shown in FIG. 10A, the equipment connection element data editing control screen 1000*a* comprises a connection name select/display field 1011 for displaying, selecting, and changing a connection name, and a connection attribute editing select/display field 1012 for selecting a function for editing connection attribute data relating to the attributes of a connection specified on the connection name select/display field 1011, and displaying the connection attribute data editing control screen 1000*b*.

The equipment connection element data editing control screen 1000*a* further comprises a connection mode select/display field 1013 for displaying and correcting the mode (pipe, cable, etc.) of the connection specified on the connection name select/display field 1011, and a connection level select/display field 1014 for displaying and correcting the connection level of the connection specified on the connection name select/display field 1011. The equipment connection element data editing control screen 1000*a* further comprises a connection destination equipment select/display field 1015 for displaying and correcting the name and connection port of the upstream connected equipment and the name and connection port of the downstream connected equipment relating to the connection specified on the connection name select/display field 1011, and an interference select/display field 1016 for deciding whether or not to allow interference between the connection specified on the connection name select/display field 1011 and another connection.

The equipment connection element data editing control screen 1000*a* further comprises a connection correction button 1017, a connection addition button 1018, and a connection deletion button 1019 for correcting, adding, or deleting an equipment connection element specified on the connection name select/display field 1011 to or from the depiction screen 1000*a* shown in FIG. 9A. Here, the connection correction button 1017 serves as means for correcting the specified connection in accordance with the content set on the connection attribute data editing control screen 1000*b*, the connection mode select/display field 1013, the connection level select/display field 1014, the connection destination equipment select/display field 1015, and the interference select/display field 1016.

The equipment connection element data editing control screen 1000*a* further comprises a display range select/display field 1020 for selecting the entire layout range (entire site area) or the building range as the display range, and changing the display angle of the display range. Here, the display range select/display field 1020 serves as means for realizing the functions of the display range modification unit 128 on the control screen 1000*a* so that the display range is switched between the entire layout range depiction screen 700*a* and building range depiction screen 700*b* shown in FIG. 7, and the display angle is switched between the building range depiction screens 700*b*, 700*c* shown in FIG. 7.

The equipment connection element data editing control screen 1000*a* further comprises an equipment connection element data update button 1021 for obtaining data relating to the position and dimensions of the equipment connection element edited on the control screen 1000*a* and reflecting these data in the equipment connection element database 133 as an equipment connection element data editing result.

As shown in FIG. 10B, the connection attribute data editing control screen 1000*b* comprises a product information select/display field 1031 for displaying and correcting product information relating to the connection specified on the connection name select/display field 1011 such as the sectional width, height, weight, and cost. The connection attribute data editing control screen 1000*b* further comprises a constraint information select/display field 1032 for displaying and correcting constraint information required for optimization calculation of the connection specified on the connection name select/display field 1011. The connection attribute data editing control screen 1000*b* further comprises a connection path name select/display field 1033 for displaying and correcting a connection path name of the connection specified on the connection name select/display field 1011 and information relating to control points (nodes) thereof.

The equipment connection element data editing unit 123 performs individual data editing processing using individual control screens such as those described above to edit the equipment connection element data and the connection attribute data. As a result, the designer can study data relating to the equipment connection elements and detailed data relating to the attributes of each connection efficiently and thoroughly. Hence, the designer can create a detailed layout design which is suitable for construction efficiently, and calculate material amounts and costs accurately. Thus, the workload of the designer is reduced.

Note that by operating the equipment connection element data update button 1021 on the control screen 1000*a*, the results of the equipment connection element data editing processing performed on the control screens 1000*a*, 1000*b* shown in FIG. 10 are stored in the equipment connection element database 133 as updated equipment connection element data.

Figure 11:
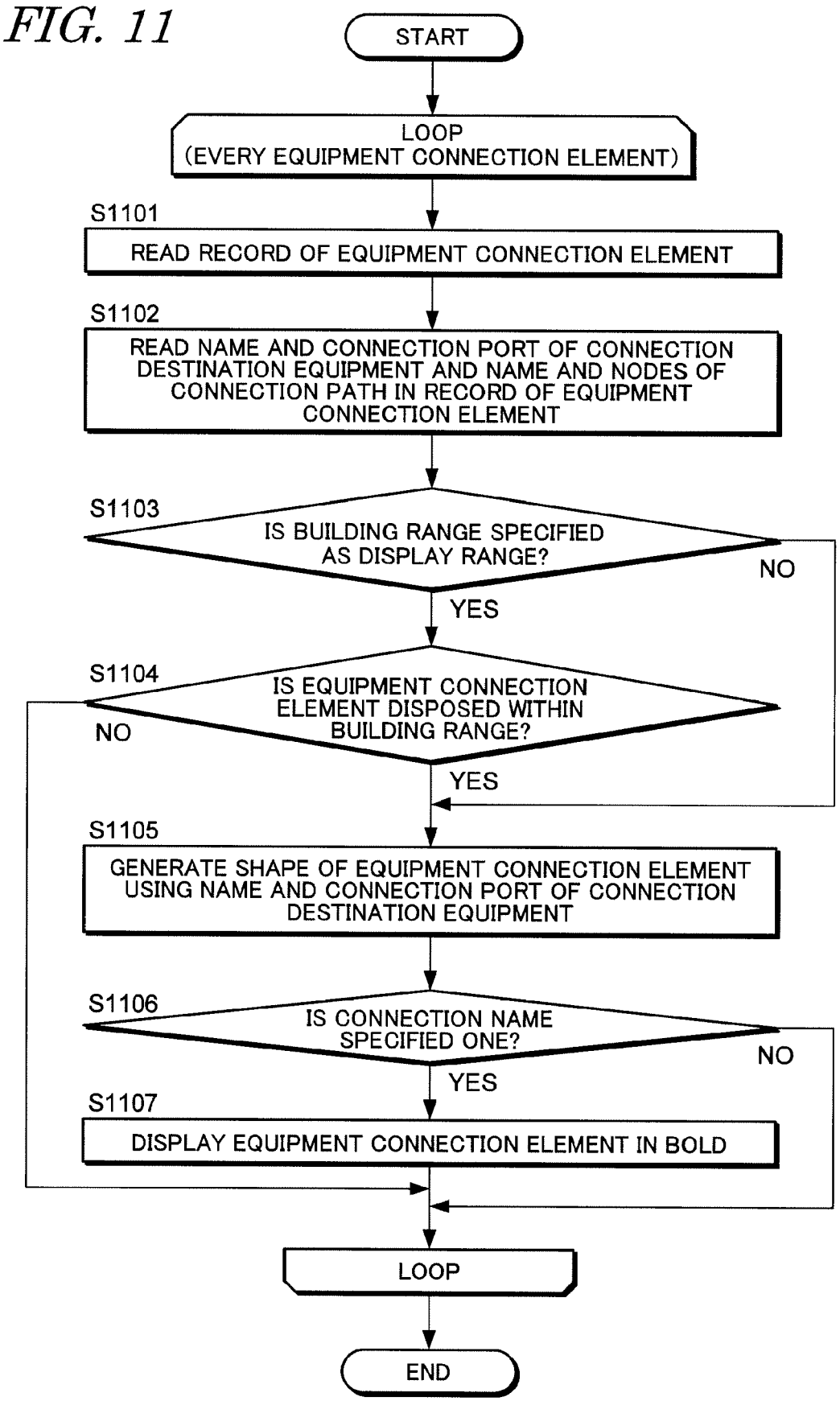
FIG. 11 is a flow chart showing a flow of display processing when the equipment connection element data, which are stored in an equipment connection element database of FIG. 1, are read and an equipment connection element is displayed on a depiction screen.

FIG. 11 is a flowchart showing the flow of display processing when the equipment connection element data, which are stored in the equipment connection element database 133, are read and an equipment connection element is displayed on the depiction screen 900 shown in FIG. 9. As shown in FIG. 11, equipment connection element display is performed in the following manner as a loop process (LOOP) executed in units of the equipment connection element records stored in the equipment connection element database 133.

First, a record relating to each equipment connection element is read from the equipment connection element database 133 in record sequence (S1101), whereupon the name and connection port of the connection destination equipment and the name and nodes of the connection path, which are registered in the record of the equipment connection element, are read (S1102) When the building range is specified as the display range (YES in S1103), the shape of the equipment connection element is generated (S1105) using the name and connection port of the connection destination equipment only if the equipment connection element is disposed within the specified building range (YES in S1104). When the building range is not specified as the display range (NO in S1103), the shape of the equipment is generated as is (S1105).

When the connection name of the equipment connection element corresponds to the connection name specified on the connection name select/display field 1011 (YES in S1106), the equipment connection element is displayed in bold, similarly to the equipment connection element 920 shown in FIG. 9A (S1107).

When the loop process described above has been repeated for the records of all of the equipment connection elements registered in the equipment connection element data and all of the equipment connection elements have been displayed, the processing ends. Note that when the display of the depiction screen 900 is modified by adding, correcting, or deleting an equipment connection element on the control screen 1000*a* during equipment connection element data editing processing, the equipment connection element database 133 is updated in relation to the corresponding equipment connection element, whereupon the loop process described above is executed on the record of the corresponding equipment connection element alone.

[Equipment Connection Path Data Editing Processing]

Figure 12:
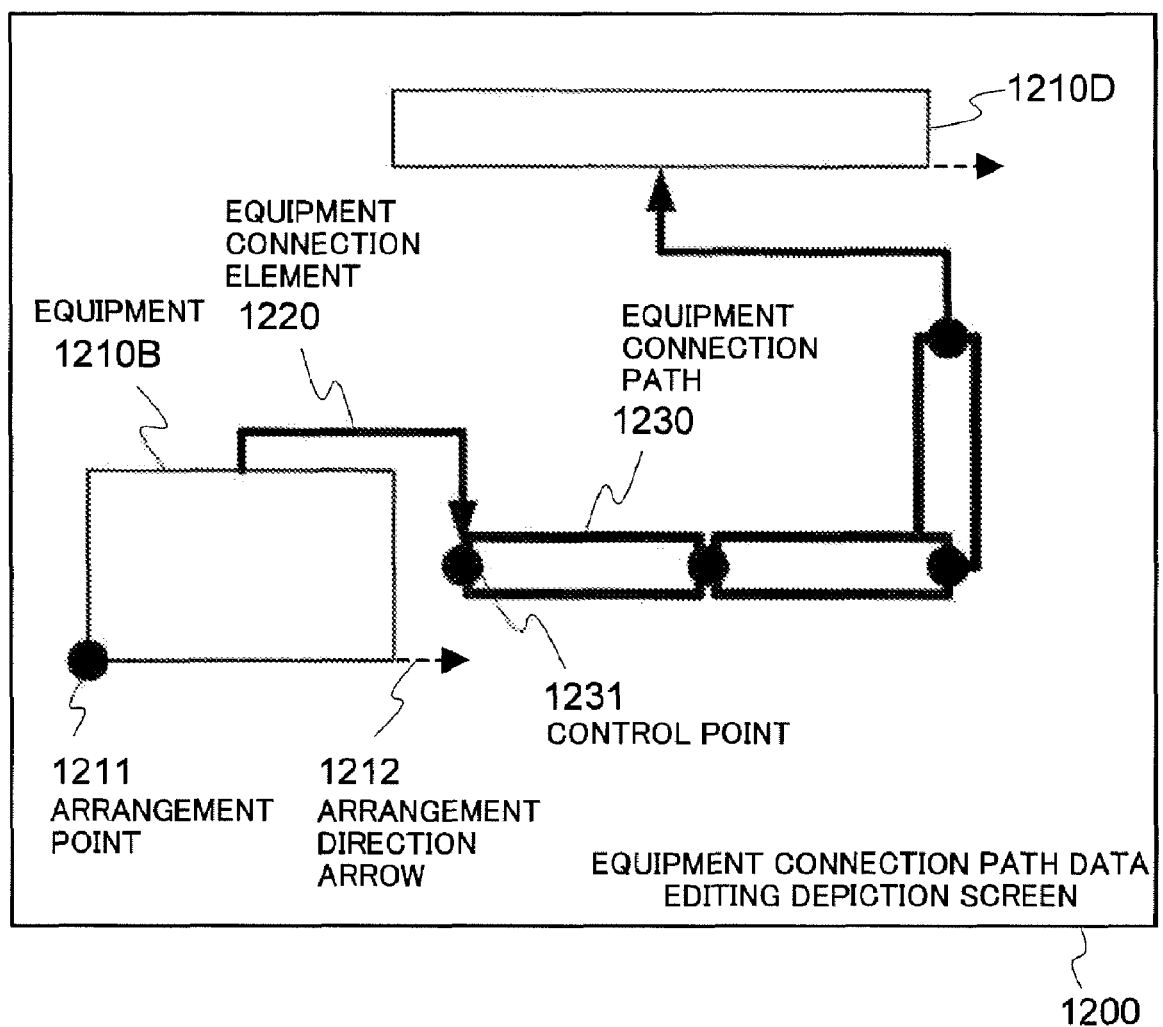
FIG. 12 is a view showing an image display example of a depiction screen used in equipment connection path data editing processing performed by an equipment connection path data editing unit of FIG. 1.

FIG. 12 is a view showing an image display example of a depiction screen 1200 used in equipment connection path data editing processing performed by the equipment connection path data editing unit 124.

As shown in FIG. 12, the equipment connection path data editing depiction screen 1200 comprises equipments 1210 expressed as rectangles and circles, an equipment connection element 1220 connecting the equipments 1210, and an equipment connection path 1230 expressed as a rectangle, which serves as the path of the equipment connection element 1220. In the depiction screen 1200, the equipment connection path 1230 is being edited and is therefore displayed in bold. The equipment connection path 1230 further comprises coordinate-movable control points (nodes) 1231 as ancillary elements displayed when the equipment connection path 1230 is displayed in bold. The equipment connection path 1230 is set by selecting the position of the control points 1231.

As an example, FIG. 12 shows a case in which two equipments 1210B, 1210D are displayed, the left side of the equipment 1210B is connected to the right side of the equipment 1210D by the equipment connection element 1220, with the equipment 1210B serving as an upstream connected equipment and the equipment 1210D serving as a downstream connected equipment, and the equipment connection element 1220 follows the equipment connection path 1230.

FIG. 13 is a view showing a functional configuration example of a control screen used in the equipment connection path data editing processing performed by the equipment connection path data editing unit 124, FIG. 13A showing an equipment connection path data editing control screen 1300*a*, and FIG. 13B showing a connection path attribute data editing control screen 1300*b*.

As shown in FIG. 13A, the equipment connection path data editing control screen 1300*a* comprises a connection path name select/display field 1311 for displaying, selecting, and changing the name of a connection path, and a connection attribute editing select/display field 1312 for selecting a function for editing connection path attribute data relating to the attributes of a connection path specified on the connection path name select/display field 1311, and displaying the connection path attribute data editing control screen 1300*b*.

The equipment connection path data editing control screen 1300*a* further comprises a connection path mode select/display field 1313 for displaying and correcting the mode (rack, trench, etc.) of the connection path specified on the connection path name select/display field 1311, and a control point name select/display field 1314 for displaying and correcting the name of a control point of the connection path specified on the connection path name select/display field 1311.

The equipment connection path data editing control screen 1300*a* further comprises a control point coordinate select/display field 1315 for displaying and correcting the coordinates of a control point (node) of the connection path specified on the connection path name select/display field 1311 and the control point name select/display field 1314, and a coordinate notation select/display field 1316 for deciding whether to set the coordinate from the control point coordinate select/display field 1315 at an offset notation from the center line or an absolute coordinate.

The equipment connection path data editing control screen 1300*a* further comprises a front-rear relationship select/display field 1317 for specifying a leading node and a following node of the control point of the connection path specified on the connection path name select/display field 1311 and the control point name select/display field 1314, and a parent building select/display field 1318 for registering the name of the building to which the control point (node) of the connection path specified on the specified on the connection path name select/display field 1311 and the control point name select/display field 1314 when the control point belongs to a building.

The equipment connection path data editing control screen 1300*a* further comprises a connection path correction button 1319, a connection path addition button 1320, and a connection path deletion button 1321 for correcting, adding, or deleting the connection path specified on the connection path name select/display field 1311 to or from the depiction screen 1200 shown in FIG. 12. Here, the connection path correction button 1319 serves as means for correcting the specified connection path in accordance with the content set on the connection path attribute data editing control screen 1300*b*, the connection path mode select/display field 1313, the control point name select/display field 1314, the control point coordinate select/display field 1315, the coordinate notation select/display field 1316, the front-rear relationship select/display field 1317, and the parent building select/display field 1318.

The equipment connection path data editing control screen 1300*a* further comprises a display range select/display field 1322 for selecting the entire layout range (entire site area) or the building range as the display range, and changing the display angle of the display range. Here, the display range select/display field 1322 serves as means for realizing the functions of the display range modification unit 128 on the control screen 1300*a* so that the display range is switched between the entire layout range depiction screen 700*a* and building range depiction screen 700*b* shown in FIG. 7, and the display angle is switched between the building range depiction screens 700*b*, 700*c* shown in FIG. 7.

The equipment connection path data editing control screen 1300*a* further comprises an equipment connection path data update button 1323 for obtaining data relating to the position and dimensions of the equipment connection path edited on the control screen 1300*a* and reflecting these data in the equipment connection path database 134 as an equipment connection path data editing result.

As shown in FIG. 13B, the connection path attribute data editing control screen 1300*b* comprises a product information select/display field 1331 for displaying and correcting product information relating to the connection path specified on the connection path name select/display field 1311 such as the sectional width, height, weight, and cost. The connection path attribute data editing control screen 1300*b* further comprises a constraint information select/display field 1332 for displaying and correcting constraint information required for optimization calculation of the connection path specified on the connection path name select/display field 1311.

The equipment connection path data editing unit 124 performs individual data editing processing using individual control screens such as those described above to edit the equipment connection path data and the connection path attribute data. As a result, the designer can study data relating to the equipment connection paths and detailed data relating to the attributes of each connection path efficiently and thoroughly. Hence, the designer can create a detailed layout design which is suitable for construction efficiently, and calculate material amounts and costs accurately. Thus, the workload of the designer is reduced even further.

Note that by operating the equipment connection path data update button 1323 on the control screen 1300*a*, the results of the equipment connection path data editing processing performed on the control screens 1300*a*, 1300*b* shown in FIG. 13 are stored in the equipment connection path database 134 as updated equipment connection path data.

Figure 14:
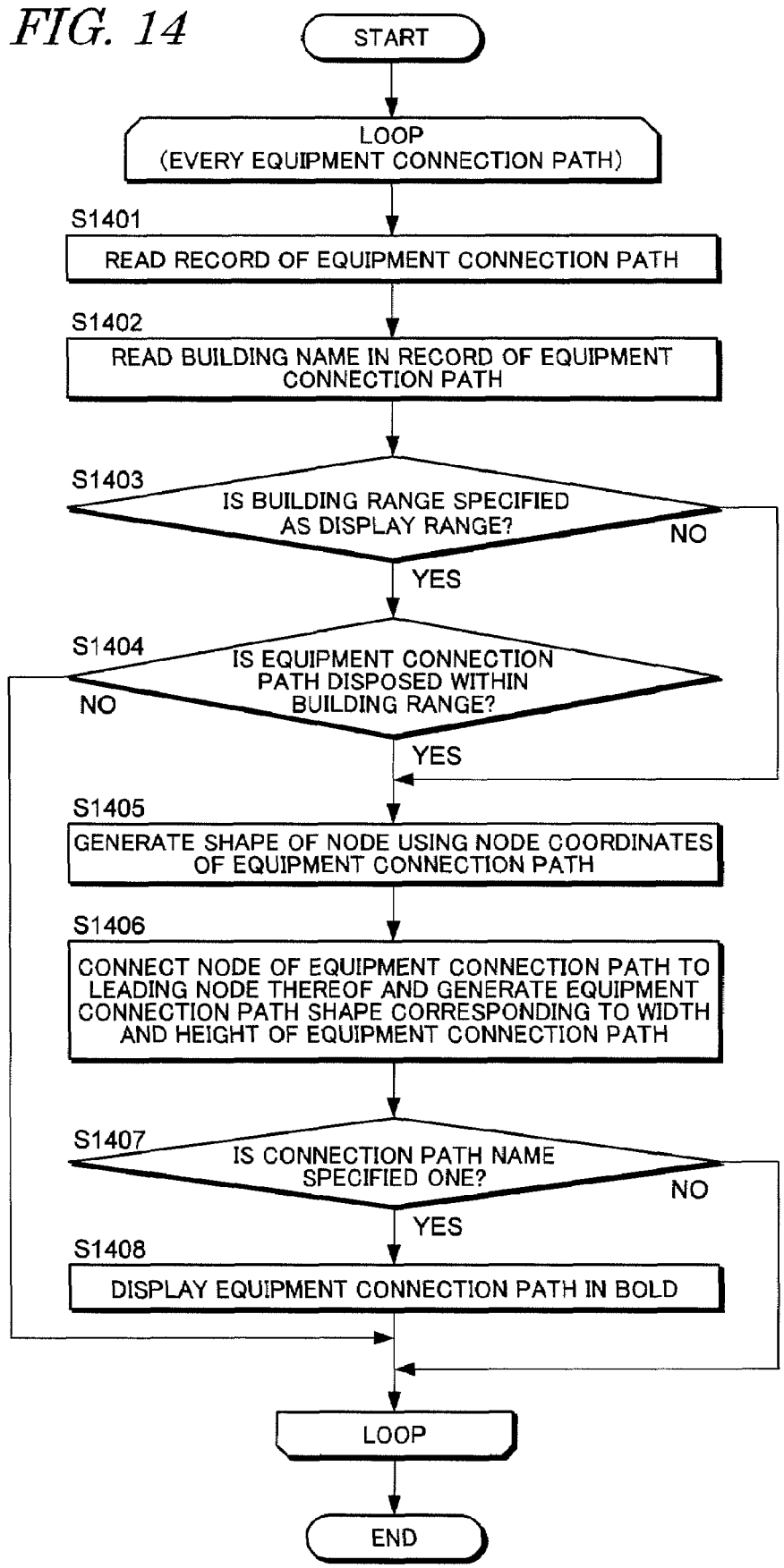
FIG. 14 is a flow chart showing a flow of display processing when the equipment connection path data, which are stored in an equipment connection path database of FIG. 1, are read and an equipment connection path is displayed on a depiction screen.

FIG. 14 is a flowchart showing the flow of display processing when the equipment connection path data, which are stored in the equipment connection path database 134, are read and an equipment connection path is displayed on the depiction screen 1200 shown in FIG. 12. As shown in FIG. 14, equipment connection path display is performed in the following manner as a loop process (LOOP) executed in units of the equipment connection path records stored in the equipment connection path database 134.

First, a record relating to each equipment connection path is read from the equipment connection path database 134 in record sequence (S1401), whereupon the building name registered in the record of the equipment connection path is read (S1402). When the building range is specified as the display range (YES in S1403), the shape of the node is generated (S1405) using the node coordinates of the equipment connection path only if the equipment connection path is disposed within the specified building range (YES in S1404). When the building range is not specified as the display range (NO in S1403), the shape of the node is generated as is (S1405).

Next, the node of the equipment connection path is connected to a node corresponding to the leading node thereof, and an equipment connection path shape corresponding to the width and height of the equipment connection path is generated (S1406). When the connection path name of the equipment connection path corresponds to the connection path name specified on the connection path name select/display field 1311 (YES in S1407), the equipment connection path is displayed in bold, similarly to the equipment connection path 1230 shown in FIG. 12 (S1408).

When the loop process described above has been repeated for the records of all of the equipment connection paths registered in the equipment connection path data and all of the equipment connection paths have been displayed, the processing ends. Note that when the display of the depiction screen 1200 is modified by adding, correcting, or deleting an equipment connection path on the control screen 1300a during equipment connection path data editing processing, the equipment connection path database 134 is updated in relation to the corresponding equipment connection path, whereupon the loop process described above is executed on the record of the corresponding equipment connection path alone.

[User-Specified Range Data Editing Processing]

Figure 15:
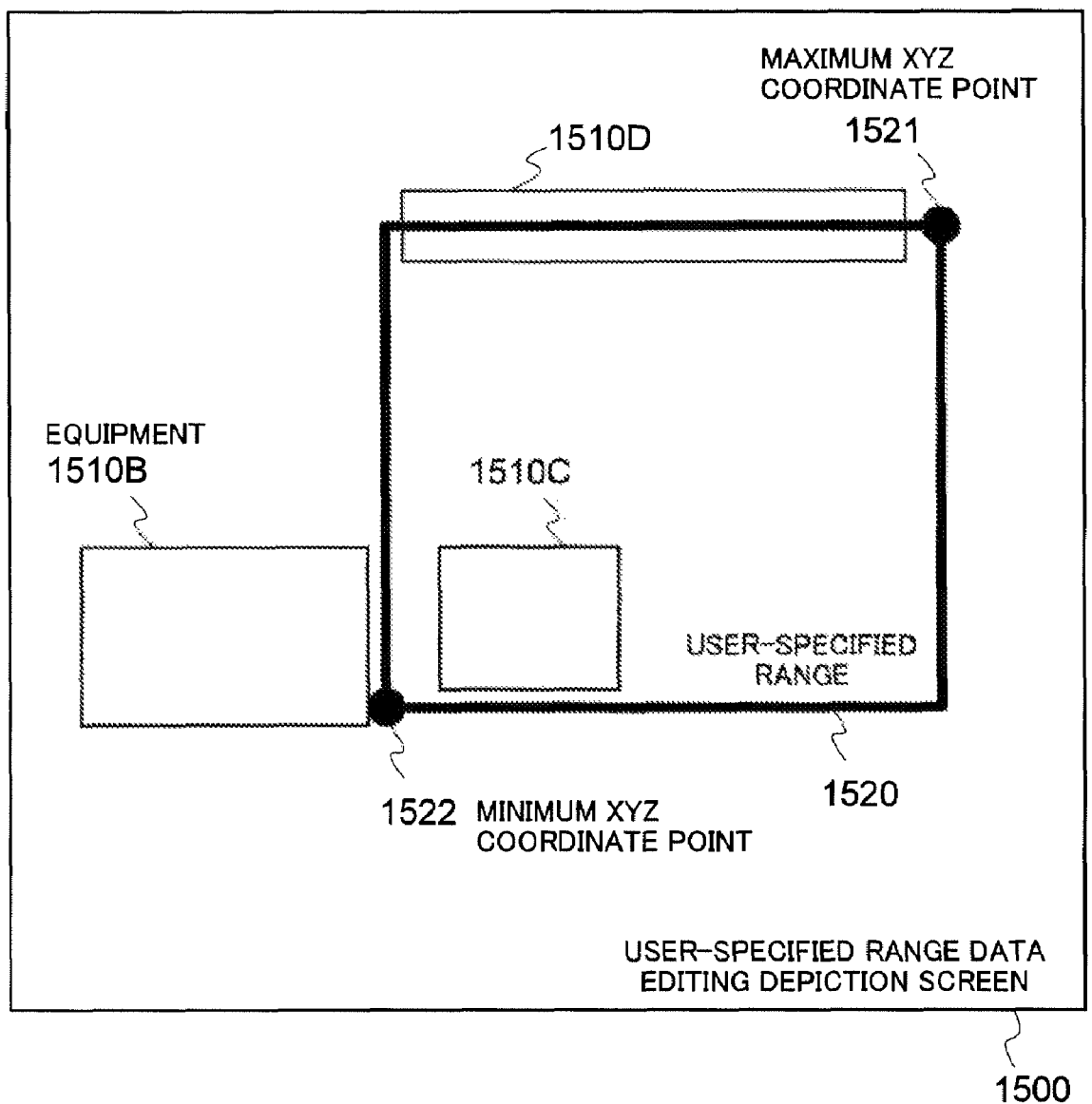
FIG. 15 is a view showing an image display example of a depiction screen used in user-specified range data editing processing performed by a user-specified range data editing unit of FIG. 1.

FIG. 15 is a view showing an image display example of a depiction screen 1500 used in user-specified range data editing processing performed by the user-specified range data editing unit 125.

The depiction screen 1500 for user-specified range data editing processing shown in FIG. 15 comprises equipments 1510 expressed as rectangles and circles, and a user-specified range 1520 expressed as a rectangle. In the depiction screen 1500, the user-specified range 1520 is being edited and is therefore displayed in bold. The user-specified range 1520 further comprises a maximum XYZ coordinate point 1521 and a minimum XYZ coordinate point 1522 as ancillary elements displayed when the user-specified range 1520 is displayed in bold.

As an example, FIG. 15 shows a case in which three rectangular equipments 1510B to 1510D are displayed, two of the equipments 1510C, 1510D are disposed inside the user-specified range 1520, and one of these equipments 1510D is disposed so as to straddle the boundary line of the user-specified range 1520 such that approximately half of the equipment 1510D protrudes from the user-specified range 1520.

Figure 16:
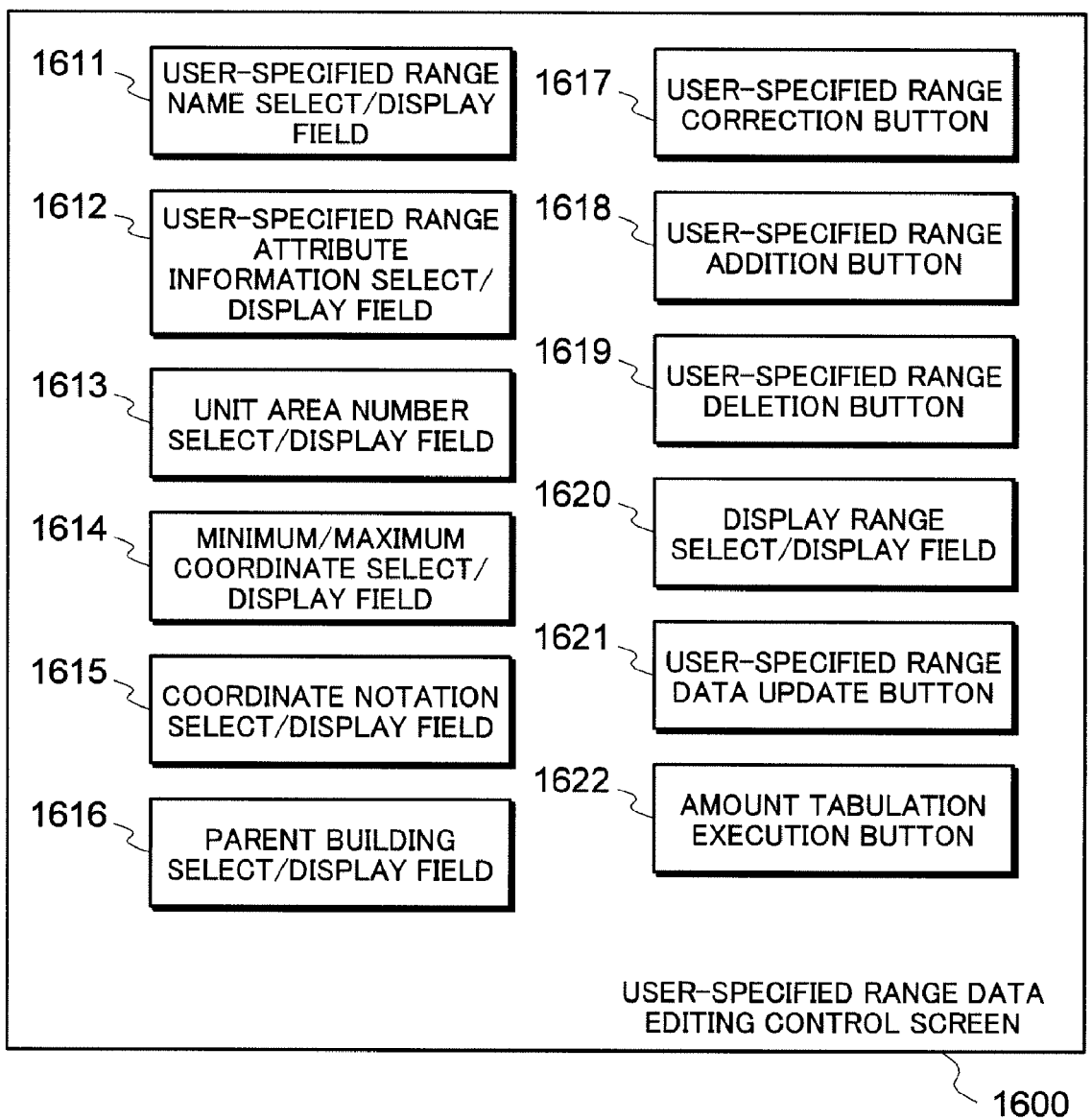
FIG. 16 is a view showing a functional configuration example of a control screen used in the user-specified range data editing processing performed by the user-specified range data editing unit of FIG. 1.

FIG. 16 is a view showing a functional configuration example of a control screen 1600 used in the user-specified range data editing processing performed by the user-specified range data editing unit 125.

As shown in FIG. 16, the user-specified range data editing control screen 1600 comprises a user-specified range name select/display field 1611 for displaying, selecting, and changing the name of a user-specified range, and a user-specified range attribute information select/display field 1612 for displaying and correcting information relating to the attributes of the user-specified range specified on the user-specified range name select/display field 1611.

The user-specified range data editing control screen 1600 further comprises a unit are a number select/display field 1613 for displaying and correcting the number of a constitutional unit are a obtained by fragmenting the user-specified range specified on the user-specified range name select/display field 1611, and a minimum/maximum coordinate select/display field 1614 for displaying and correcting a minimum coordinate and a maximum coordinate of the user-specified range specified on the user-specified range name select/display field 1611.

The user-specified range data editing control screen 1600 further comprises a coordinate notation select/display field 1615 for deciding whether to set the minimum coordinate and maximum coordinate of the user-specified range at an offset notation from the center line or an absolute coordinate, and a parent building select/display field 1616 for registering the name of the building to which the user-specified range specified on the user-specified range name select/display field 1611 and the unit are a number select/display field 1613 belongs when the user-specified range belongs to a building.

The user-specified range data editing control screen 1600 further comprises a user-specified range correction button 1617, a user-specified range addition button 1618, and a user-specified range deletion button 1619 for correcting, adding, or deleting a user-specified range specified on the user-specified range name select/display field 1611 and the unit are a number select/display field 1613 to or from the depiction screen 1500 shown in FIG. 15. Here, the user-specified range correction button 1617 serves as means for correcting the specified user-specified range in accordance with the content set on the user-specified range attribute information select/display field 1612, the minimum/maximum coordinate select/display field 1614, the coordinate notation select/display field 1615, and the parent building select/display field 1616.

The user-specified range data editing control screen 1600 further comprises a display range select/display field 1620 for selecting the entire layout range (entire site area) or the building range as the display range, and changing the display angle of the display range. Here, the display range select/display field 1620 serves as means for realizing the functions of the display range modification unit 128 on the control screen 1500 so that the display range is switched between the entire layout range depiction screen 700a and building range depiction screen 700b shown in FIG. 7, and the display angle is switched between the building range depiction screens 700b, 700c shown in FIG. 7.

The user-specified range data editing control screen 1600 further comprises a user-specified range data update button 1621 for obtaining data relating to the position and dimensions of the user-specified range edited on the control screen 1600 and reflecting these data in the user-specified range database 135 as a user-specified range data editing result, and an amount tabulation execution button 1622 for executing tabulation of the amount of equipments, equipment connection elements, equipment connection paths, and so on within the user-specified range.

The user-specified range data editing unit 125 performs data editing processing using a control screen such as that described above to edit the user-specified range data, and also tabulates the amount of materials in the user-specified range. Hence, the designer can obtain an accurate material amount tabulation result easily without performing tabulation himself/herself, and perform an accurate cost calculation on the basis thereof. Thus, the workload of the designer is reduced further. As an alternative example, data required for a cost calculation may be prepared in advance, and the cost calculation may be performed by the user-specified range data editing unit 125 in addition to the user-specified range material amount tabulation. In this case, the workload of the designer is reduced even further.

Note that by operating the user-specified range data update button 1621 or the amount tabulation execution button 1622 on the control screen 1600, the results of the user-specified range data editing processing or the amount tabulation performed on the control screen 1600 shown in FIG. 16 are stored in the user-specified range database 135 as updated user-specified range data.

Figure 17:
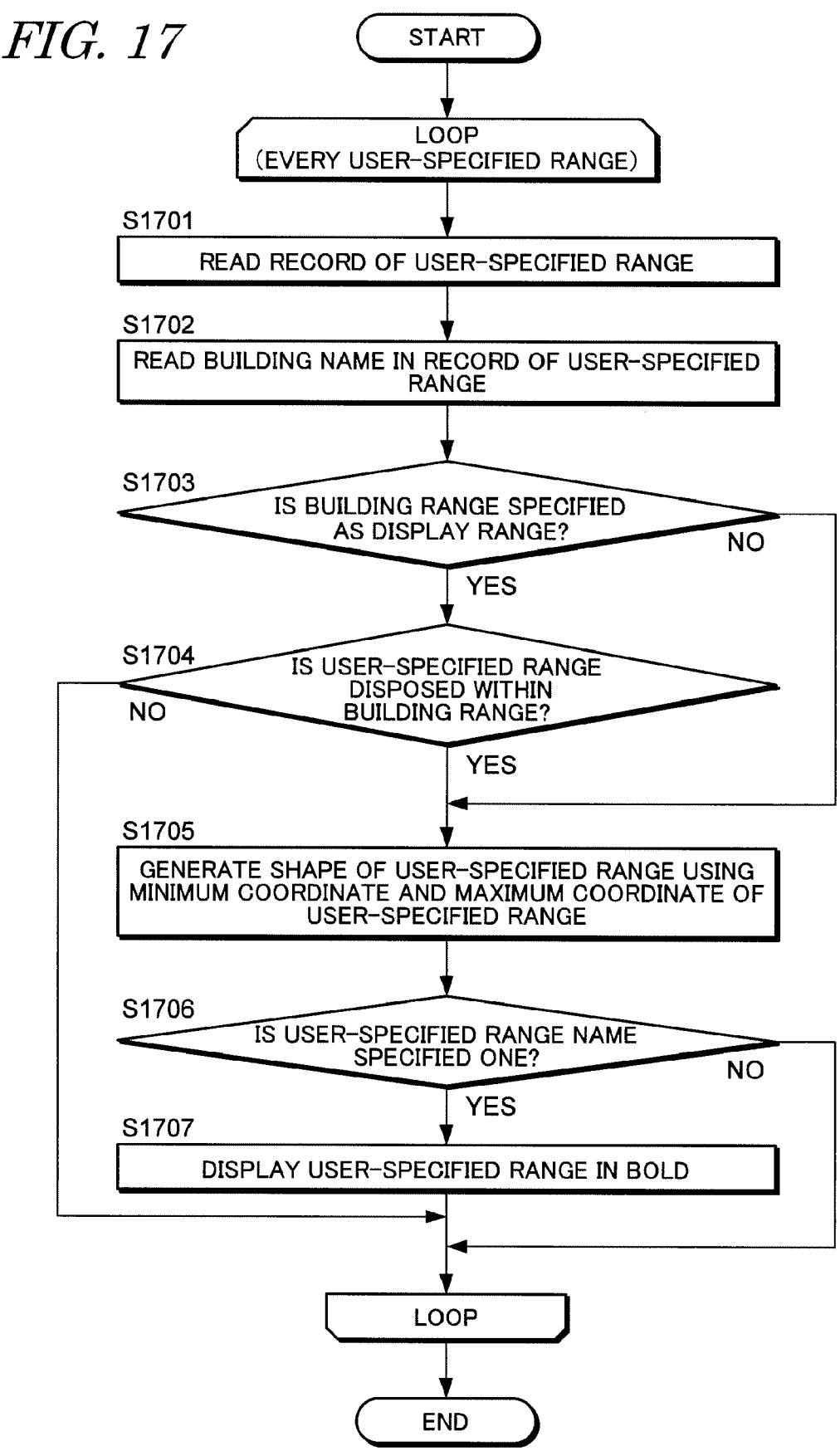
FIG. 17 is a flow chart showing a flow of display processing when the user-specified range data, which are stored in a user-specified range database of FIG. 1, are read and a user-specified range is displayed on a depiction screen.

FIG. 17 is a flowchart showing the flow of display processing when the user-specified range data, which are stored in the user-specified range database 135, are read and a user-specified range is displayed on the depiction screen 1500 shown in FIG. 15. As shown in FIG. 17, user-specified range display is performed in the following manner as a loop process (LOOP) executed in units of the user-specified range records stored in the user-specified range database 135.

First, a record relating to each user-specified range is read from the user-specified range database 135 in record sequence (S1701), whereupon the building name registered in the user-specified range record is read (S1702). When the building range is specified as the display range (YES in S1703), the shape of the user-specified range is generated (S1705) using the minimum coordinate and maximum coordinate of the user-specified range only if the user-specified range is disposed within the specified building range (YES in S1704). When the building range is not specified as the display range (NO in S1703), the shape of the user-specified range is generated as is (S1705).

When the user-specified range name of the user-specified range corresponds to the user-specified range name specified on the user-specified range name select/display field 1611 (YES in S1706), the user-specified range is displayed in bold, similarly to the user-specified range 1520 shown in FIG. 15 (S1707).

[Evaluation Calculation Processing]

FIG. 18 is a view showing a specific example of evaluation calculation processing performed by the evaluation calculation unit 140.

As shown in FIG. 18, the evaluation calculation unit 140 comprises an optimization calculation unit 1811 for performing a repeated optimization calculation, a past record data set compare/display unit 1812, an optimization calculation state value graph display unit 1813, and an animation unit 1814. Here, the past record data set compare/display unit 1812 and the optimization calculation state value graph display unit 1813 correspond to the comparison unit 141 in FIG. 1, while the animation unit 1814 corresponds to the animation unit 142 in FIG. 1.

Evaluation calculation processing in the evaluation calculation unit 140 is performed in the following manner. First, three types of data, namely layout design data (log data) 1821 log-output from the layout editing unit 120 upon each edit, layout design data (past data) 1822 created in the past and stored in the storage unit 130, and layout design data (optimization calculation data) 1823 obtained as the result of the repeated optimization calculation performed by the optimization calculation unit 1811, are handled as a past record data set 1824.

Then, using this past record data set 1824, a plurality of past record data are superposed, compared, and displayed by the past record data set compare/display unit 1812, a state value calculation is performed with regard to the state of the layout design data and a graph of the calculation result is displayed by the optimization calculation state value graph display unit 1813, and the layout progress is displayed continuously by the animation unit 1814.

FIG. 18 shows an example in which an optimization calculation state value graph 1830 is displayed by the optimization calculation state value graph display unit 1813. When a point indicating a state is selected on the optimization calculation state value graph 1830, a layout display screen on which the state is rendered in diagram form is displayed. As an example, FIG. 18 shows a case in which two points P1, P2 indicating states are selected, and layout display screens 1841, 1842 of the respective states are displayed.

According to the evaluation calculation processing described above, by selecting a point on the graph, a depiction of a layout diagram of each state can be displayed, and hence the designer can visually check the layout design data of each state on the graph showing the evaluation calculation results in the form of a layout diagram while checking the graph. As a result, the layout design data can be evaluated easily and accurately, further reducing the workload of the designer.

Further, by using various data as shown in the specific screen display examples described later, the following optimization calculation and graphic display can be performed.

For example, when a plurality of equipments are registered as a group on a group select/display field 2312*b* in an equipment arrangement data editing control screen 2300 (FIG. 23) described later, the equipment group registration information can be used for an optimization calculation, and the plurality of equipments can be moved so that an optimum arrangement corresponding to the group registration of the equipments can be searched.

In addition, when "equipment importance" and "plan movability" shown on an attribute information select/display field 2411 in an equipment attributed at a editing control screen 2400 (FIG. 24) described later, are used for an optimization calculation, an optimization calculation corresponding to these equipment attributes can be performed. In this case, equipments are arranged in the descending order concerning the value of "equipment importance". An equipment with value "0" of "plan movability" cannot move, and an equipment with the higher value of "plan movability" can move more large.

On the other hand, regarding an optimization calculation state value graph, among a plurality of types of state values, every suitable value pair corresponding to purposes is combined and a correlation of every value pair is displayed by graph so that an optimum arrangement satisfying all conditions corresponding to purposes can be confirmed. The optimization calculation state value graph 1830 shown in FIG. 18, shows a correlation of piping cost and overlapped are a as an example. By displaying respective graphs showing this and other correlations such as a correlation of cable cost and overlapped are a, a correlation of piping cost and cable cost, and so on, a designer can select a state corresponding to his purpose in order to adjust equipment arrangement.

[Specific Example of Layout Design of Power Plant]

A specific example in which the layout design support system of this embodiment is applied to layout design of a power plant will now be described.

When performing layout design of a power plant, first the data relating to the center lines and arrangement of the buildings are edited. In other words, the position of each building within the entire layout range (site area) and the details of the center lines, which indicate the intersecting points of the steel frame of the building, are set. Note that here, the building-related data are edited first for convenience, but during an actual layout design process, the dimensions and arrangement of the equipments are often determined first, and the dimensions and arrangement of the buildings are determined in accordance therewith.

Accordingly, there are no limitations on the data editing sequence.

[Example of Screen Display for Editing Building Data]

Figure 19:
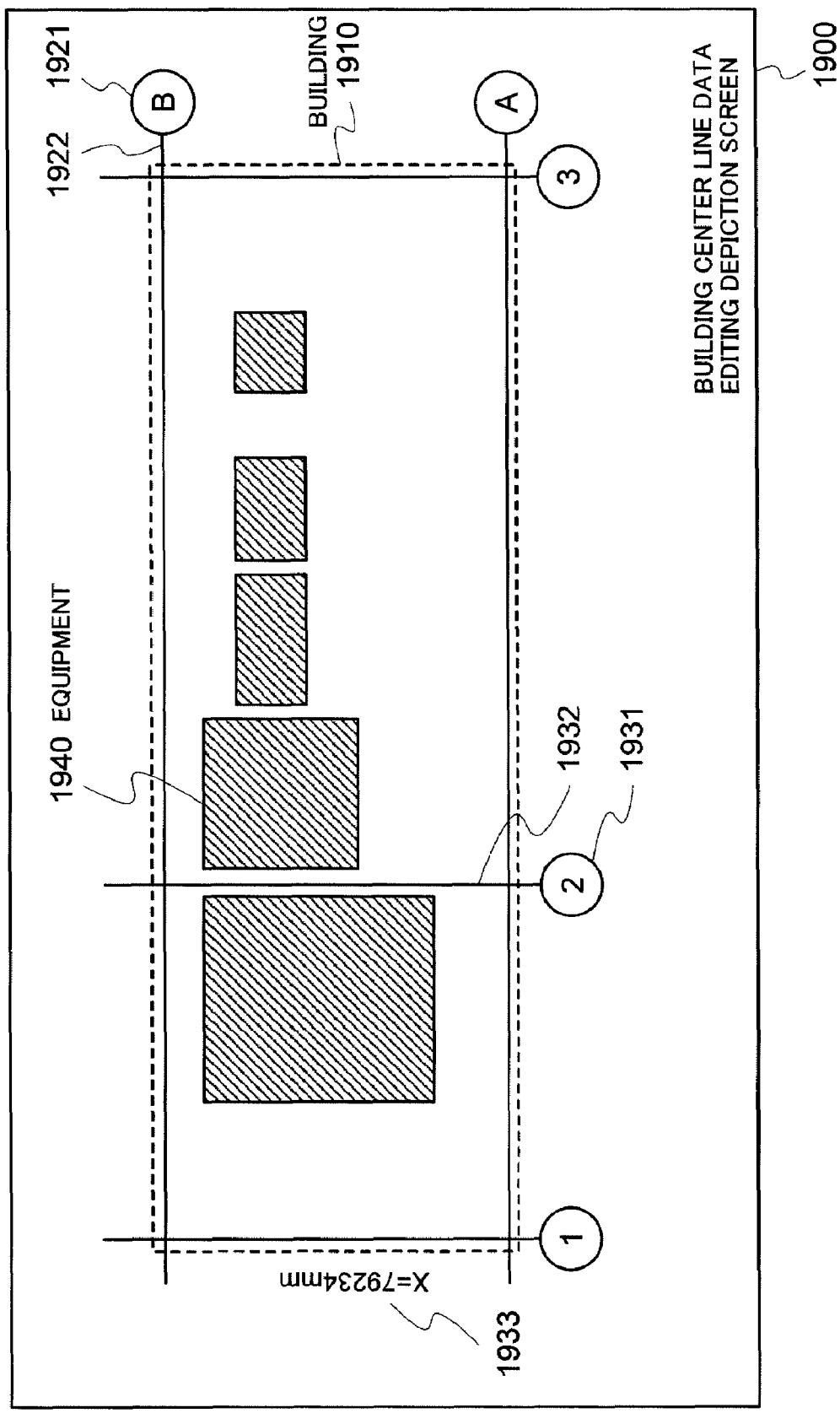
FIG. 19 is a view showing a specific screen display example of a depiction screen used in the building center line data editing performed by the building data editing unit of FIG. 1.

FIG. 19 shows an example of a specific screen display of a building center line data editing depiction screen 1900. This depiction screen 1900 corresponds to the depiction screen 300*a* shown in FIG. 3A, and displays a building 1910, a Y direction center line label 1921, a straight center line 1922 thereof, an X direction center line label 1931, a straight center line 1932 thereof, an X coordinate 1933, and so on. A plurality of equipments 1940 disposed within the building 1910 are also displayed, and hence the designer can edit the building center line data while checking the equipment arrangement.

Figure 20:
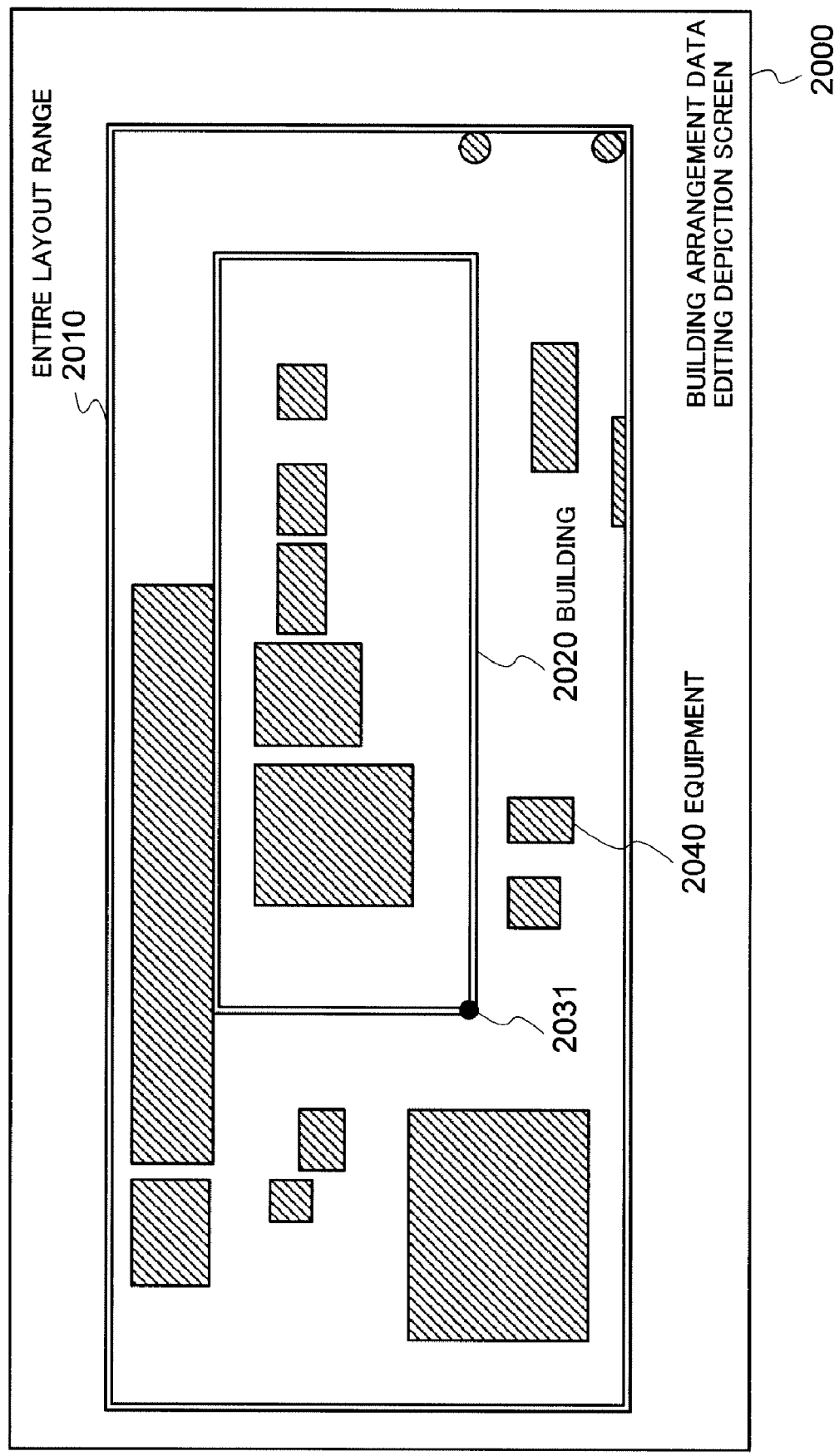
FIG. 20 is a view showing a specific screen display example of a depiction screen used in the building arrangement data editing performed by the building data editing unit of FIG. 1.

FIG. 20 shows an example of a specific screen display of a building arrangement data editing depiction screen 2000. This depiction screen 2000 corresponds to the depiction screen 300b shown in FIG. 3B, and displays a building 2020, a minimum XY coordinate point 2031 thereof, and so on within an entire layout range 2010. A plurality of equipments 2040 disposed within the entire layout range 2010 are also displayed, and hence the designer can edit the building arrangement data while checking the equipment arrangement.

Figure 21:
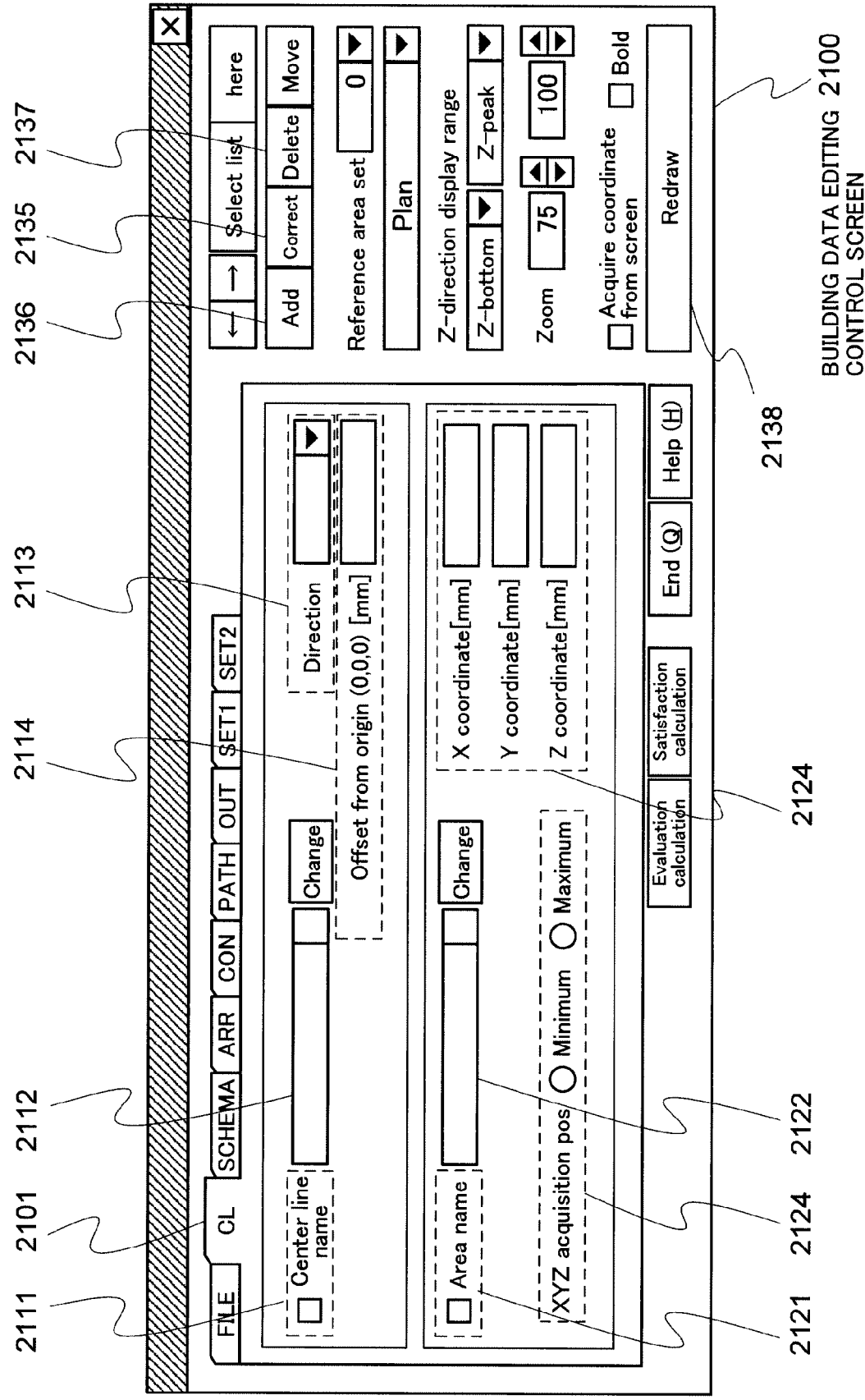
FIG. 21 is a view showing a specific screen display example of a control screen used in the building data editing performed by the building data editing unit of FIG. 1.

FIG. 21 shows an example of a specific screen display of a building data editing control screen 2100. This control screen 2100 corresponds to a control screen combining the building center line data editing control screen 400a and the building arrangement data editing control screen 400b shown in FIG. 4, and is used to switch between a plurality of other control screens to be described below through the use of tabs 2101 displayed in the upper end portion. In other words, the tabs 2101 serve as means for realizing the functions of the screen switching unit 129.

A center line data editing select/display field 2111, a center line name select/display field 2112, a center line direction select/display field 2113, a center line offset value select/display field 2114, and so on are disposed in the upper portion of the left-of-center part of the control screen 2100. These select/display fields 2111 to 2114 serve as a building center line data editing part, and correspond respectively to the select/display fields 411 to 414 shown in FIG. 4, with which they share the final two digits of their respective reference numerals.

A building arrangement data editing select/display field 2121, a building name select/display field 2122, a building arrangement select/display field 2123, a building arrangement reference point select/display field 2124, and so on are disposed in the lower portion of the left-of-center part of the control screen 2100. These select/display fields 2121 to 2124 serve as a building arrangement data editing part, and correspond respectively to the select/display fields 421 to 424 shown in FIG. 4, with which they share the final two digits of their respective reference numerals.

A correction button 2135, an addition button 2136, a deletion button 2137, a redraw/data update button 2138, and so on are disposed on the right side part of the control screen 2100. These buttons 2135 to 2138 serve as a shared part doubling as the center line data editing buttons 415 to 418 and the building arrangement data editing buttons 425 to 428 shown in FIG. 4.

With the depiction screens 1900, 2000 shown in FIGS. 19 and 20 and the control screen 2100 shown in FIG. 21, having the screen configurations described above, the building data can be edited in the following manner. First, by entering a tick in either the center line data editing select/display field 2111 or the building arrangement data editing select/display field 2121 on the control screen 2100, either the building center line data editing part or the building arrangement data editing part is displayed.

When a tick is entered in the center line data editing select/display field 2111, the center line name select/display field 2112 reads the building center line data from the building database 131 and displays the center line names on a pull-down menu. When a center line name is selected from the pull-down menu, the center line direction select/display field 2113 and center line offset value select/display field 2114 display the center line direction and center line offset value, respectively. This information can then be modified. When a change button is depressed on the center line name select/display field 2112 while a center line name is displayed, the center line name can be changed.

The modification content of the center line name select/display field 2112, center line direction select/display field 2113, and center line offset value select/display field 2114 is confirmed as modified data by pressing the correction button 2135. By pressing the addition button 2136 or deletion button 2137, data relating to a new center line can be added and data relating to an unnecessary center line can be deleted. Further, by pressing the redraw/data update button 2138, the center lines on the building center line data editing depiction screen 1900 shown in FIG. 19 can be redrawn in accordance with the building center line data edited on the control screen 2100, and the building database 131 shown in FIG. 1 can be updated.

When a tick is entered in the building arrangement data editing select/display field 2121, the building name select/display field 2122 reads the building arrangement data from the building database 131 and displays the building names on a pull-down menu. When a building name is selected from the pull-down menu, a selection is made from the building arrangement reference point select/display field 2124 as to whether to edit the building arrangement from the minimum coordinate point or the maximum coordinate point. The XYZ coordinates relating to the selected coordinate point are then displayed by the building arrangement select/display field 2123. This information can then be modified. When a change button is depressed on the building name select/display field 2122 while a building name is displayed, the building name can be changed.

The modification content of the building name select/display field 2122, building arrangement select/display field 2123, and building arrangement reference point select/display field 2124 is confirmed as modified data by pressing the correction button 2135. By pressing the addition button 2136 or deletion button 2137, data relating to a new building can be added and data relating to an unnecessary building can be deleted. Further, by pressing the redraw/data update button 2138, the buildings on the building arrangement data editing depiction screen 2000 shown in FIG. 20 can be redrawn in accordance with the building arrangement data edited on the control screen 2100, and the building database 131 shown in FIG. 1 can be updated.

[Example of Screen Display for Editing Equipment Arrangement Data]

Figure 22:
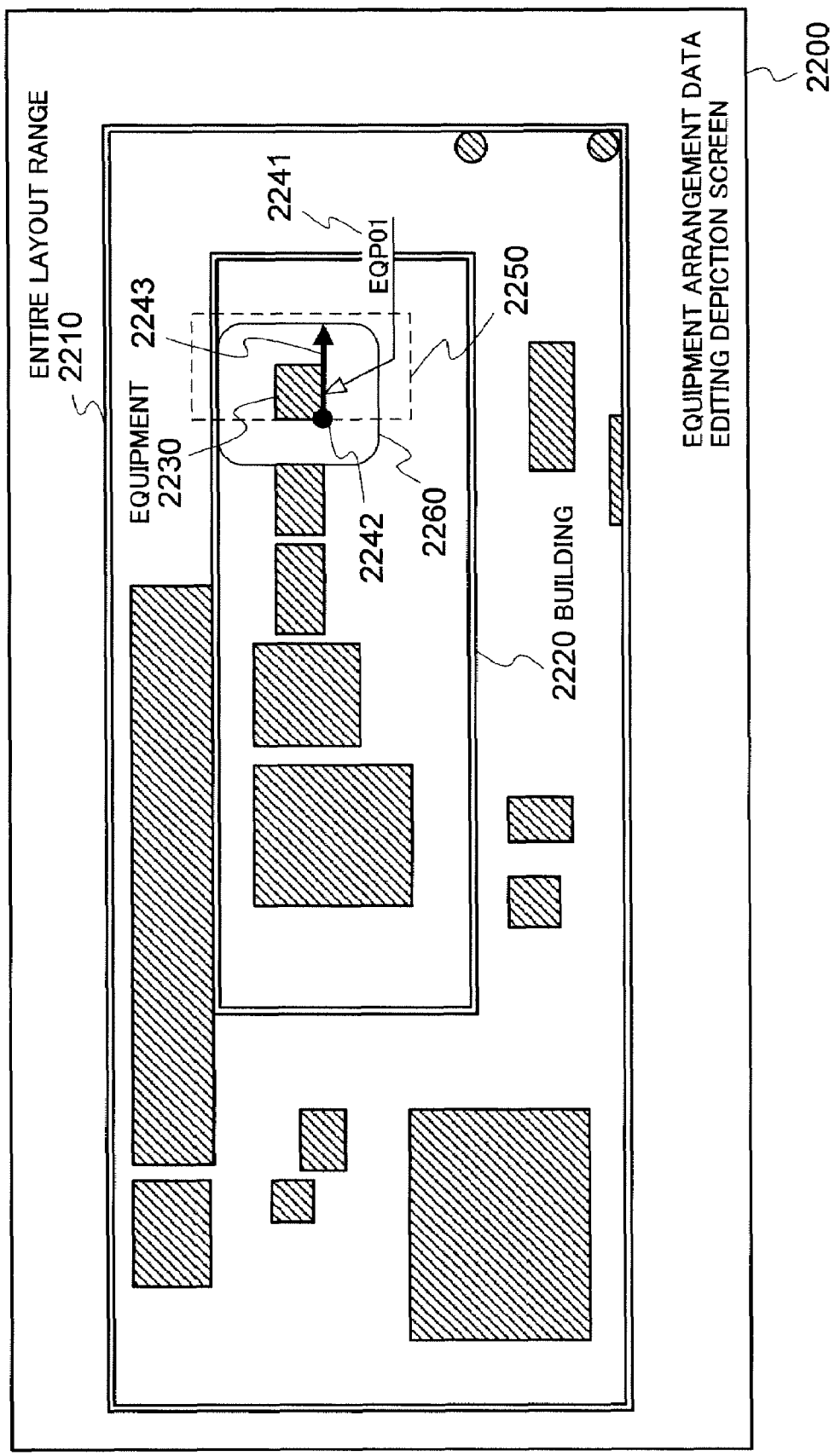
FIG. 22 is a view showing a specific screen display example of a depiction screen used in the equipment arrangement data editing performed by the equipment arrangement data editing unit of FIG. 1.

FIG. 22 shows an example of a specific screen display of an equipment arrangement data editing depiction screen 2200. This depiction screen 2200 corresponds to the depiction screen 500 shown in FIG. 5, and displays a building 2220 and a plurality of equipments 2230 within an entire layout range 2210. In relation to the equipment 2230 being edited, a name label 2241, an arrangement point 2242, an arrangement direction arrow 2243, an interference prohibition area range 2250, a noise area range 2260, and so on are displayed in bold.

In this case, the interference prohibition area range 2250 is determined in consideration of equipment workability and maintainability. For example, the interference prohibition area range 2250 may be displayed by inputting a distance from each side. The noise area range 2260 may be displayed by calculating the difference between the sound pressure level of the equipment and the sound pressure level at the contour display boundary, and calculating the distance to the boundary sound pressure level from the sectional area of the equipment, for example. Note that the interference prohibition area range and noise area range are merely examples of attribute information relating to the range of the equipment, and various other attribute information may be expressed similarly in the form of equipment ranges.

Figure 23:
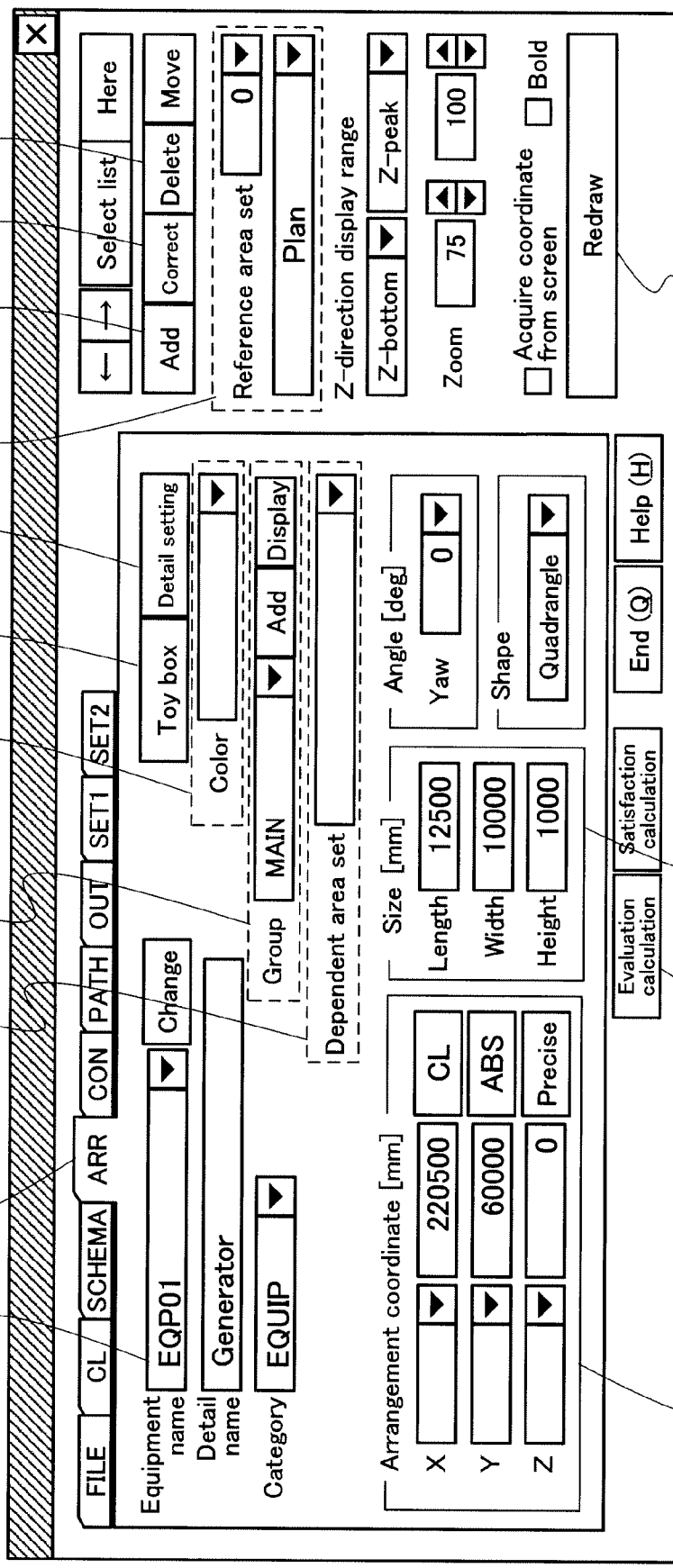
FIG. 23 is a view showing a specific screen display example of a control screen used in the equipment arrangement data editing performed by the equipment arrangement data editing unit of FIG. 1.

FIG. 23 shows a specific screen display example of an equipment arrangement data editing control screen 2300. This control screen 2300 corresponds to the equipment arrangement data editing control screen 600a shown in FIG. 6A, and is used to switch between the aforementioned building data editing control screen 2100 and a plurality of other control screens to be described below through the use of tabs 2301 displayed in the upper end portion.

As shown in FIG. 23, an equipment name select/display field 2311, an equipment attribute editing select/display field 2312, an equipment arrangement select/display field 2313, an equipment shape/dimension select/display field 2314, a parent building select/display field 2315, a CAD equipment select/display field 2316, and so on are disposed in the left-of-center part of the control screen 2300. These select/display fields 2311 to 2316 correspond respectively to the select/display fields 611 to 616 shown in FIG. 6, with which they share the final two digits of their respective reference numerals.

An equipment correction button 2317, an equipment addition button 2318, an equipment deletion button 2319, a display range select/display field 2320, a redraw/equipment arrangement data update button 2321, and so on are disposed on the right side part of the control screen 2300. These elements 2317 to 2321 correspond respectively to the elements 617 to 621 shown in FIG. 6, with which they share the final two digits of their respective reference numerals. Further, an evaluation calculation button 2331 is disposed in the lower end portion of the control screen 2300. The evaluation calculation button 2331 serves as means for realizing the functions of the evaluation calculation activating unit 126 of FIG. 1.

FIG. 24 is a view showing a specific screen display example of an equipment attribute data editing control screen 2400. This control screen 2400 corresponds to the equipment attribute data editing control screen 600b shown in FIG. 6B, and is constituted by a sub-screen which is switched to from the main control screen 2300 of FIG. 23 or displayed in a new window.

As shown in FIG. 24, an attribute information select/display field 2411 is disposed in the left side part of the control screen 2400 for inputting various attribute information not provided on the main control screen 2300. The attribute information select/display field 2411 corresponds to the product information select/display field 631, noise information select/display field 633, and constraint information select/display field 634 shown in FIG. 6. Further, an interference prohibition are a information select/display field 2412 is disposed on the right side part of the control screen 2400. The interference prohibition are a information select/display field 2412 corresponds to the select/display field 632 shown in FIG. 6.

With the depiction screen 2200 shown in FIG. 22 and the control screens 2300, 2400 shown in FIGS. 23 and 24, having the screen configurations described above, the equipment arrangement data can be edited in the following manner. First, the equipment name select/display field 2311 on the control screen 2300 reads the equipment arrangement data from the equipment arrangement database 132 and displays the equipment names on a pull-down menu. When an equipment name is selected from the pull-down menu, the arrangement coordinates and angle of the equipment, the shape and dimensions of the equipment, the name of the parent building, and so on can be displayed and corrected on the equipment arrangement select/display field 2313, equipment shape/dimension select/display field 2314, and parent building select/display field 2315. The existence of a parent building indicates that when an equipment is disposed inside the parent building, the equipment moves integrally with the building. Further, the color scheme of the equipments can be displayed and corrected on a color scheme select/display field 2312a associated with the equipment attribute editing select/display field 2312.

In addition, a plurality of equipments can be registered as a group with group name on a group select/display field 2312b associated with the equipment attribute editing select/display field 2312. When the group names of groups registered in the past are displayed on a pull-down menu and a group name of them are selected, the equipments of the group are highlighted on the depiction screen 2200 in a format such as display of a colored bold outline. In this case, the equipment group highlighted on the depiction screen 2200 can also be moved as a group unit.

When the control screen 2400 is displayed by the equipment attribute editing select/display field 2312 of the control screen 2300, the importance, movability, cost, unit of cost, noise pressure level, vendor name, number of motors, number of anchor bolts, number of embedded metal fittings, and so on of the equipment can be displayed and corrected on the attribute information select/display field 2411 of the control screen 2400. This information is useful when performing a simple tabulation of the amount of materials during editing of the user-specified range data.

Further, the CAD equipment select/display field 2316 of the control screen 2300 converts the specified equipment into a two-dimensional CAD equipment drawing symbol or a three-dimensional equipment model in conjunction with the CAD conversion unit 150, and displays the result of the conversion. For example, the CAD data may be obtained by pre-associating an equipment number used in the two-dimensional CAD equipment drawing symbol database 160 and the three-dimensional CAD equipment model database with an equipment name in the equipment arrangement data.

Alternatively, the CAD data may be displayed by activating a separate application program to the application program for realizing the layout editing unit 120, or by developing a display program together with the program of the layout editing unit 120 such that the database is completely controlled.

In any case, by subjecting the equipment to CAD display, the designer can gain a comprehensive and clear overview of the layout design, and can avoid spatial recognition errors during subsequent layout editing work.

The modification content of the equipment attribute data editing control screen 2400, equipment arrangement select/display field 2313, equipment shape/dimension select/display field 2314, parent building select/display field 2315, and so on is confirmed as modified data by pressing the equipment correction button 2317. By pressing the equipment addition button 2318 or equipment deletion button 2319, data relating to a new equipment can be added and data relating to an unnecessary equipment can be deleted. Further, by pressing the redraw/equipment arrangement data update button 2321, the equipments on the equipment arrangement data editing depiction screen 2200 shown in FIG. 22 can be redrawn in accordance with the equipment arrangement data edited on the control screen 2300, and the equipment arrangement database 132 shown in FIG. 1 can be updated.

[Example of Screen Display for Editing Equipment Connection Element Data]

Figure 25:
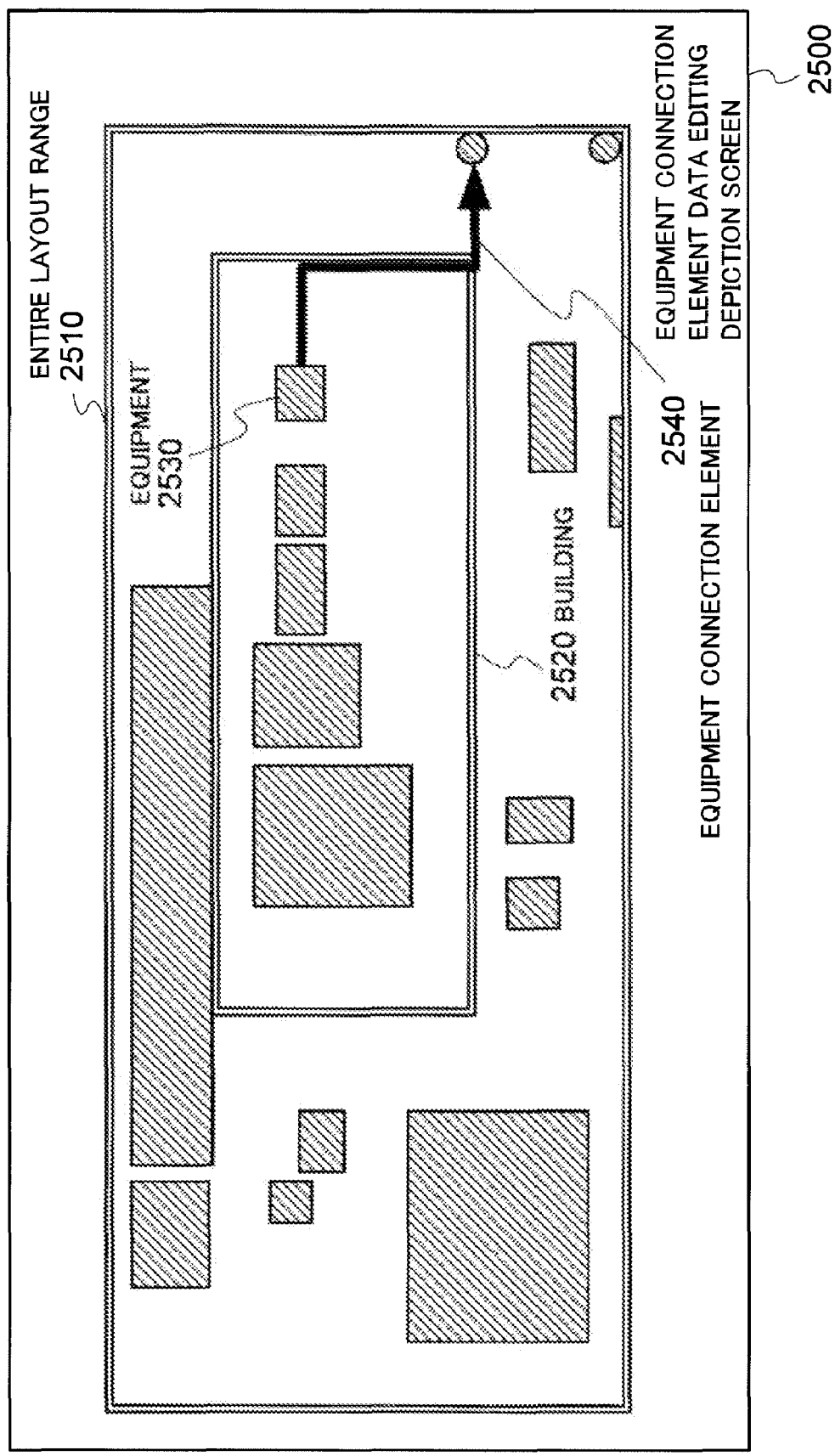
FIG. 25 is a view showing a specific screen display example of a depiction screen used in the equipment connection element data editing performed by the equipment connection element data editing unit of FIG. 1.

FIG. 25 is a view showing a specific screen display example of an equipment connection element data editing depiction screen 2500. This depiction screen 2500 corresponds to the depiction screen 900 shown in FIG. 9, and displays a building 2520, a plurality of equipments 2530, and an equipment connection element 2540 within an entire layout range 2510. The equipment connection element 2540 being edited is displayed in bold.

Figure 26:
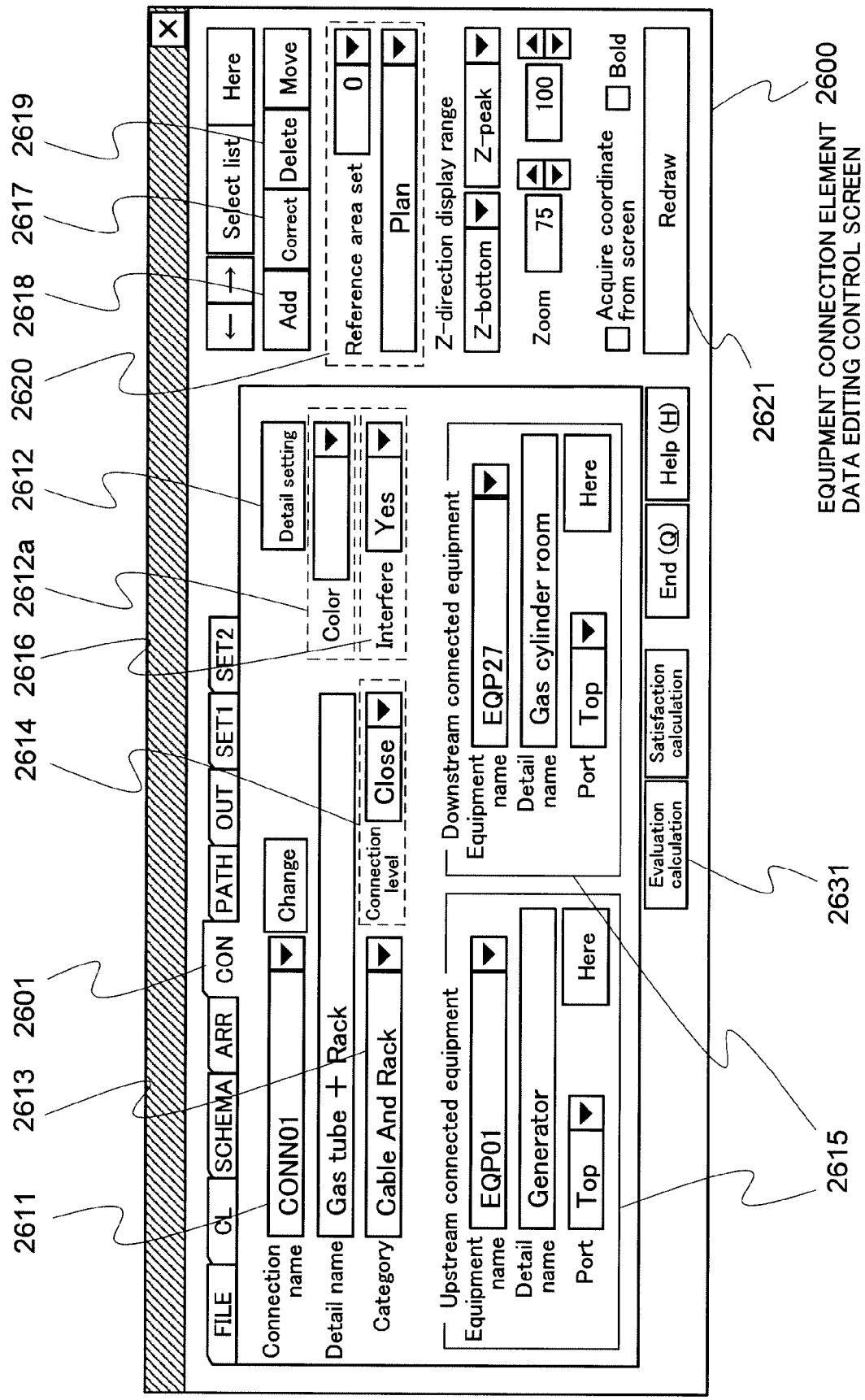
FIG. 26 is a view showing a specific screen display example of a control screen used in the equipment connection element data editing performed by the equipment connection element data editing unit of FIG. 1.

FIG. 26 shows an example of a specific screen display of an equipment connection element data editing control screen 2600. This control screen 2600 corresponds to the equipment connection element data editing control screen 1000a shown in FIG. 10A, and is used to switch between the aforementioned building data and equipment arrangement data editing control screens 2100, 2300 and a plurality of other control screens through the use of tabs 2601 displayed in the upper end portion.

As shown in FIG. 26, a connection name select/display field 2611, a connection attribute editing select/display field 2612, a connection mode select/display field 2613, a connection level select/display field 2614, a connection destination equipment select/display field 2615, an interference select/display field 2616, and soon are disposed in the left-of-center part of the control screen 2600. These select/display fields 2611 to 2616 correspond respectively to the select/display fields 1011 to 1016 shown in FIG. 10, with which they share the final two digits of their respective reference numerals.

A connection correction button 2617, a connection addition button 2618, a connection deletion button 2619, a display range select/display field 2620, a redraw/equipment connection element data update button 2621, and so on are disposed on the right side part of the control screen 2600. These elements 2617 to 2621 correspond respectively to the elements 1017 to 1021 shown in FIG. 10, with which they share the final two digits of their respective reference numerals. Further, an evaluation calculation button 2631 is disposed in the lower end portion of the control screen 2600. The evaluation calculation button 2631 serves as means for realizing the functions of the evaluation calculation activating unit 126 of FIG. 1.

FIG. 27 is a view showing a specific screen display example of a connection attribute data editing control screen 2700. This control screen 2700 corresponds to the connection attribute data editing control screen 1000b shown in FIG. 10B, and is constituted by a sub-screen which is switched to from the main control screen 2600 of FIG. 26 or displayed in a new window.

As shown in FIG. 27, a cross-section information select/display field 2711 is disposed in the left side part of the control screen 2700 for inputting a plurality of attribute information relating to the cross-section of the equipment connection element. The cross-section information select/display field 2711 corresponds to the product information select/display field 1031 and the constraint information select/display field 1032 shown in FIG. 10. Further, a connection path name select/display field 2712 is disposed on the right side part of the control screen 2700 for inputting the connection path name of an equipment connection path and information regarding the control points thereof. The connection path name select/display field 2712 corresponds to the connection path name select/display field 1012 shown in FIG. 10.

With the depiction screen 2500 shown in FIG. 25 and the control screens 2600, 2700 shown in FIGS. 26 and 27, having the screen configurations described above, the equipment connection element data can be edited in the following manner. First, the connection name select/display field 2611 on the control screen 2600 reads the equipment connection element data from the equipment connection element database 133 and displays the connection names on a pull-down menu. When a connection name is selected from the pull-down menu, the connection mode, for example piping or cable, the connection level, the equipment names of the connection destination equipments on the upstream side and downstream side, and so on can be displayed and corrected on the connection mode select/display field 2613, connection level select/display field 2614, and connection destination equipment select/display field 2615, respectively. Further, the color scheme of the equipment connection elements can be displayed and corrected on a color scheme select/display field 2612a associated with the connection attribute editing select/display field 2612.

When the control screen 2700 is displayed by the connection attribute editing select/display field 2612 of the control screen 2600, the connection cross-section width, height, weight per unit length, cost per unit length, unit cost, and so on can be displayed and corrected on the cross-section information select/display field 2711 of the control screen 2700. This information is useful when performing a simple tabulation of the amount of materials during editing of the user-specified range data.

The modification content of the connection attribute data editing control screen 2700, connection mode select/display field 2613, connection level select/display field 2614, connection destination equipment select/display field 2615, and so on is confirmed as modified data by pressing the connection correction button 2617. By pressing the connection addition button 2618 or connection deletion button 2619, data relating to a new equipment connection element can be added and data relating to an unnecessary equipment connection element can be deleted. Further, by pressing the redraw/equipment connection element data update button 2621, the equipment connection element on the equipment connection element data editing depiction screen 2500 shown in FIG. 25 can be redrawn in accordance with the equipment connection element data edited on the control screen 2600, and the equipment connection element database 133 shown in FIG. 1 can be updated.

[Example of Screen Display for Editing Equipment Connection Path Data]

Figure 28:
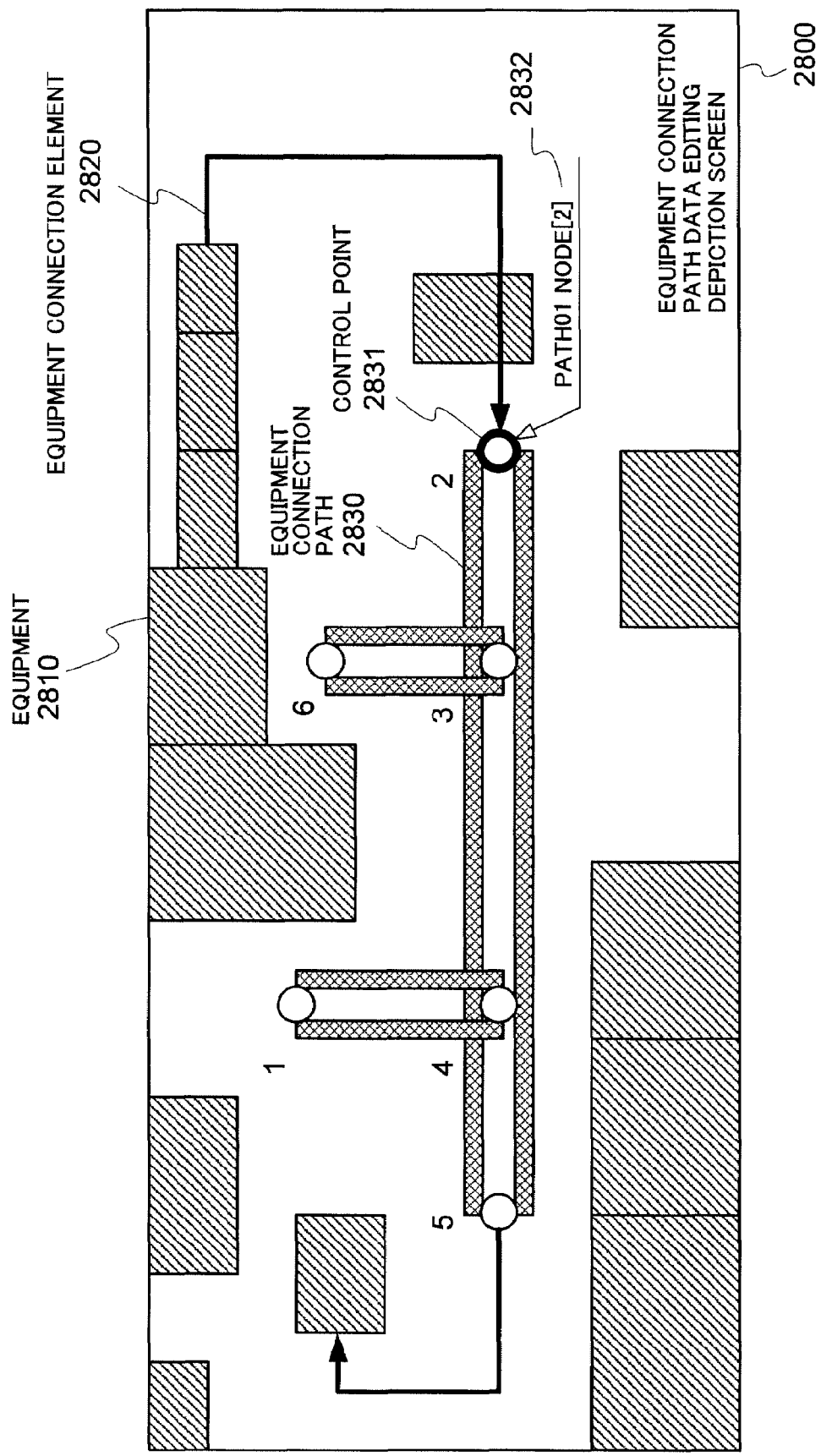
FIG. 28 is a view showing a specific screen display example of a depiction screen used in the equipment connection path data editing performed by the equipment connection path data editing unit of FIG. 1.

FIG. 28 is a view showing a specific screen display example of an equipment connection path data editing depiction screen 2800. This depiction screen 2800 corresponds to the depiction screen 1200 shown in FIG. 12, and displays a plurality of equipments 2810, an equipment connection element 2820 connecting the equipments 2810, an equipment connection path 2830 serving as the path of the equipment connection element 2820, and a control point 2831 allocated a node number. The equipment connection path 2830 and control point 2831 being edited are displayed in bold. A number label 2832 is also displayed to indicate the node number of the control point 2821 being edited.

Figure 29:
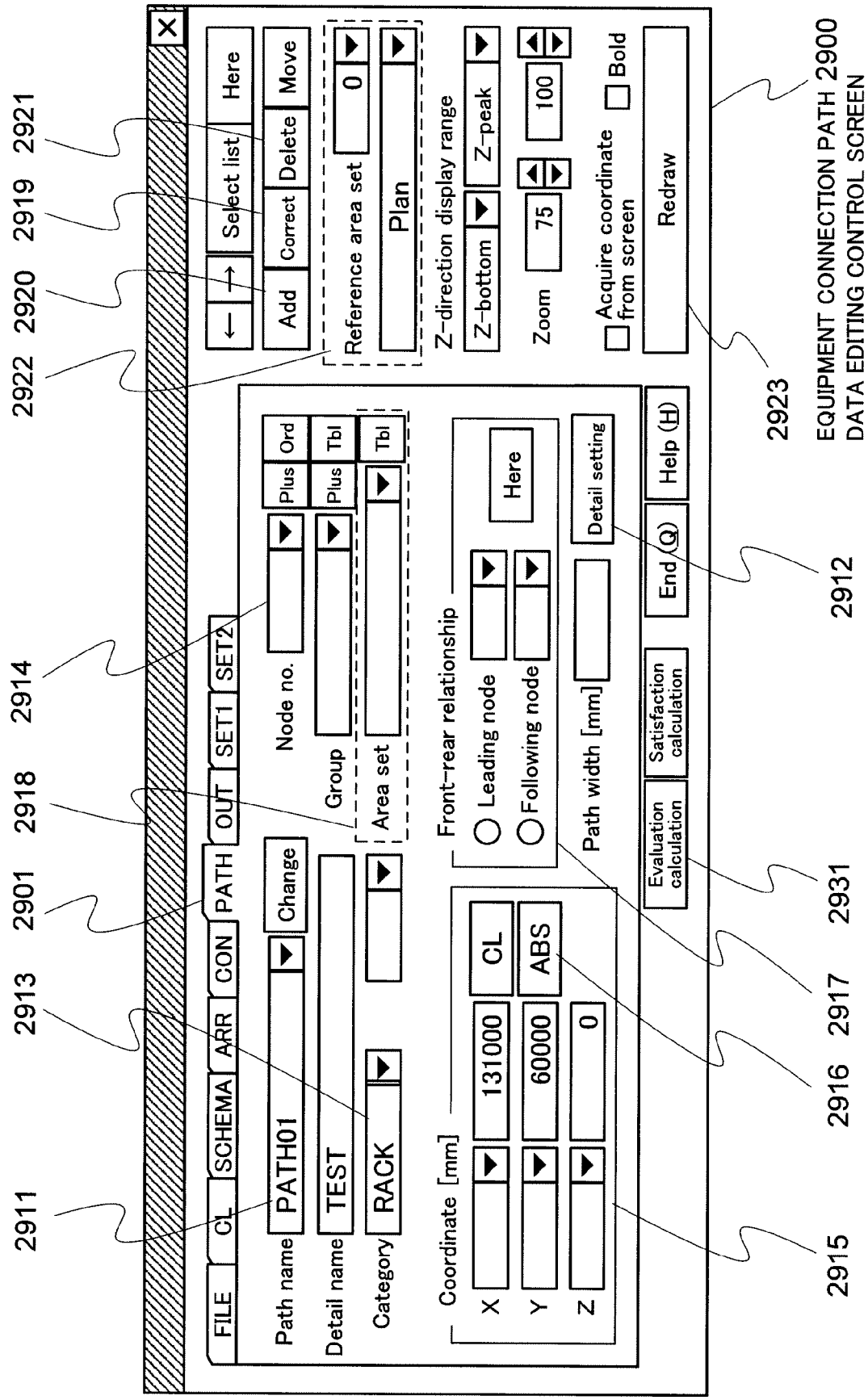
FIG. 29 is a view showing a specific screen display example of a control screen used in the equipment connection path data editing performed by the equipment connection path data editing unit of FIG. 1.

FIG. 29 shows an example of a specific screen display of an equipment connection path data editing control screen 2900. This control screen 2900 corresponds to the equipment connection path data editing control screen 1300a shown in FIG. 13A, and is used to switch between the aforementioned control screen and a control screen to be described below through the use of tabs 2901 displayed in the upper end portion.

As shown in FIG. 29, a connection pathname select/display field 2911, a connection path attribute editing select/display field 2912, a connection path mode select/display field 2913, a control point name select/display field 2914, a control point coordinate select/display field 2915, a coordinate notation select/display field 2916, a front-rear relationship select/display field 2917, a parent building select/display field 2918, and so on are disposed in the left-of-center part of the control screen 2900. These select/display fields 2911 to 2918 correspond respectively to the select/display fields 1311 to 1318 shown in FIG. 13, with which they share the final two digits of their respective reference numerals.

A connection path correction button 2919, a connection path addition button 2920, a connection path deletion button 2921, a display range select/display field 2922, a redraw/ equipment connection path data update button 2923, and so on are disposed on the right side part of the control screen 2900. These elements 2919 to 2923 correspond respectively to the elements 1319 to 1323 shown in FIG. 13, with which they share the final two digits of their respective reference numerals. Further, an evaluation calculation button 2931 is disposed in the lower end portion of the control screen 2900. The evaluation calculation button 2931 serves as means for realizing the functions of the evaluation calculation activating unit 126 of FIG. 1.

Figure 30:
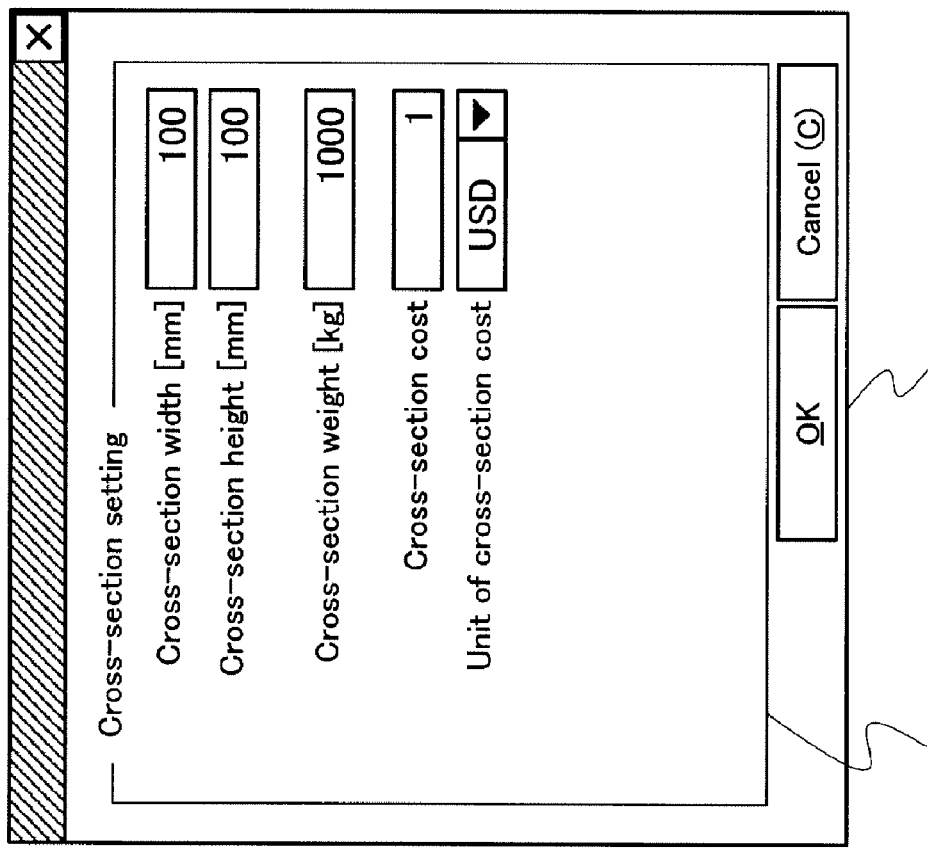
FIG. 30 is a view showing a specific screen display example of a control screen used in the connection path attribute data editing performed by the equipment connection path data editing unit of FIG. 1.

FIG. 30 shows a specific screen display example of a connection path attribute data editing control screen 3000. This control screen 3000 corresponds to the connection path attribute data editing control screen 1300b shown in FIG. 13B, and is constituted by a sub-screen which is switched to from the main control screen 2900 of FIG. 29 or displayed in a new window.

As shown in FIG. 30, a cross-section information select/ display field 3011 is disposed on the control screen 3000 for inputting a plurality of attribute information relating to the cross-section of the connection path. The cross-section information select/display field 3011 corresponds to the product information select/display field 1331 and the constraint information select/display field 1332 shown in FIG. 13.

With the depiction screen 2800 shown in FIG. 28 and the control screens 2900, 3000 shown in FIGS. 29 and 30, having the screen configurations described above, the equipment connection path data can be edited in a similar manner to the equipment connection element data editing described above. First, equipment connection path editing can be realized easily by moving the control point 2831 on the depiction screen 2800 shown in FIG. 28. A leading node and a following node can be specified in relation to the control point on the control screen 2900, and by connecting the respective nodes, a network can be constructed and an equipment connection path can be realized.

Further, the control point passage information of the equipment connection path can be specified, and hence by learning the control point passage information, the designer can gain a detailed understanding of the equipment connection path from the path starting point and end point information. Note that the equipment connection path may pass through a plurality of paths rather than simply a single rack, trench, or the like.

Similarly to the equipment connection element data editing described above, the connection path cross-section width, height, weight per unit length, cost per unit length, unit cost, and so on can be displayed and corrected on the cross-section information select/display field 3011 of the control screen 3000. This information is also useful when performing a simply tabulation of the amount of materials during editing of the user-specified range data.

[Example of Screen Display for Editing User-Specified Range Data]

Figure 31:
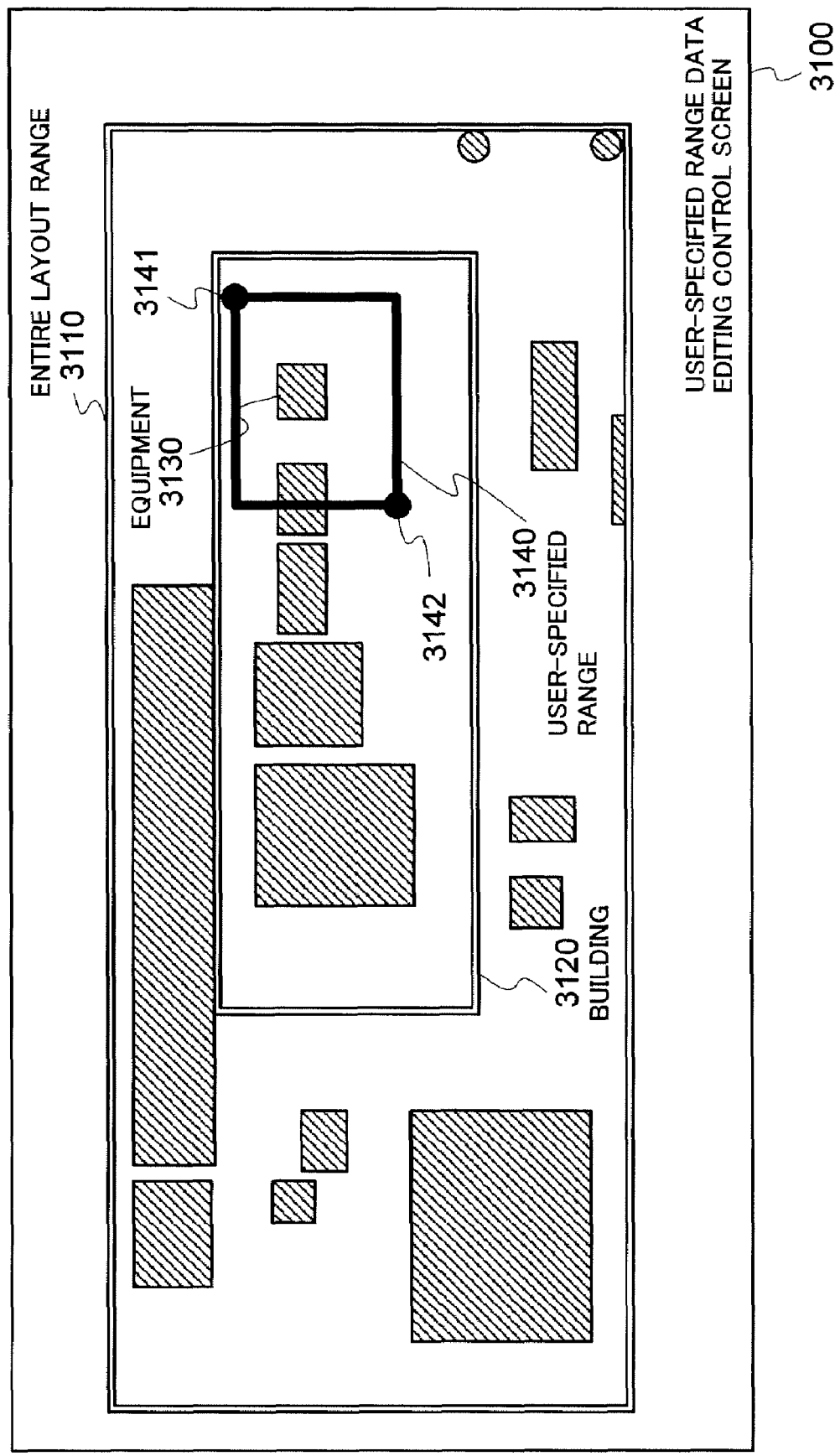
FIG. 31 is a view showing a specific screen display example of a depiction screen used in the user-specified range data editing performed by the user-specified range data editing unit of FIG. 1.

FIG. 31 shows a specific screen display example of a user-specified range data editing depiction screen 3100. This depiction screen 3100 corresponds to the depiction screen 1500 shown in FIG. 15, and displays a building 3120 and a plurality of equipments 3130 within an entire layout range 3110. The user-specified range 3140 being edited is displayed in bold, and maximum/minimum coordinate points 3141, 3142 thereof are also displayed.

Figure 32:
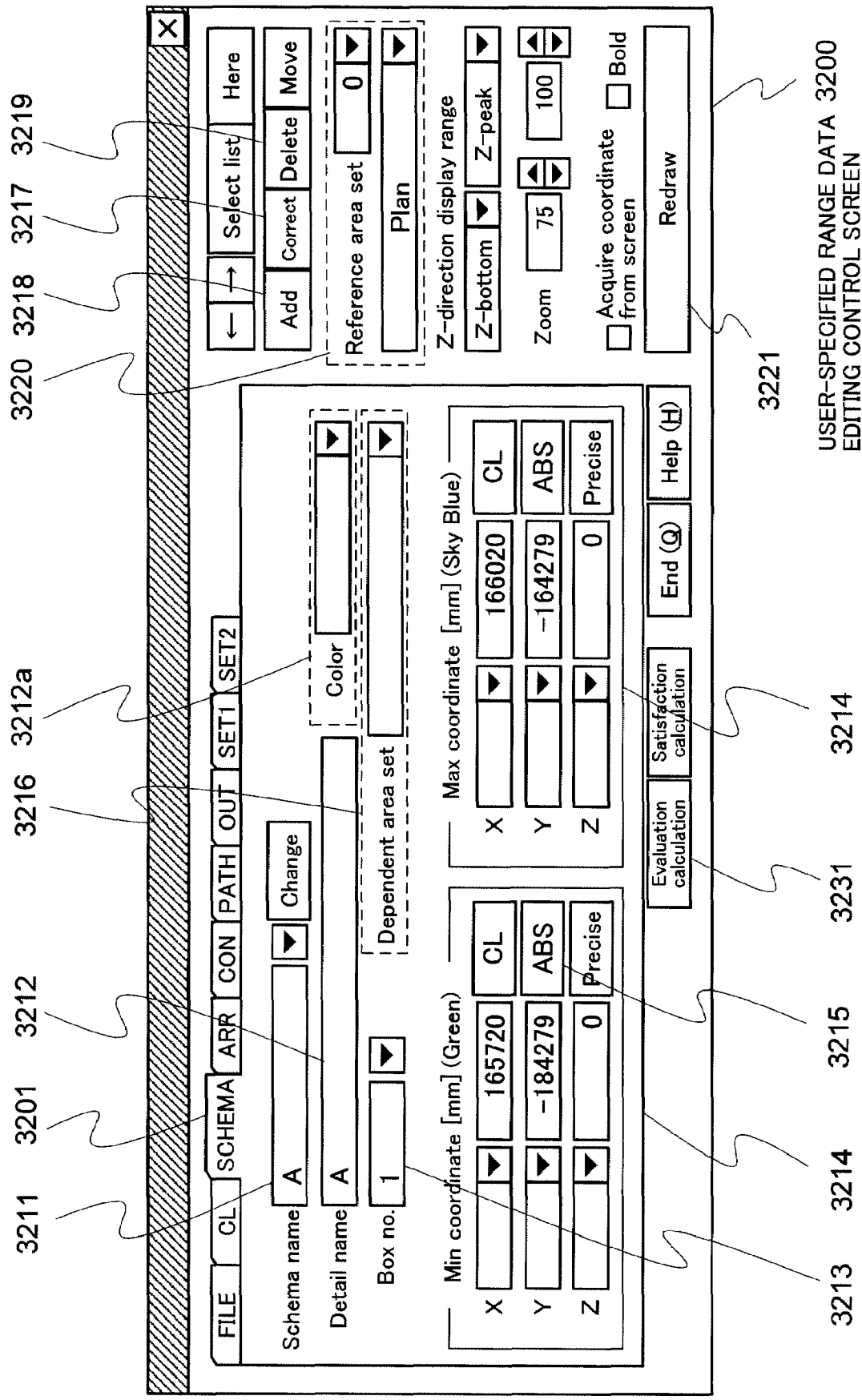
FIG. 32 is a view showing a specific screen display example of a control screen used in the user-specified range data editing performed by the user-specified range data editing unit of FIG. 1.

FIG. 32 shows an example of a specific screen display of a user-specified range data editing control screen 3200. This control screen 3200 corresponds to the user-specified range data editing control screen 1600 shown in FIG. 16, and is used to switch between the aforementioned plurality of control screens and a plurality of other control screens through the use of tabs 3201 displayed in the upper end portion.

As shown in FIG. 32, a user-specified range name select/ display field 3211, a user-specified range attribute information editing select/display field 3212, a unit are a number select/display field 3213, a minimum/maximum coordinate select/display field 3214, a coordinate notation select/display field 3215, a parent building select/display field 3216, and so on are disposed in the left-of-center part of the control screen 3200. These select/display fields 3211 to 3216 correspond respectively to the select/display fields 1611 to 1616 shown in FIG. 16, with which they share the final two digits of their respective reference numerals.

A user-specified range correction button 3217, a user-specified range addition button 3218, a user-specified range deletion button 3219, a display range select/display field 3220, a redraw/user-specified range data update button 3221, an amount tabulation execution button 3222, and so on are disposed on the right side part of the control screen 3200. These elements 3217 to 3222 correspond respectively to the elements 1617 to 1622 shown in FIG. 16, with which they share the final two digits of their respective reference numerals. Further, an evaluation calculation button 3231 is disposed in the lower end portion of the control screen 3200. The evaluation calculation button 3231 serves as means for realizing the functions of the evaluation calculation activating unit 126.

With the depiction screen 3100 shown in FIG. 31 and the control screen 3200 shown in FIG. 32, having the screen configurations described above, the user-specified range data can be edited in the following manner. First, the user-specified range name select/display field 3211 on the control screen 3200 reads the user-specified range data from the user-specified range database 135 and displays the user-specified range names on a pull-down menu.

When a user-specified range name is selected from the pull-down menu, attribute information such as a detailed name and a color scheme, the box number of a box serving as a fragmented constitutional unit are a, the minimum and maximum coordinate points, the parent building, and so on can be displayed and corrected on the user-specified range attribute information select/display field 3212 and a color scheme select/display field 3212a thereof, the unit are a number select/display field 3213, the minimum/maximum coordinate select/display field 3214, and the parent building select/display field 3216, respectively. With respect to the minimum and maximum coordinate points, center line notation coordinates or absolute coordinates can be selected by the coordinate notation select/display field 3215.

The modification content relating to the user-specified range data is confirmed by pressing the user-specified range correction button 3217, and by pressing the user-specified range addition button 3218 or user-specified range deletion button 3219, data relating to a new user-specified range can be added and data relating to an unnecessary user-specified range can be deleted. Further, by pressing the redraw/user-specified range data update button 3221, the user-specified range on the user-specified range data editing depiction screen 3100 shown in FIG. 31 can be redrawn in accordance with the user-specified range data edited on the control screen 3200, and the user-specified range database 135 can be updated.

As described above, by pressing the amount tabulation execution button 3222, a simple amount tabulation can be performed with respect to the specified user-specified range. However, the user-specified range may also be specified by the designer as desired for use in a CAD conversion range or the like. Hence, it is possible to specify only a range which is determined to be required by the designer, and accordingly to process only required data. As a result, the work time can be shortened, which contributes to a reduction in the workload of the designer.

Other Embodiments

Note that the present invention is not limited to the embodiment described above, and various modified examples thereof may be implemented within the scope of the present invention. Firstly, the system constitution and flowcharts illustrated in the drawings are merely examples thereof, and the specific functional constitutions, screen configurations, and operational details may be selected appropriately.

Furthermore, in the embodiment described above, the method of the present invention is realized as a system and method through computer hardware and programs, but the method of the present invention maybe realized merely as a specialized layout design support computer program.

In other words, a specific embodiment of the present invention may be selected freely as long as layout design data, including building arrangements and physical equipment connection settings, can be edited and the edited data can be converted appropriately into a two-dimensional CAD drawing or a three-dimensional CAD model.

This application claims priority from Japanese Patent Application No. 2005-330760, filed Nov. 15, 2005, all of which is incorporated herein by reference in its entirety.

What is claimed is:

1. A layout design support system for supporting a layout design, including an arrangement of a building and a plurality of equipments within a layout range space of a plant and a connection between said equipments, using a computer, wherein said computer comprises:
   interface means for inputting various instructions and data and displaying various screens;
   layout editing means for causing said interface means to display a layout design data editing screen relating to layout design data, which include building data relating to a building center line and a building arrangement, equipment arrangement data relating to an arrangement of said equipments, equipment connection data relating to a physical connection between said equipments, and user-specified range data relating to a range specified by a user, receiving an edit instruction input onto said screen, and editing said layout design data in accordance with said edit instruction;
   storage means for storing a layout design data editing result generated by said layout editing means; and
   CAD converting means for converting said layout design data generated by said layout editing means into a two-dimensional CAD drawing or a three-dimensional CAD model, and causing said interface means to display said two-dimensional CAD drawing or said three-dimensional CAD model on a screen,
wherein:
   said layout editing means comprise, as said layout design data editing screen displayed by said interface means, a plurality of depiction screens which depict the edited content of said layout design data in the form of a layout diagram, and a plurality of control screens which display an input/select/display field or an operation image element relating to an editing subject item of said layout design data, and into which an edit instruction and data corresponding to a user operation are input, and
   each control screen is associated with at least one depiction screen such that information obtained on a control screen is transmitted to a corresponding depiction screen and reflected in said layout diagram.

2. The layout design support system according to claim 1, wherein said layout editing means comprise:
   display range modifying means for switching said building and arrangement displayed on said depiction screen and enlarging or reducing said depiction screen in accordance with an instruction input through said input/select/display field or said operation image clement displayed on said control screen or said depiction screen;
   output format switching means for switching an output format of said depiction screen to said two-dimensional CAD drawing or said three-dimensional CAD model using said CAD converting means in accordance with an instruction input through said input/select/display field or said operation image element displayed on said control screen or said depiction screen; and
   screen switching means for switching between said control screen and said depiction screen in accordance with an instruction input through said input/select/display field or said operation image element displayed on said control screen or said depiction screen.

3. The layout design support system according to claim 1, wherein said layout editing means comprise individual editing means for individually editing said building data, said equipment arrangement data,
   said equipment connection data, and said user-specified range data, said equipment connection data individual editing means comprise individual editing means for individually editing equipment connection element data, which relate to the constitution of a physical equipment connection element, and equipment connection path data, which relate to the constitution of an ancillary element serving as a path of said equipment connection element, and
   each individual editing means comprise said depiction screen and said associated control screen.

4. The layout design support system according to claim 1, further comprising evaluation calculation means for performing evaluation calculation processing, including an evaluation calculation or a repeated optimization calculation of said layout design data, using a preset algorithm, and causing said interface means to display an obtained calculation result on a screen,
   wherein said layout editing means comprise evaluation calculation activating means for causing said evaluation calculation means to begin said evaluation calculation processing in accordance with an instruction input through said input/select/display field or said operation image element displayed on said control screen or said depiction screen.

5. The layout design support system according to claim 4, wherein said evaluation calculation means comprise comparing means for reading past layout design data stored in said storage means as past record data, performing said evaluation calculation processing on a plurality of layout design data including said past record data, and causing said interface means to display the calculation result of said plurality of layout design data on a screen in a comparison format.

6. The layout design support system according to claim 5, wherein said comparing means comprise graph displaying means for performing a state value evaluation calculation on said plurality of layout design data, displaying the calculation result on a screen in a graph format, and in accordance with a selection instruction relating to a point indicating a state on said graph format screen, causing said interface means to display said state on a screen in the form of a layout diagram.

7. The layout design support system according to claim 4, wherein said evaluation calculation means comprise animation means for causing said interface means to display a layout diagram depiction of log data relating to said layout design data output from said layout editing means continuously on a screen.

8. A layout design support method for supporting a design, including an arrangement of a building and a plurality of equipments within a layout range space of a plant and a connection between said equipments, using a computer, wherein said computer comprises an interface unit, a layout editing unit, a storage unit, and an CAD converting unit, said method comprising:
 input/output processing for inputting various instructions and data and displaying various screens using said interface unit;
 layout editing processing for having said layout editing unit cause said interface unit to display a layout design data editing screen relating to layout design data, which include building data relating to a building center line and a building arrangement, equipment arrangement data relating to an arrangement of said equipments, equipment connection data relating to a physical connection between said equipments, and user-specified range data relating to a range specified by a user, receive an edit instruction input onto said layout design data editing screen, and edit said layout design data in accordance with said edit instruction;
 storage processing for storing a layout design data editing result generated by said layout editing unit in said storage unit; and
 CAD conversion processing for having said CAD converting unit convert said layout design data generated by said layout editing unit into a two-dimensional CAD drawing or a three-dimensional CAD model and cause said interface unit to display said two-dimensional CAD drawing or said three-dimensional CAD model,
 wherein:
 said layout editing unit comprises, as said layout design data editing screen displayed by said interface unit, a plurality of depiction screens which depict the edited content of said layout design data in the form of a layout diagram, and a plurality of control screens which display an input/select/display field or an operation image element relating to an editing subject item of said layout design data, and into which an edit instruction and data corresponding to a user operation are input, and
 each control screen is associated with at least one depiction screen such that information obtained on a control screen is transmitted to a corresponding depiction screen and reflected in said layout diagram.

9. A computer readable medium storing therein a layout design support program for supporting a layout design, including an arrangement of a building and a plurality of equipments within a layout range space of a plant and a connection between said equipments, using a computer, said program causing said computer to realize:
 inputting various instructions and data and displaying various screens;
 causing an interface to display a layout design data editing screen relating to layout design data, which include building data relating to a building center line and a building arrangement, equipment arrangement data relating to an arrangement of said equipments, equipment connection data relating to a physical connection between said equipments, and user-specified range data relating to a range specified by a user, receiving an edit instruction input onto said layout design data editing screen, and editing said layout design data in accordance with said edit instruction;
 storing a layout design data editing result; and
 converting said layout design data into a two-dimensional CAD drawing or a three-dimensional CAD model, and causing said interface to display said two-dimensional CAD drawing or said three-dimensional CAD model,
 wherein:
 said layout design data editing screen includes a plurality of depiction screens which depict the edited content of said layout design data in the form of a layout diagram, and a plurality of control screens which display an input/select/display field or an operation image element relating to an editing subject item of said layout design data, and into which an edit instruction and data corresponding to a user operation are input, and
 each control screen is associated with at least one depiction screen such that information obtained on a control screen is transmitted to a corresponding depiction screen and reflected in said layout diagram.

* * * * *